(12) United States Patent
Probert et al.

(10) Patent No.: US 11,001,200 B2
(45) Date of Patent: May 11, 2021

(54) VEHICLE OCCUPANT WARNING SYSTEM

(71) Applicant: Nissan North America, Inc., Franklin, TN (US)

(72) Inventors: Neal Probert, Farmington Hills, MI (US); Roy Goudy, Farmington Hills, MI (US); Jeremy Chambers, Casco, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/426,630

(22) Filed: May 30, 2019

(65) Prior Publication Data

US 2020/0377016 A1   Dec. 3, 2020

(51) Int. Cl.
*G08G 1/09* (2006.01)
*B60Q 9/00* (2006.01)
*E05B 81/64* (2014.01)
*G08G 1/0967* (2006.01)

(52) U.S. Cl.
CPC .............. *B60Q 9/00* (2013.01); *E05B 81/64* (2013.01); *G08G 1/0967* (2013.01); *E05Y 2900/531* (2013.01)

(58) Field of Classification Search
CPC .. E05B 81/64; G08G 1/0967; E05Y 2900/531
USPC ........................................................ 340/905
See application file for complete search history.

(56) References Cited

U.S. PATENT DOCUMENTS

| | | | |
|---|---|---|---|
| 6,411,896 B1 | 6/2002 | Shuman et al. | |
| 8,473,144 B1* | 6/2013 | Dolgov | G01C 21/3407 701/28 |
| 8,650,799 B2 | 2/2014 | Chen | |
| 8,825,259 B1* | 9/2014 | Ferguson | G01S 17/931 701/23 |
| 9,550,450 B2 | 1/2017 | Galicia Badillo | |
| 9,557,736 B1* | 1/2017 | Silver | G06K 9/00812 |
| 10,032,379 B1* | 7/2018 | Chambers | G08G 1/166 |
| 10,292,136 B2* | 5/2019 | Rubin | H04W 4/027 |
| 2004/0145495 A1* | 7/2004 | Komada | G08G 1/164 340/905 |
| 2004/0227647 A1* | 11/2004 | Yanai | B60R 1/00 340/995.1 |
| 2005/0225457 A1* | 10/2005 | Kagawa | G08G 1/0965 340/995.13 |
| 2007/0109146 A1* | 5/2007 | Tengler | G08G 1/161 340/902 |

(Continued)

FOREIGN PATENT DOCUMENTS

WO     2011137477 A1     11/2011

*Primary Examiner* — Kerri L McNally
*Assistant Examiner* — Thang D Tran
(74) *Attorney, Agent, or Firm* — Global IP Counselors, LLP

(57) ABSTRACT

A vehicle occupant warning system includes a receiver, an electronic controller and a mitigation device. The receiver is disposed onboard a host vehicle and is configured to receive remote vehicle information representing a travel condition of a remote vehicle. The electronic is controller configured to determine whether the remote vehicle will pass adjacent a side of the host based on the remote vehicle information. The mitigation device is configured to perform a mitigation operation to prevent an occupant of the host vehicle from exiting the host vehicle when instructed by the electronic controller.

18 Claims, 24 Drawing Sheets

(56) References Cited

U.S. PATENT DOCUMENTS

| | | | | |
|---|---|---|---|---|
| 2008/0215202 | A1* | 9/2008 | Breed | G01C 21/3611 701/25 |
| 2009/0045928 | A1* | 2/2009 | Rao | B60Q 9/006 340/435 |
| 2009/0096597 | A1* | 4/2009 | Avery, Jr. | G08G 1/0962 340/435 |
| 2010/0053320 | A1* | 3/2010 | Chen | G06K 9/00805 348/135 |
| 2011/0133915 | A1* | 6/2011 | Ito | B60Q 1/525 340/435 |
| 2012/0065858 | A1 | 3/2012 | Nikolaou et al. | |
| 2012/0188098 | A1* | 7/2012 | Mochizuki | G08G 1/096783 340/905 |
| 2012/0268262 | A1* | 10/2012 | Popovic | B60Q 9/008 340/438 |
| 2014/0025285 | A1* | 1/2014 | Trombley | G08G 1/161 701/301 |
| 2014/0145861 | A1* | 5/2014 | Goudy | G08G 1/09626 340/905 |
| 2014/0210644 | A1* | 7/2014 | Breed | B60W 30/18154 340/905 |
| 2014/0330479 | A1* | 11/2014 | Dolgov | B60W 30/143 701/28 |
| 2015/0123778 | A1* | 5/2015 | Konet | G08B 21/02 340/435 |
| 2015/0145694 | A1* | 5/2015 | Dupont | G08G 1/167 340/903 |
| 2015/0251599 | A1 | 9/2015 | Koravadi | |
| 2015/0254977 | A1* | 9/2015 | Grabow | G08G 1/0141 340/903 |
| 2015/0256534 | A1* | 9/2015 | Goudy | H04L 63/0823 713/156 |
| 2015/0262484 | A1* | 9/2015 | Victor | G09B 19/167 701/1 |
| 2015/0269842 | A1* | 9/2015 | Ignaczak | B60Q 1/44 701/118 |
| 2016/0098926 | A1* | 4/2016 | Probert | G08G 1/123 340/903 |
| 2016/0284218 | A1* | 9/2016 | Ejiri | G08G 1/166 |
| 2016/0297447 | A1* | 10/2016 | Suzuki | B60W 30/18163 |
| 2017/0008455 | A1* | 1/2017 | Goudy | B60Q 9/008 |
| 2017/0080952 | A1* | 3/2017 | Gupta | B60W 50/14 |
| 2017/0140651 | A1* | 5/2017 | Lee | B60Q 1/525 |
| 2017/0217368 | A1* | 8/2017 | Lewis | B60R 1/00 |
| 2017/0247927 | A1* | 8/2017 | Elie | E05F 15/60 |
| 2017/0341652 | A1* | 11/2017 | Sugawara | B60W 30/095 |
| 2017/0372612 | A1* | 12/2017 | Bai | G08G 1/166 |
| 2018/0005254 | A1* | 1/2018 | Bai | G06Q 30/0203 |
| 2018/0050673 | A1* | 2/2018 | D'sa | B60T 7/22 |
| 2018/0158337 | A1* | 6/2018 | Koravadi | B60W 50/00 |
| 2018/0162392 | A1* | 6/2018 | Takaki | G01S 13/867 |
| 2018/0173237 | A1* | 6/2018 | Reiley | G05D 1/0061 |
| 2018/0201187 | A1* | 7/2018 | Yellambalase | E05B 81/56 |
| 2018/0225963 | A1* | 8/2018 | Kobayashi | G08G 1/04 |
| 2018/0257644 | A1* | 9/2018 | Morotomi | G01S 13/867 |
| 2018/0268692 | A1* | 9/2018 | Takada | G08G 1/137 |
| 2018/0286242 | A1* | 10/2018 | Talamonti | G08G 1/096822 |
| 2019/0054927 | A1* | 2/2019 | Hayakawa | B62D 15/027 |
| 2019/0092234 | A1* | 3/2019 | Gibson | G01S 19/45 |
| 2019/0139411 | A1* | 5/2019 | Dhull | G09F 19/18 |
| 2019/0156664 | A1* | 5/2019 | Yamada | G08G 1/0145 |
| 2019/0161080 | A1* | 5/2019 | Gochev | G05D 1/0088 |
| 2019/0197889 | A1* | 6/2019 | Kanehara | G08G 1/054 |
| 2019/0228238 | A1* | 7/2019 | Harada | B60R 21/00 |
| 2019/0236952 | A1* | 8/2019 | Suzuki | G08G 1/143 |
| 2020/0018100 | A1* | 1/2020 | Aoi | G08G 1/16 |
| 2020/0086854 | A1* | 3/2020 | Liu | B60W 30/09 |

\* cited by examiner

VEHICLE OCCUPANT WARNING SYSTEM

BACKGROUND

Field of the Invention

The present invention generally relates to a vehicle occupant warning system. More specifically, the present invention relates to a vehicle occupant warning system that warns an occupant of a vehicle of an approaching remote vehicle.

Background Information

Recently, vehicles are being equipped with a variety of warning and prevention systems such as lane departure and prevention systems, cross traffic alerts, adaptive cruise control, and the like. Further, various informational vehicle-to-vehicle systems have been proposed that use wireless communications between vehicles, and further between vehicle and infrastructures such as roadside units. These wireless communications have a wide range of applications ranging from safety applications to entertainment applications. Also vehicles are sometimes equipped with various types of systems, such as global positioning systems (GPS), which are capable of determining the location of the vehicle and identifying the location of the vehicle on a map for reference by the driver. The type of wireless communications to be used depends on the particular application. Some examples of wireless technologies that are currently available include digital cellular systems, Bluetooth systems, wireless LAN systems and dedicated short range communications (DSRC) systems.

SUMMARY

It has been discovered that to improve vehicle and vehicle occupant safety, an improved system to warn vehicle occupants of the location heading of a remote vehicle is desired.

In view of the state of the known technology, one aspect of the present disclosure is to provide a vehicle occupant warning system comprising a receiver, an electronic controller and a mitigation device. The receiver is disposed onboard a host vehicle and is configured to receive remote vehicle information representing a travel condition of a remote vehicle. The electronic is controller configured to determine whether the remote vehicle will pass adjacent a side of the host based on the remote vehicle information. The mitigation device is configured to perform a mitigation operation to prevent an occupant of the host vehicle from exiting the host vehicle when instructed by the electronic controller.

Another aspect of the present disclosure is to provide a method of warning a vehicle occupant, comprising operating a receiver disposed onboard a host vehicle, to receive remote vehicle information representing a travel condition of a remote vehicle, determining, by an electronic controller, whether the remote vehicle will pass adjacent a side of the host based on the remote vehicle information, and operating a mitigation device to perform a mitigation operation to prevent an occupant of the host vehicle from exiting the host vehicle when instructed by the electronic controller.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
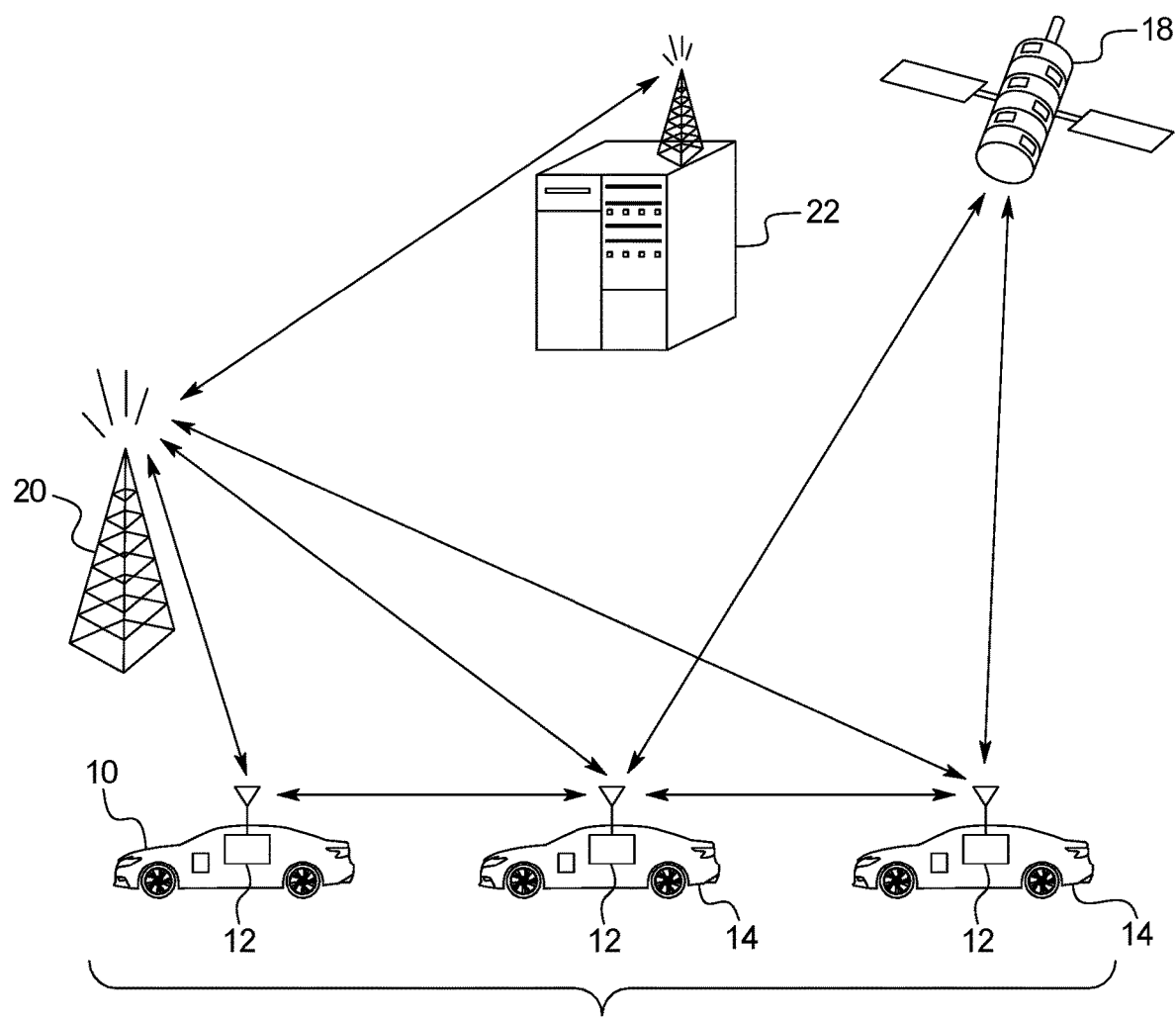
FIG. 1 is a schematic diagram illustrating an example of a host vehicle equipped with a vehicle occupant warning system and components of a global positioning system (GPS)

Referring initially to FIG. 1, a two-way wireless communications network is illustrated that includes vehicle to vehicle communication and vehicle to base station communication. In FIG. 1, a host vehicle 10 (HV) is illustrated that is equipped with a vehicle occupant warning system 12 according to a disclosed embodiment, and the remote vehicle 14 (RV) that can also include the system 12. While the host vehicle 10 and the remote vehicle 14 are illustrated as having the same vehicle occupant warning system 12, it will be apparent from this disclosure that each of the remote vehicles 14 can include another type of vehicle occupant warning system (or any other system) that is capable of communicating information about at least the location, direction and speed of the remote vehicle 14 to the host vehicle 10.

As can be understood, an occupant of a vehicle 10 stopped along the road side 16 may wish to exit the vehicle 10 for any number of reasons. However, as one of ordinary skill can understand occupants may have a limited field of view to discern whether a remote vehicle 14 is approaching. Further, in some situations the remote vehicle 14 may not be visible due to turns in the road, hills along the road, obstacles along the road or any other reasons.

The vehicle occupant warning system 12 improves the host vehicle's 10 determination of location, direction and speed of a remote vehicle 14. The vehicle occupant warning system 12 enables the host vehicle 10 or the operator of the host vehicle 10 to understand whether it is safe to exit the host vehicle 10.

The vehicle occupant warning system 12 of the host vehicle 10 and the remote vehicle 14 communicate with the two-way wireless communications network. As seen in FIG. 1, for example, the two-way wireless communications network can include one or more global positioning satellites 18 (only one shown), and one or more roadside (terrestrial) units 20 (only one shown), and a base station or external server 22. The global positioning satellites 18 and the roadside units 20 send and receive signals to and from the system 12 for determining the number of remote vehicles following a host vehicle of the host vehicle 10 and the remote vehicles 14. The base station 22 sends and receives signals to and from the system 12 for determining the number of remote vehicles following a host vehicle of the host vehicle 10 and the remote vehicles 14 via a network of the roadside units 20, or any other suitable two-way wireless communications network.

Figure 2:
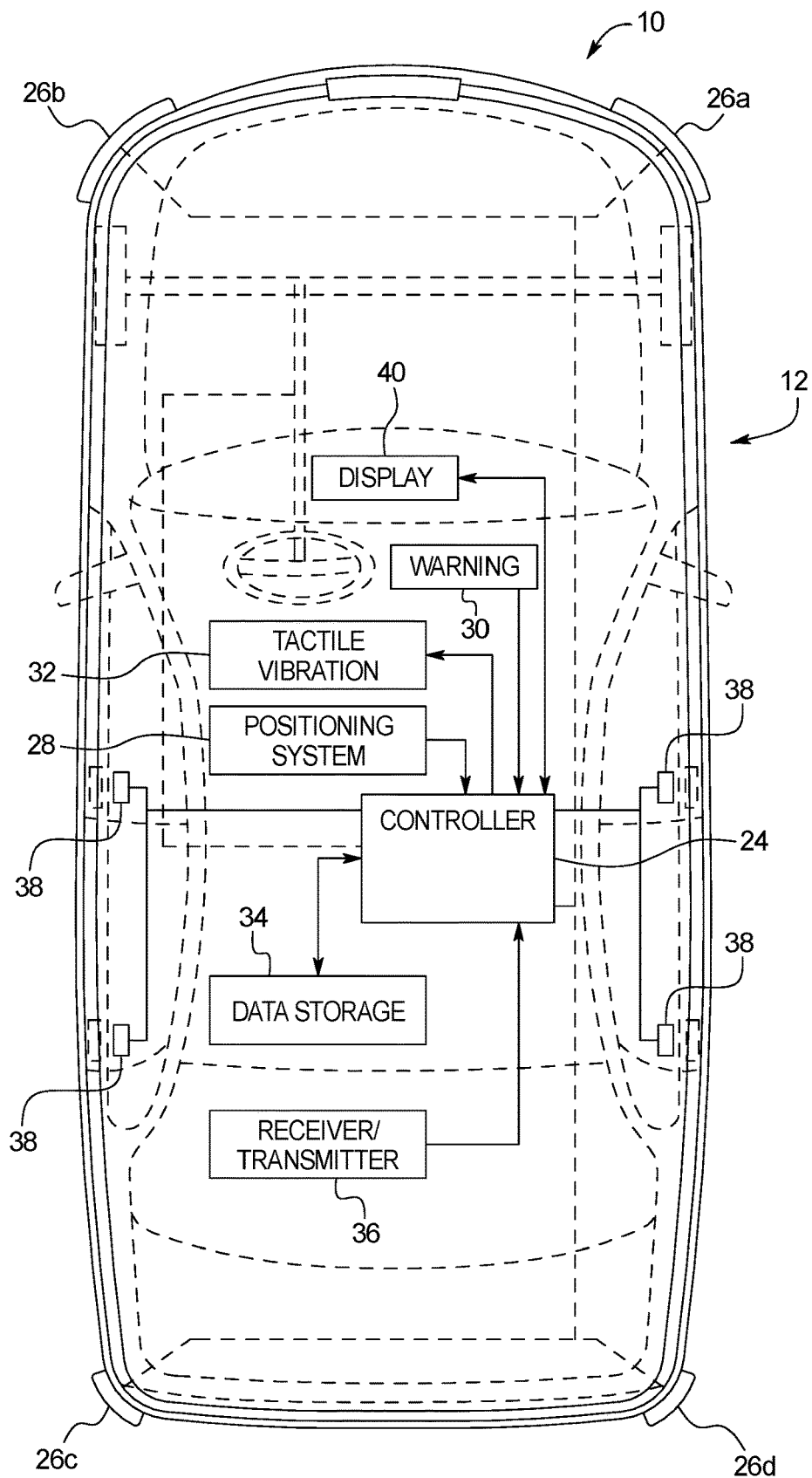
FIG. 2 is a block diagram of exemplary components of the host vehicle and the remote vehicles that are equipped with the vehicle occupant warning system according to embodiments disclosed herein.

Referring to FIG. 2, a vehicle occupant warning system 12 for a host vehicle 10 is illustrated in accordance with one embodiment. The system 12 includes a controller 24, sensor system (sensors 26a-26d), a positioning system 28, a warning indicator 30 or system, a tactile vibration system 32, data storage 34, receiver/transmitter system 36, a door locking mechanism 38 and a display 40. As understood herein, the warning indicator 30, the tactile vibration system 23, the door locking mechanism 38 and/or an audio alert may act as a mitigation system that alerts the occupant of the host vehicle 10 that a remote vehicle 14 is approaching or prevents the occupant of the host vehicle 10 from exiting the host vehicle 10.

The controller 24 is preferably and electronic controller and includes a microcomputer with a control program that controls the system 12 as discussed below. The controller 24 can also include other conventional components such as an input interface circuit, an output interface circuit, and storage device(s) (data storage 34) such as a ROM (Read Only Memory) device and a RAM (Random Access Memory) device. The microcomputer of the controller 24 is programmed to control one or more of the sensor system (sensors 26a-26d), the positioning system 28, the warning indicator 30 or system, the tactile vibration system 32, data storage 34, the receiver/transmitter system 36, the door locking mechanism 38 and the display 40, and to make determinations or decisions, as discussed herein. The memory circuit stores processing results and control programs, such as ones for the sensor system (sensors 26a-26d), the positioning system 28, the warning indicator 30 or system, the tactile vibration system 32, data storage 34, the receiver/transmitter system 36, the door locking mechanism 38 and the display 40 operation that are run by the processor circuit. The controller 24 is operatively coupled to the sensor system (sensors 26a-26d), the positioning system 28, the warning indicator 30 or system, the tactile vibration system 32, data storage 34, the receiver/transmitter system 36, the door locking mechanism 38 and the display 40 in a conventional manner, as well as other electrical systems in the vehicle 10, such the turn signals, windshield wipers, lights and any other suitable systems. Such a connection enables the controller 24 to monitor and control any of these systems as desired. The internal RAM of the controller 24 stores statuses of operational flags and various control data. The internal ROM of the controller 24 stores the information for various operations. The controller 24 is capable of selectively controlling any of the components of the sensor system (sensors 26a-26d), the positioning system 28, the warning indicator 30 or system, the tactile vibration system 32, data storage 34, the receiver/transmitter system 36, the door locking mechanism 38 and the display 40. It will be apparent to those skilled in the art from this disclosure that the precise structure and algorithms for the controller 24 can be any combination of hardware and software that will carry out the functions of the present invention.

As shown in FIG. 2, the controller 24 can include or be in communication with the display 40. The display 40 enables the controller 24 to provide information and/or feedback concerning the system 12 or any other suitable information. For example, in one embodiment, in addition to or in replacement of the warning indicator 30, the display 40 can display information regarding the remote vehicles 14, including the location, position, speed and heading of the remote vehicle. The display 40 can provide instructions to the operator or occupant of the host vehicle 10 to enable the driver of the host vehicle 10 to perform the appropriate mitigation operation.

In one embodiment, the sensor system (sensors 26a-26d) can include proximity sensors and optical sensors. In one embodiment, the proximity sensors include a plurality of sensors (sensors 26a-26d), and are configured to detect the boundary 42 of the road 16 or other stationary or moving objects (e.g., remote vehicles 14) in proximity to the sensor system (sensors 26a-26d). For example, as illustrated in FIG. 2, front sensors 26a and 26b in the sensor system are preferably mounted externally on the front bumper and rear sensors 26c and 2cd are mounted externally on the rear bumper of host vehicle 10. However, the sensors 26a-26d in the sensor system may be mounted on any suitable external portion of the host vehicle 10, including the front and rear quarter panels, the external mirrors or any combination of suitable areas.

The sensor system (sensors 26a-26d) is preferably configured to be capable of detecting a boundary 42 of a lane or a road 44 or other stationary or moving objects (e.g., remote vehicles 14). However, the sensor system (sensors 26a-26d) can be any type of system desirable. For example, the front sensors 26a and 26b and rear sensors 26c and 26d in the sensor system (sensors 26a-26d) can include a long-range radar device for detection of a remote vehicle 14 that is located at a distance from the front or the rear of the host vehicle 10. Thus, the radar sensors may be configured to detect objects at a predetermined distance (e.g., distances up to 200 m), and thus may have a narrow field of view angle (e.g., around 15°). Due to the narrow field of view angle, the long-range radar may not detect all objects in the front of in the rear of the host vehicle 10. Thus, if desired, the front sensors 26a and 26b and rear sensors 26c and 26d can include short-range radar devices to assist in monitoring the region in front of or to the rear of the host vehicle 10. However, the sensors in the sensor system (sensors 26a-26d) can be disposed in any position of the host vehicle 10 and may include any type and/or combination of sensors to enable detection of a remote vehicle 14. In addition, the sensor system (sensors 26a-26d) may include cameras (e.g., mounted on the mirrors 46 or any other suitable place), radar sensors, photo sensors or any combination thereof. Although FIG. 2 illustrates four sensor sensors 26a-26d, there can be as few or as many sensors desirable or suitable.

Although the sensor system (sensors 26a-26d) can be electronic detection devices that transmit electronic electromagnetic waves (e.g., radar), the sensors 26a-26d can be any suitable sensors that, for example, take computer-processed images with a digital camera and analyzes the images or emit lasers, as is known in the art. The sensor system (sensors 26a-26d) may be capable of detecting the position of the host vehicle 10 relative to the boundary 42 of the road 16, and also detect at least the speed, direction, acceleration and distance of the remote vehicle 10 relative to the host vehicle and the boundary 42 of the road 16. Further, the sensor system (sensors 26a-26d) may include object-locating sensing devices including range sensors, such as FM-CW (Frequency Modulated Continuous Wave) radars, pulse and FSK (Frequency Shift Keying) radars, sonar and Lidar (Light Detection and Ranging) devices, and ultrasonic devices which rely upon effects such as Doppler-effect measurements to locate forward objects. Object-locating devices may include charged-coupled devices (CCD) or complementary metal oxide semi-conductor (CMOS) video image sensors, and other known camera/video image processors which utilize digital photographic methods to "view" forward or rearward objects including one or more remote vehicles 14. The sensor system (sensors 26a-26d) is in communication with the controller 24, and is capable of transmitting information to the controller 24.

Thus, as can be understood, the sensor system (sensors 26a-26d) is capable of detecting remote vehicles 14 both in front of and behind the host vehicle 10. Thus, the sensor system can transmit information relating to the speed and location of a following remote vehicle 14, a leading remote vehicle, a remote vehicle 14 that is traveling in an adjacent lane and traveling in an opposite direction of the host vehicle 10 and any other moving and or stationary remote vehicle 14.

The warning indicator 30 may include warning lights and/or a warning audio output and is in communication with the controller 24. For example, the warning indicator 30 may include a visual display or light indicator that flashes or illuminates the instrument cluster on the instrument panel IP of the host vehicle 10, activates a heads-up display is a visual readout in the display 40, is an audible noise emitted from speaker, or any other suitable visual display or audio or sound indicator or combination thereof that notifies the operator or interior occupant of the host vehicle 10 that a predetermined number of remote vehicles 14 are following the host vehicle 10. In one embodiment, the warning indicator 30 can be in a specific location or produce a specific indication (sound or visual) that the remote vehicle 14 is approaching on a specific side of the host vehicle 10.

As shown in FIG. 2, the tactile vibration system 32 may include tactile feedback generated by the tactile vibration system 32 that can be a vibration actuator in the steering wheel SW, the driver seat, or any other suitable location within the host vehicle 10. That is, the feedback operation can include providing haptic feedback to a portion of an interior of the vehicle 10 located proximate to the driver. For example, the feedback operation may be tactile feedback in a specific location or produce a specific indication that the remote vehicle 14 is approaching on a specific side of the host vehicle 10.

Additionally, the system 12 may also be connected to the steering system of the vehicle 10, such that the controller 24 can control the steering system of the vehicle 10 based on a predetermined set of criteria. The controller 24 can be connected to the steering wheel or any other suitable portion of the steering system. That is, the controller 24 can apply an assist force to a portion of the steering system of the vehicle 10 to cause movement of the vehicle 10 away from the trajectory of the remote vehicle 14.

The system 12 may include a positioning system 26, such as a GPS. In one embodiment the vehicle 10 receives a GPS satellite signal. As is understood, the GPS processes the GPS satellite signal to determine positional information (such as location, speed, acceleration, yaw, and direction, just to name a few) of the vehicle 10. As noted herein, the positioning system 28 is in communication with the controller 24, and is capable of transmitting such positional information regarding the host vehicle 10 to the controller 24. Moreover, the controller 24 can cause host vehicle information (e.g., location, speed, acceleration, yaw, and direction, just to name a few) to be transmitted to the remote vehicles 14 via the receiver/transmitter system 36, and receive information (e.g., location, speed, acceleration, yaw, and direction, just to name a few) from the remote vehicles 14 via the receiver/transmitter system 36.

The positioning system 28 also can also include or be in communication with the data storage 34 that stores map data. Thus, in determining the position of the host vehicle 10 using any of the herein described methods, devices or systems, the positioning host of the vehicle 10 may be compared to the known data stored in the data storage 34. Thus, the system 12 may accurately determine the location of the host vehicle 10 on an electronic map. The storage device 34 may also store any additional information including the current or predicted vehicle position and any past vehicle 10 position or any other suitable information.

The receiver/transmitter system 36 is preferably the system that communicates with the two-way wireless communication network discussed above. The receiver/transmitter system 36 is configured to send information to the external server 22, the cloud or internet. The receiver/transmitter system 36 can send and receive information in any suitable manner, such as data packets. The receiver/transmitter system 36 can send and receive information to and from the two-way wireless communication network, directly to other vehicles (e.g., remote vehicles 14) or in a suitable manner. When in communication with other vehicles, the information can be sent directly to or received from the remote vehicle 14, when in range, or through blockchain. Blockchain communication could be encrypted information that is sent to or from the host vehicle 10 to or from the remote vehicle 14 through other remote vehicles 14 or portable devices. The electronic controllers of the other vehicles or portable devices would serve as the blocks of the chain between the host vehicle 10 and the remote vehicle 14.

The receiver/transmitter system 36 includes, for example, a receiver and a transmitter configured as individual components or as a transceiver, and any other type of equipment for wireless communication. For example, the receiver/transmitter system 36 is configured to communicate wirelessly over one or more communication paths. Examples of communication paths include a cellular telephone network, a wireless network (Wi-Fi or a WiMAX), a DSRC (Dedicated Short-Range Communications) network, a power line communication network, etc. The receiver/transmitter system 36 is configured to receive information from external sources and to transmit such information to the controller 24. For example, the receiver/transmitter system 36 can communicate with another vehicle, or any other suitable entity via a communication network, direct communication, or in any suitable manner as understood in the art.

Figure 3:
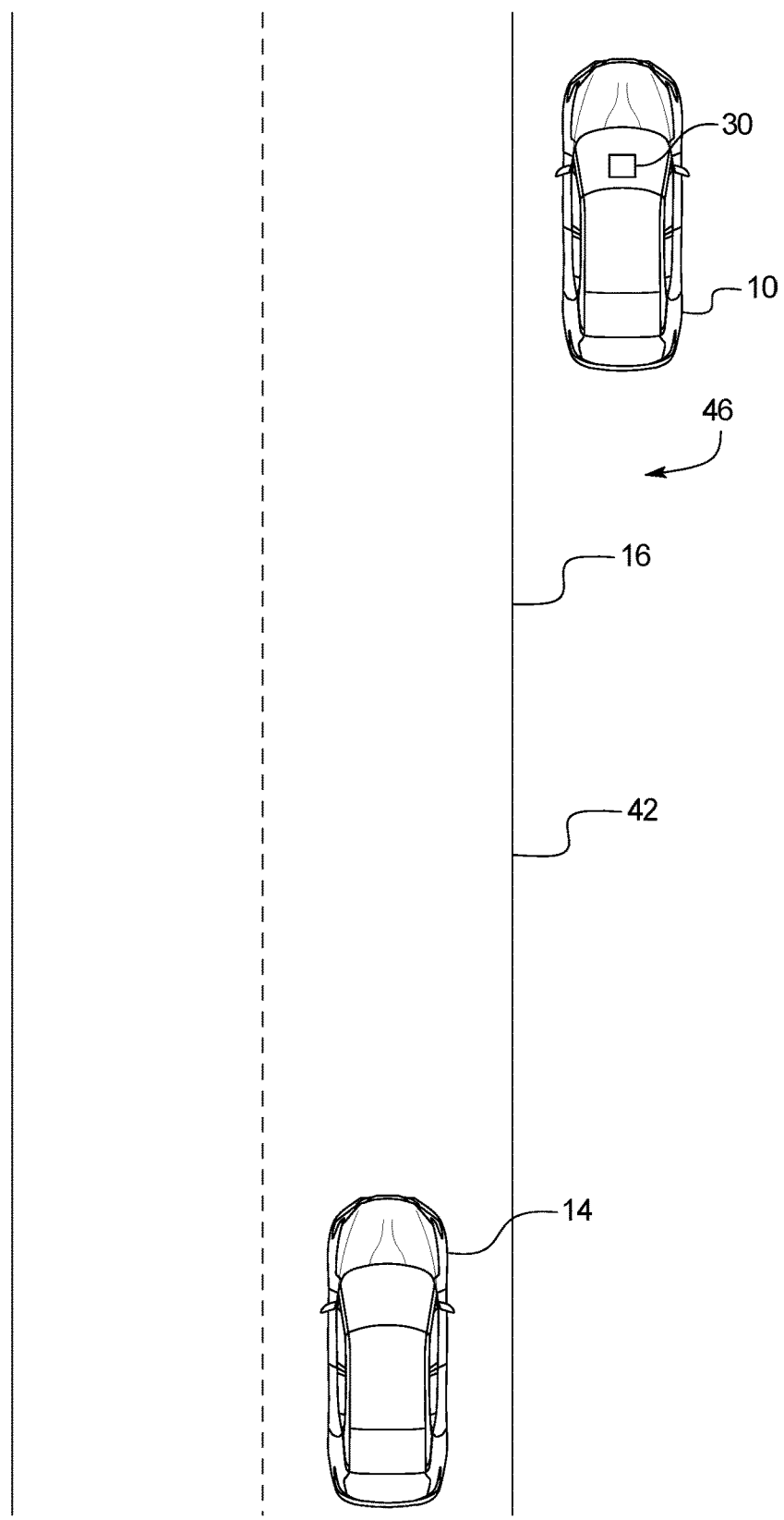
FIG. 3 is a schematic representation of a host vehicle stopped alongside a road and a remote vehicle approaching from the rear.

FIGS. 3-6 illustrate the system and procedure for determining whether an occupant of the host vehicle 10 is safe to exit the host vehicle 10. As shown in FIG. 3, the host vehicle 10 is stopped along the side of the road 16, preferably on the shoulder 46. However, it is noted that the host vehicle 10 can be stopped in any position on the road, in a lane, along side the road 16, in a parking lot or in any other place or position. The controller 24 can determine the host vehicle 10 is stopped in any number of suitable ways. For example, the controller 24 can determine that the host vehicle 10 is stopped based on vehicle parameters, including speed calculation, GPS information, the host vehicle 10 being in park or any other suitable manner.

Once it has been determined that the host vehicle 10 is stopped, the controller 24 can determine the location, heading and distance of remote vehicles 14 in the vicinity. Because the host vehicle 10 can receive messages (via the received/transmitter 36) from surrounding remote vehicles 14, the controller 24 on board the host vehicle 10 can determine whether a remote vehicle 14 is approaching the host vehicle 10 either from behind or from the opposite direction. If so, the controller 24 on board the host vehicle 10 first determines the heading of the remote vehicle 14 relative to the host vehicle 10. The controller on board the host vehicle 10 then determines whether the remote vehicle 14 is within proximity of the host vehicle 10 in terms of time and distance, e.g., within 5 seconds and 5.4 meters lateral distance for example, and whether the remote vehicle 14 is passing along the left or right side of the host vehicle 10.

Figure 4:
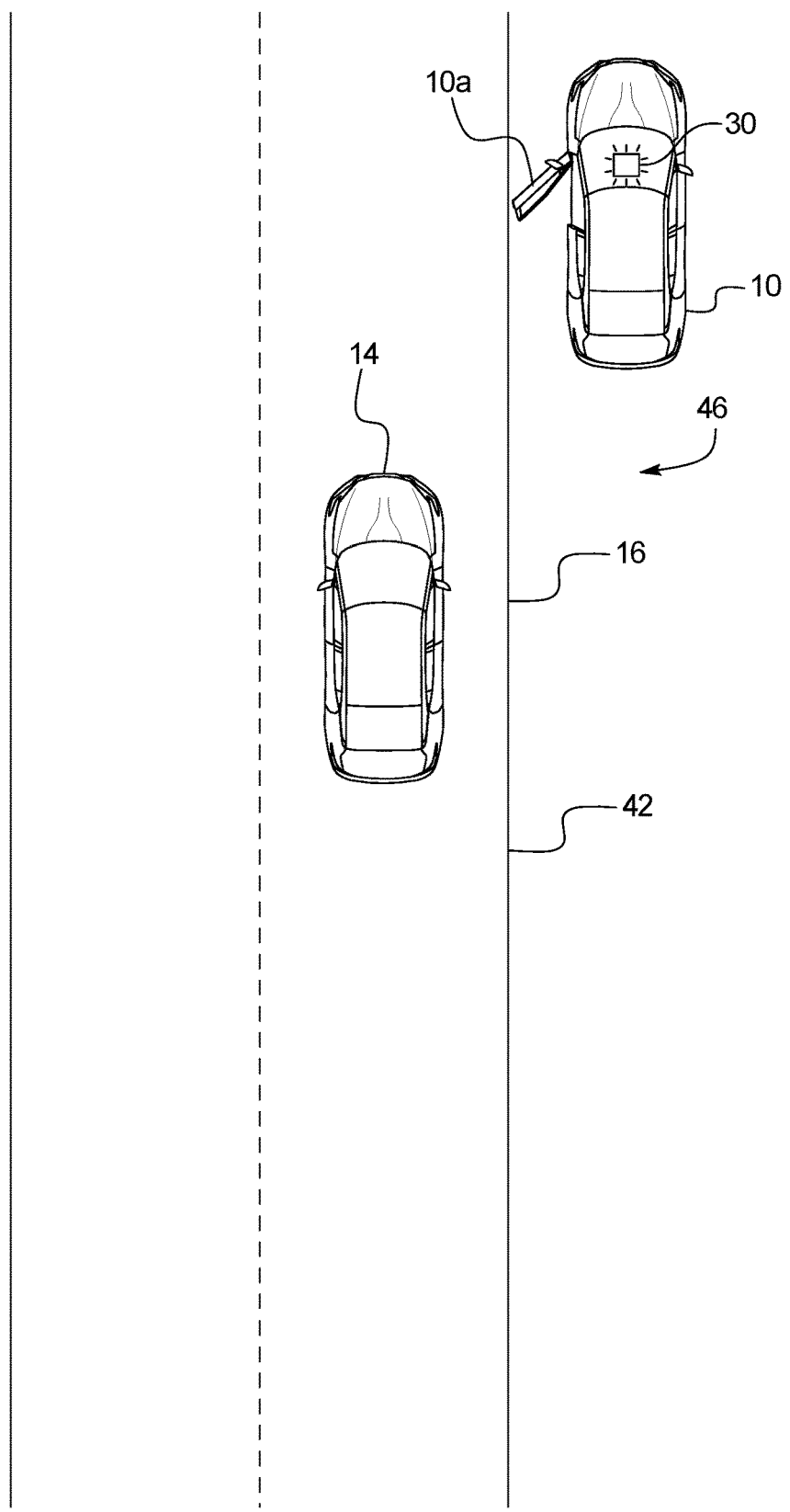
FIG. 4 is a schematic representation of the door of the host vehicle in FIG. 3 opening and the occupant preparing to exit with the remote vehicle approaching from the rear.

As shown, in FIGS. 3 and 4, the controller 24 has determined that the remote vehicle 14 is within 5 seconds and 5.4 meters lateral distance, and that the remote vehicle 14 is passing along the left side of the host vehicle 10. As shown in FIG. 4 the occupant is attempting to open the door 10a of the host vehicle 10. Thus, the controller 24 causes the mitigation device to perform a mitigation operation. For example, the controller 24 would cause the warning indicator 30 to generate an auditory and/or a visual warning and/or cause the tactile vibration system 32 to generate a tactile warning or any other warning discussed herein. However, it is noted that it is not necessary for the occupant to attempt to open the door for a mitigation operation to be generated. The system 12 may cause the mitigation operation to be generated simply because a remote vehicle 14 is passing or based on any suitable determination that the occupant is exiting the host vehicle 10 or may exit the host vehicle 10.

Figure 5:
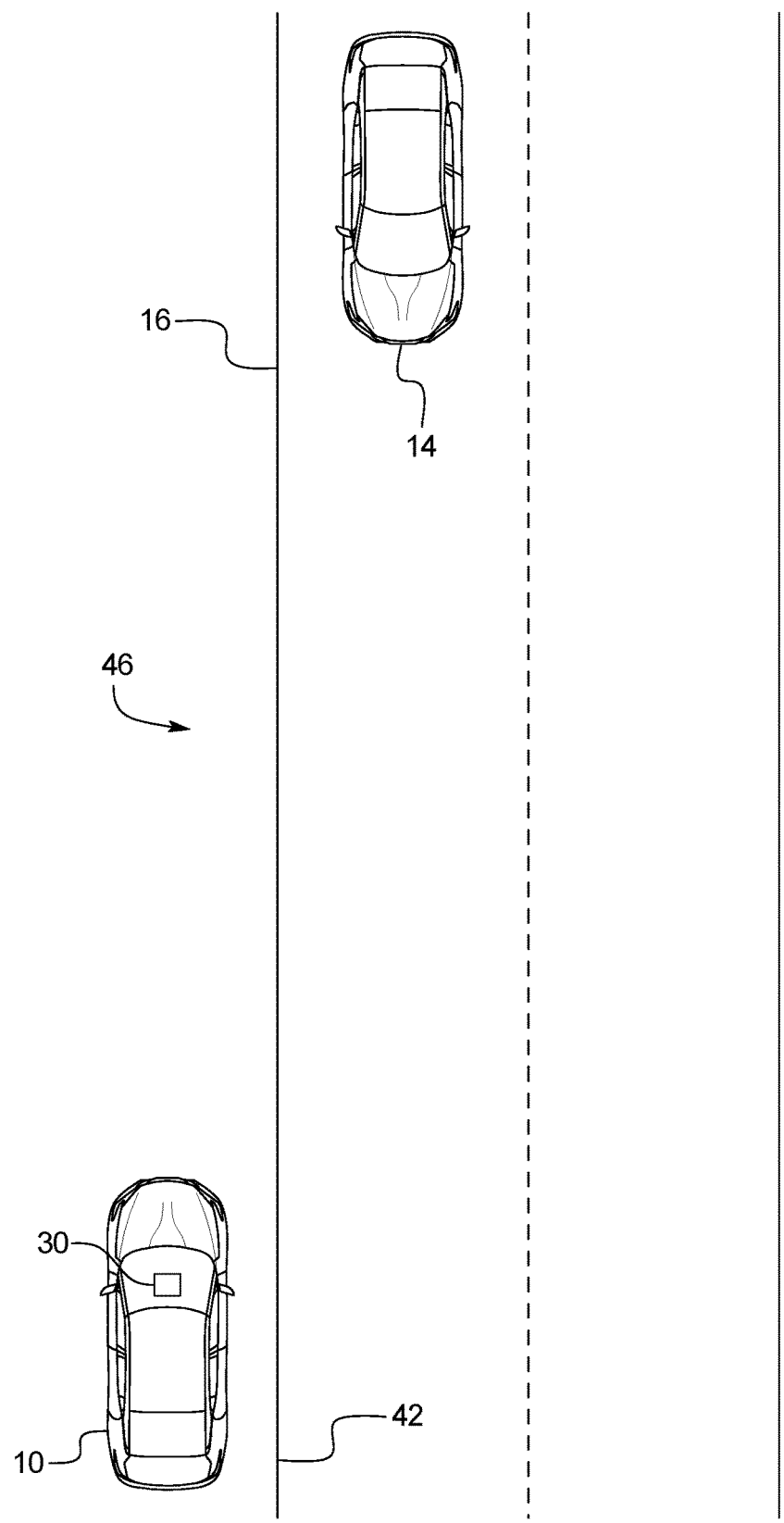
FIG. 5 is a schematic representation of a host vehicle stopped alongside a road and a remote vehicle approaching from the front.
Figure 6:
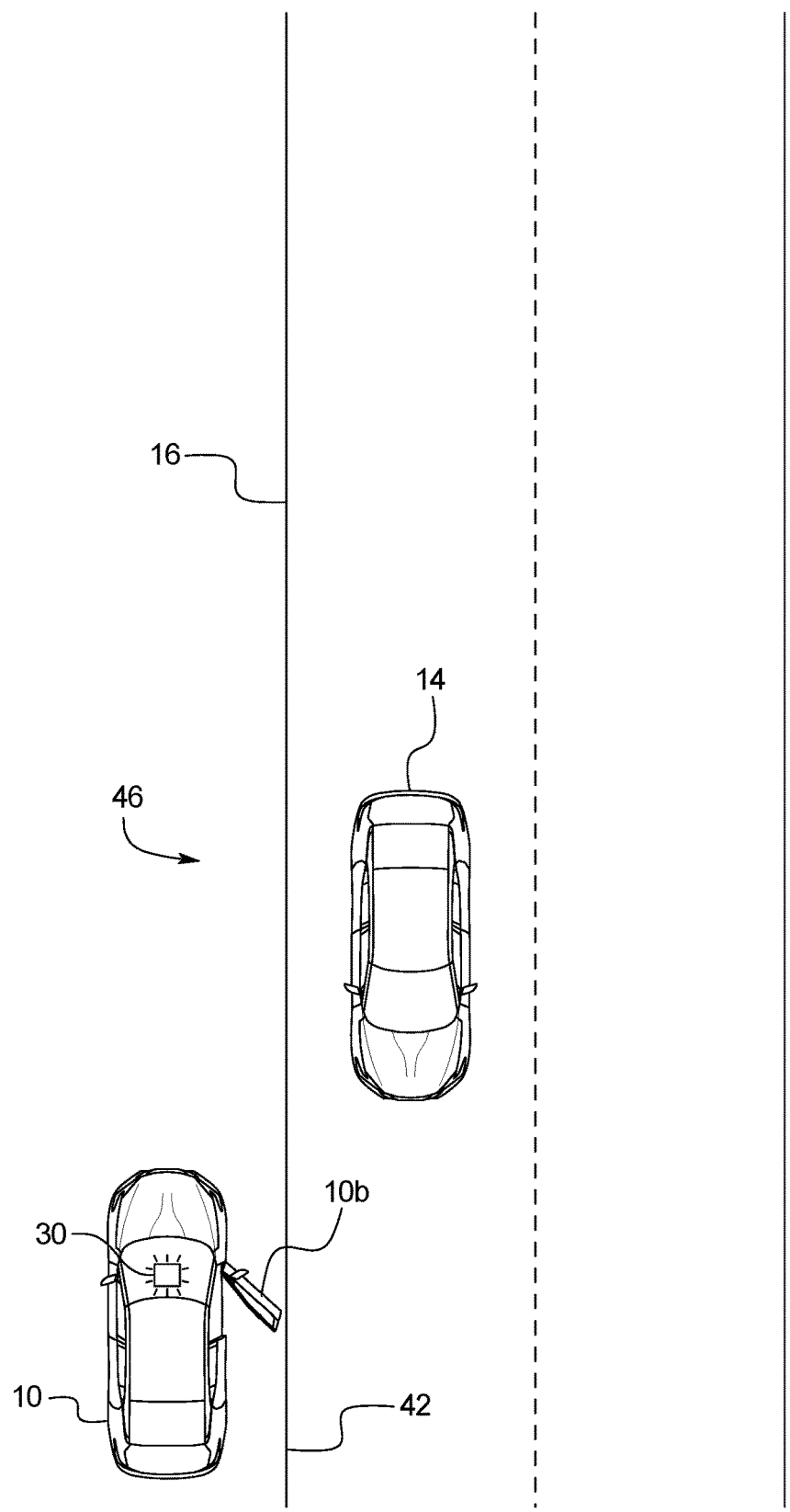
FIG. 6 is a schematic representation of the door of the host vehicle in FIG. 5 opening and the occupant preparing to exit with the remote vehicle approaching from the front.

As shown in FIGS. 5 and 6, the controller 24 on board the host vehicle 10 has determined that the remote vehicle 14 is within proximity of the host vehicle 10 in terms of time and distance, e.g., within 5 seconds and 5.4 meters lateral distance for example, and that the remote vehicle 14 is passing along right side of the host vehicle 10. As shown in FIG. 6, the occupant is attempting to open the door 10b of the host vehicle 10. Thus, the controller 24 causes the mitigation device to perform a mitigation operation. For example, the controller 24 would cause the warning indicator 30 to generate an auditory and/or a visual warning and/or cause the tactile vibration system 32 to generate a tactile warning or any other warning discussed herein. However, it is noted that it is not necessary for the occupant to attempt to open the door for a mitigation operation to be generated. The system 12 may cause the mitigation operation to be generated simply because a remote vehicle 14 is passing or based on any suitable determination that the occupant is exiting the host vehicle 10 or may exit the host vehicle 10.

FIGS. 7-14 illustrate the steps for determining the location, heading and speed of a remote vehicle 14. A series of mathematical expressions can be defined that provide specific information regarding the longitudinal, lateral, elevation and heading of the remote vehicles 14 relative to the host vehicle 10. In other words, the system 12 determines the position and direction of remote vehicles 14 relative to the host vehicle 10, based on the known position, direction and speed, for example, of the host vehicle 10 and the known position, direction and/or speed, for example, of each of the remote vehicles 14, the system 12 can determine whether the remote vehicle 14 is in adjacent lane to the host vehicle 10 is behind the host vehicle 10 or ahead of the host vehicle 10. The equations are defined as follows.

Remote Vehicle Position Relative to Host Vehicle (Longitudinal and Lateral Position)

Q1: remote vehicle 14 is to the Northeast of the host vehicle 10

$$Q_1 = \frac{1}{4}\left[\frac{\phi_{RV} - \phi_{HV} - \sigma}{|\phi_{RV} - \phi_{HV}| + \sigma} + 1\right] \times \left[\frac{\theta_{RV} - \theta_{HV} + \sigma}{|\theta_{RV} - \theta_{HV}| + \sigma} + 1\right]$$

Figure 7:
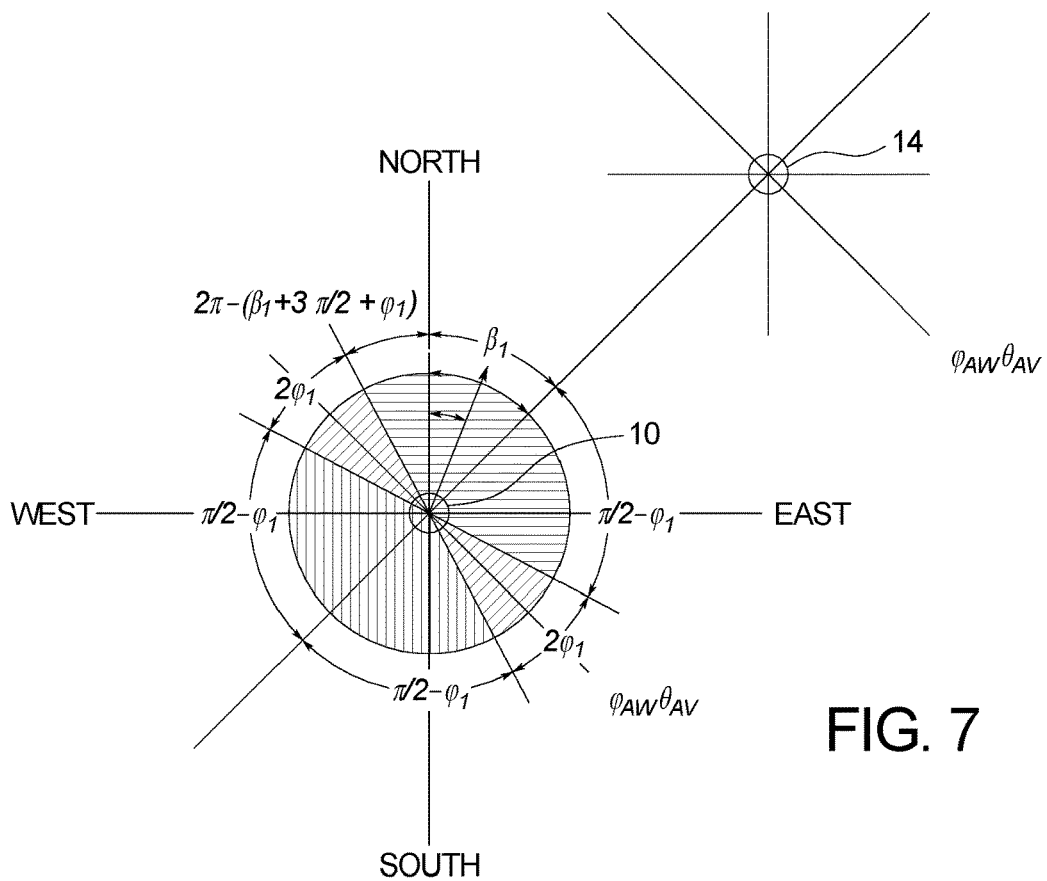
FIG. 7 illustrates a step the vehicle occupant warning system of FIG. 2 uses in determination of the remote vehicle position when the remote vehicle is to the northeast of the host vehicle.
Figure 8:
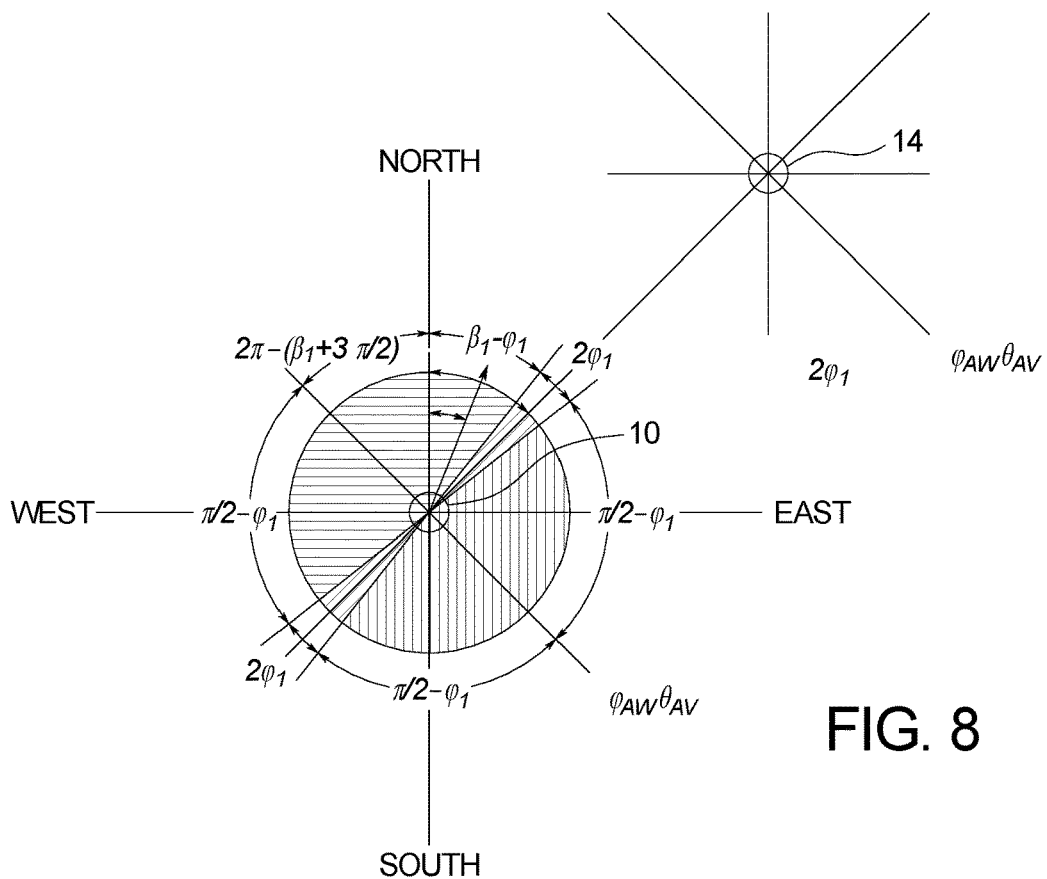
FIG. 8 illustrates a step the vehicle occupant warning system of FIG. 2 uses in determination of the remote vehicle position when the remote vehicle is to the northeast of the host vehicle.

If the remote vehicle 14 is northeast of the host vehicle 10, as shown in FIGS. 7 and 8, both latitude and longitude for the remote vehicle 14 is greater than the latitude and longitude for the host vehicle 10. Under these conditions, the expression for $Q_1$ above will equal 1 otherwise it will equal 0.

Longitudinal Position (XW)

The remote vehicle 14 is ahead (XW=00) of the host vehicle 10 if:

$0 \leq \delta_{HV} < A_1$ or $A_2 \leq \delta_{HV} < 2\pi$

Where:
$A_1 = \beta_1 + \pi/2 - \varphi_1$
$A_4 = \beta_1 + 3\pi/2 + \varphi_1$
$\varphi_1$ is a threshold value that defines the angular range in which the remote vehicle 14 is defined to be adjacent to the host vehicle 10

$$\beta_1 = \pi\left[\frac{\theta_{HV} - \theta_{RV} - \sigma}{|\theta_{HV} - \theta_{RV}| + \sigma} + 1\right] -$$
$$\cos^{-1}\left(\frac{(\phi_{RV} - \phi_{HV})}{\sqrt{(\theta_{RV} - \theta_{HV})^2 \cos^2\phi_{HV} + (\phi_{RV} - \phi_{HV})^2}}\right)\left[\frac{\theta_{HV} - \theta_{RV} - \sigma}{|\theta_{HV} - \theta_{RV}| + \sigma}\right]$$

This region is identified as the horizontal cross hatching area in FIG. 7. These conditions can be defined in one mathematical expression as:

$$P_{Q_1} = \frac{1}{4}\left[\frac{\delta_{HV} - 0 + \sigma}{|\delta_{HV} - 0| + \sigma} + 1\right] \times \left[\frac{A_1 - \delta_{HV} - \sigma}{|A_1 - \delta_{HV}| + \sigma} + 1\right] +$$

$$\frac{1}{4}\left[\frac{\delta_{HV} - A_4 + \sigma}{|\delta_{HV} - A_4| + \sigma} + 1\right] \times \left[\frac{2\pi - \delta_{HV} - \sigma}{|2\pi - \delta_{HV}| + \sigma} + 1\right]$$

The remote vehicle 14 is adjacent (XW=01) to the host vehicle 10 if:

$A_1 \leq \delta_{HV} < A_2$ or $A_3 \leq \delta_{HV} < A_4$

Where:
$A_1 = \beta_1 + \pi/2 - \varphi_1$
$A_2 = \beta_1 + \pi/2 + \varphi_1$
$A_3 = \beta_1 + \pi/2 - -\varphi_1$
$A_4 = \beta_1 + 3\pi/2 + \varphi_1$ These two specific angular ranges are identified as the interface between the vertical cross hatching area and horizontal cross hatching area in FIG. 7. These conditions can be defined in one mathematical expression as:

$$A_{Q_1} = \frac{1}{4}\left[\frac{\delta_{HV} - A_1 + \sigma}{|\delta_{HV} - A_1| + \sigma} + 1\right] \times \left[\frac{A_2 - \delta_{HV} - \sigma}{|A_2 - \delta_{HV}| + \sigma} + 1\right] +$$

$$\frac{1}{4}\left[\frac{\delta_{HV} - A_3 + \sigma}{|\delta_{HV} - A_3| + \sigma} + 1\right] \times \left[\frac{A_4 - \delta_{HV} - \sigma}{|A_4 - \delta_{HV}| + \sigma} + 1\right]$$

The remote vehicle 14 is behind (XW=10) the host vehicle 10 if:

$A_2 \leq \delta_{HV} < A_3$

Where:
$A_2 = \beta_1 + \pi/2 + \varphi_1$
$A_3 = \beta_1 + 3\pi/2 - \varphi_1$

This region is identified as the vertical cross hatching area in FIG. 7. These conditions can be defined in one mathematical expression as:

$$B_{Q_1} = \frac{1}{4}\left[\frac{\delta_{HV} - A_2 + \sigma}{|\delta_{HV} - A_2| + \sigma} + 1\right] \times \left[\frac{A_3 - \delta_{HV} - \sigma}{|A_3 - \delta_{HV}| + \sigma} + 1\right]$$

Lateral Position (VU)

The remote vehicle 14 is in lane (VU=00) with the host vehicle 10 if:

$A_5 \leq \delta_{HV} < A_6$ or $A_7 \leq \delta_{HV} < A_8$

Where:
$A_5 = \beta_1 - \varphi_2$
$A_6 = \beta_1 + \varphi_2$
$A_7 = \beta_1 + \pi - \varphi_2$
$A_8 = \beta_1 + \pi + \varphi_2$ $\varphi_2$ is a threshold value that defines the angular range in which the remote vehicle 14 is defined to be in the same lane with the host vehicle 10.

These two specific angular ranges are identified as the interface between the horizontal cross-sectional area and vertical cross-sectional area in FIG. 8. These conditions can be defined in one mathematical expression as:

$$I_{Q_1} = \frac{1}{4}\left[\frac{\delta_{HV} - A_5 + \sigma}{|\delta_{HV} - A_5| + \sigma} + 1\right] \times \left[\frac{A_6 - \delta_{HV} - \sigma}{|A_6 - \delta_{HV}| + \sigma} + 1\right] +$$

$$\frac{1}{4}\left[\frac{\delta_{HV} - A_7 + \sigma}{|\delta_{HV} - A_8| + \sigma} + 1\right] \times \left[\frac{A_8 - \delta_{HV} - \sigma}{|A_8 - \delta_{HV}| + \sigma} + 1\right]$$

The remote vehicle 14 is to the left (VU=01) of the host vehicle 10 if:

$A_6 \leq \delta_{HV} < A_7$

Where:
$A_6=\beta_1+\varphi_2$
$A_7=\beta_1+\pi+\varphi_2$

This region is identified as the vertical cross-sectional area in FIG. 8. These conditions can be defined in one mathematical expression as:

$$L_{Q_1} = \frac{1}{4}\left[\frac{\delta_{HV} - A_6 + \sigma}{|\delta_{HV} - A_6| + \sigma} + 1\right] \times \left[\frac{A_7 - \delta_{HV} - \sigma}{|A_7 - \delta_{HV}| + \sigma} + 1\right]$$

The remote vehicle 14 is to the right (VU=10) of the host vehicle 10 if:

$0 \leq \delta_{HV} < A_5$ or $A_8 \leq \delta_{HV} < 2\pi$

Where:
$A_5=\beta_1-\varphi_2$
$A_8=\beta_1+\pi+\varphi_2$

This region is identified as the horizontal cross-sectional area in FIG. 8. These conditions can be defined in one mathematical expression as:

$$R_{Q_1} = \frac{1}{4}\left[\frac{\delta_{HV} - 0 + \sigma}{|\delta_{HV} - 0| + \sigma} + 1\right] \times \left[\frac{A_5 - \delta_{HV} - \sigma}{|A_5 - \delta_{HV}| + \sigma} + 1\right] + \frac{1}{4}\left[\frac{\delta_{HV} - A_8 + \sigma}{|\delta_{HV} - A_8| + \sigma} + 1\right] \times \left[\frac{2\pi - \delta_{HV} - \sigma}{|2\pi - \delta_{HV}| + \sigma} + 1\right]$$

The expressions are then consolidated in Table 1 for the case when the remote vehicle 14 is to the northeast of the host vehicle 10.

TABLE 1

| $Q_1$ | | Lateral Position | | | |
|---|---|---|---|---|---|
| | | Remote vehicle in lane ($I_{Q_1}$) | Remote vehicle Left ($L_{Q_1}$) | Remote vehicle Right ($R_{Q_1}$) | Unused |
| Longitudinal Position | Remote vehicle Ahead ($P_{Q_1}$) | $Q_1 \times P_{Q_1} \times I_{Q_1}$ | $Q_1 \times P_{Q_1} \times L_{Q_1}$ | $Q_1 \times P_{Q_1} \times R_{Q_1}$ | 0 |
| | Remote vehicle Adjacent ($A_{Q_1}$) | $Q_1 \times A_{Q_1} \times I_{Q_1}$ | $Q_1 \times A_{Q_1} \times L_{Q_1}$ | $Q_1 \times A_{Q_1} \times R_{Q_1}$ | 0 |
| | Remote vehicle Behind ($B_{Q_1}$) | $Q_1 \times B_{Q_1} \times I_{Q_1}$ | $Q_1 \times B_{Q_1} \times L_{Q_1}$ | $Q_1 \times B_{Q_1} \times R_{Q_1}$ | 0 |
| | Unused | 0 | 0 | 0 | 0 |

Q2: Remote Vehicle is to the Northwest of the Host Vehicle $$Q_2 = \frac{1}{4}\left[\frac{\phi_{RV} - \phi_{HV} + \sigma}{|\phi_{RV} - \phi_{HV}| + \sigma} + 1\right] \times \left[\frac{\theta_{HV} - \theta_{RV} - \sigma}{|\theta_{HV} - \theta_{RV}| + \sigma} + 1\right]$$

Figure 9:
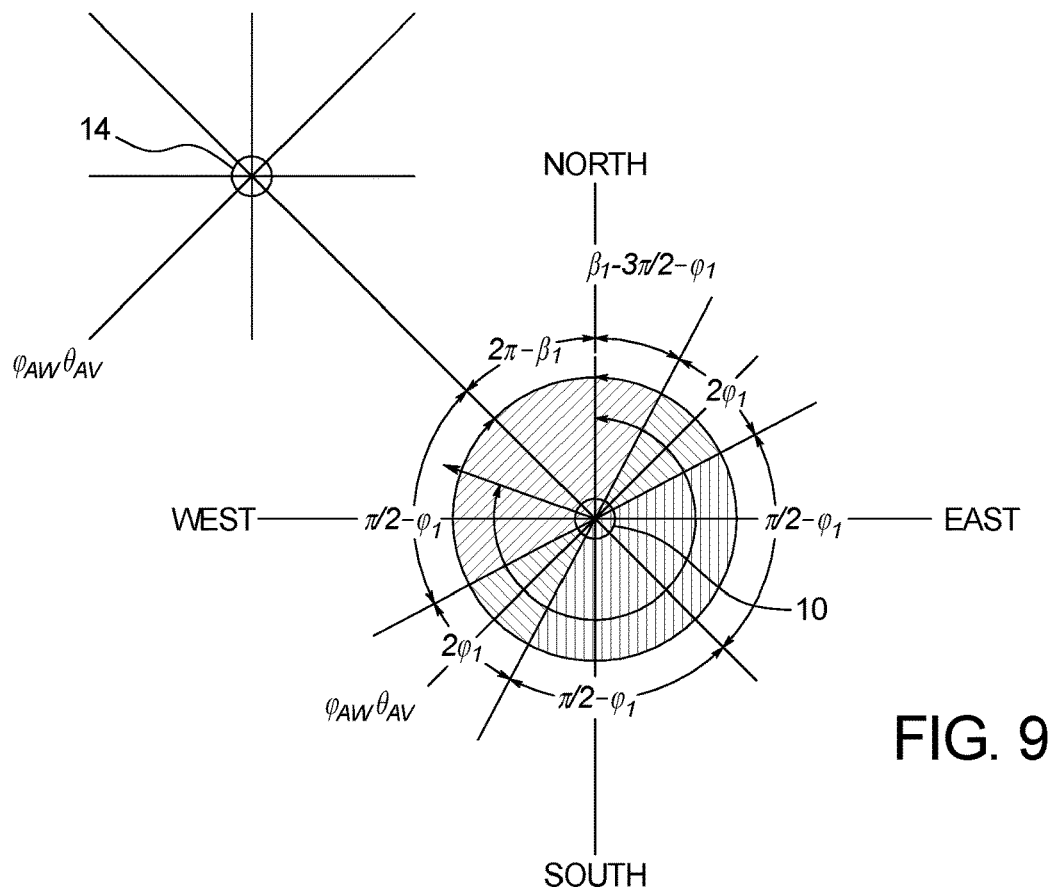
FIG. 9 illustrates a step the vehicle occupant warning system of FIG. 2 uses in determination of the remote vehicle position when the remote vehicle is to the northwest of the host vehicle.
Figure 10:
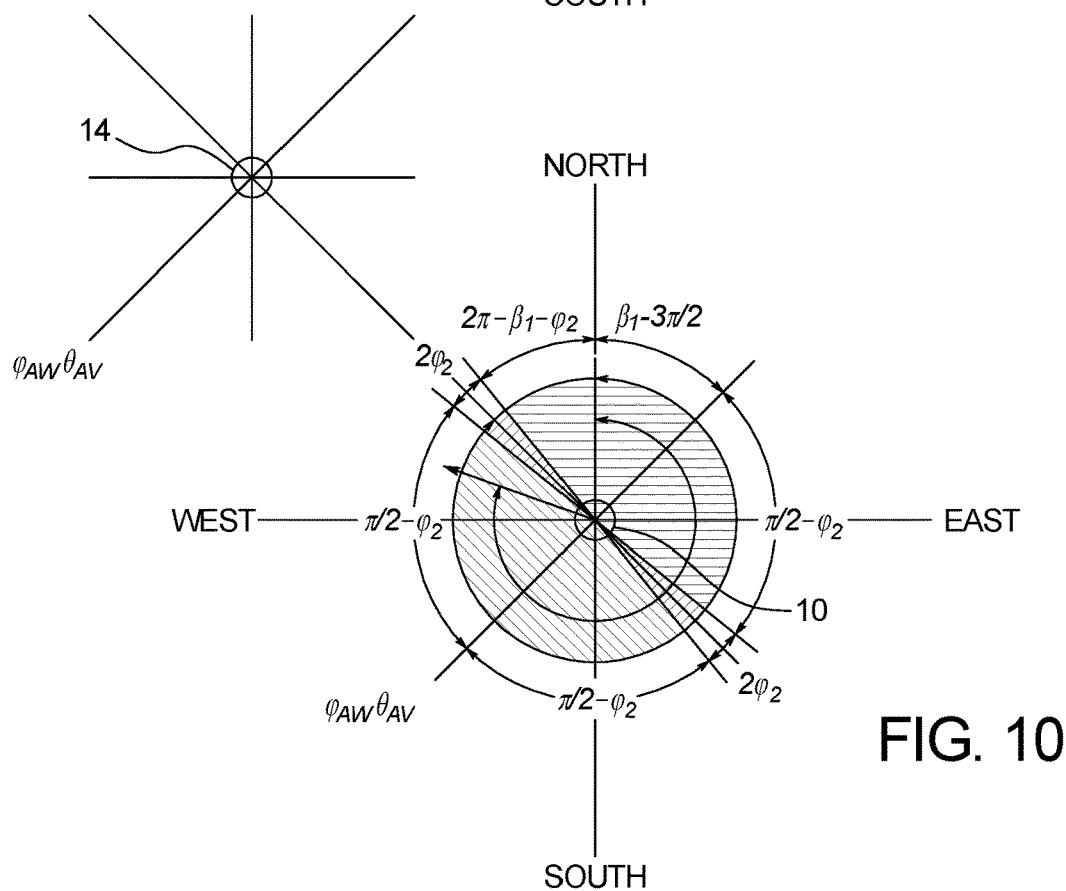
FIG. 10 illustrates a step the vehicle occupant warning system of FIG. 2 uses in determination of the remote vehicle position when the remote vehicle is to the northwest of the host vehicle.

If the remote vehicle 14 is northwest of the Host vehicle 10 as shown in FIGS. 9 and 10, the latitude for the remote vehicle 14 is greater than the latitude of the host vehicle 10 but the longitude for the remote vehicle 14 is less than the longitude for the host vehicle 10. Under these conditions, the expression for $Q_2$ above will equal 1 otherwise it will equal 0.

Longitudinal Position (XW)

The remote vehicle 14 is ahead (XW=00) of the host vehicle 10 if:

$0 \leq \delta_{HV} < A_9$ or $A_{12} \leq \delta_{HV} < 2\pi$

Where:
$A_9=\beta_1-3\pi/2-\varphi_1$
$A_{12}=\beta_1-\pi/2+\varphi_1$
$\varphi_1$ is a threshold value that defines the angular range in which the remote vehicle 14 is defined to be adjacent to the host vehicle 10.

$$\beta_1 = \pi\left[\frac{\theta_{HV} - \theta_{RV} - \sigma}{|\theta_{HV} - \theta_{RV}| + \sigma} + 1\right] - \cos^{-1}\left(\frac{(\phi_{RV} - \phi_{HV})}{\sqrt{(\theta_{RV} - \theta_{HV})^2\cos^2\phi_{HV} + (\phi_{RV} - \phi_{HV})^2}}\right)\left[\frac{\theta_{HV} - \theta_{RV} - \sigma}{|\theta_{HV} - \theta_{RV}| + \sigma}\right]$$

This region is identified as the diagonal (from upper right to lower left) sectional area in FIG. 9. These conditions can be defined in one mathematical expression as:

$$P_{Q_2} = \frac{1}{4}\left[\frac{\delta_{HV} - 0 + \sigma}{|\delta_{HV} - 0| + \sigma} + 1\right] \times \left[\frac{A_9 - \delta_{HV} - \sigma}{|A_9 - \delta_{HV}| + \sigma} + 1\right] + \frac{1}{4}\left[\frac{\delta_{HV} - A_{12} + \sigma}{|\delta_{HV} - A_{12}| + \sigma} + 1\right] \times \left[\frac{2\pi - \delta_{HV} - \sigma}{|2\pi - \delta_{HV}| + \sigma} + 1\right]$$

The remote vehicle 14 is adjacent (XW=01) to the host vehicle 10 if:

$A_9 \leq \delta_{HV} < A_{10}$ or $A_{11} \leq \delta_{HV} < A_{12}$

Where:
$A_9=\beta_1-3\pi/2-\varphi_1$
$A_{10}=\beta_1-3\pi/2+\varphi_1$
$A_{11}=\beta_1-\pi/2-\varphi_1$
$A_{12}\beta_1-\pi/2+\varphi_1$ These two specific angular ranges are identified as the interface between the vertical cross-sectional area and the diagonal (from upper right to lower left) cross sectional area in FIG. 9. These conditions can be defined in one mathematical expression as:

$$A_{Q_2} = \frac{1}{4}\left[\frac{\delta_{HV} - A_9 + \sigma}{|\delta_{HV} - A_9| + \sigma} + 1\right] \times \left[\frac{A_{10} - \delta_{HV} - \sigma}{|A_{10} - \delta_{HV}| + \sigma} + 1\right] + \frac{1}{4}\left[\frac{\delta_{HV} - A_{11} + \sigma}{|\delta_{HV} - A_{11}| + \sigma} + 1\right] \times \left[\frac{A_{12} - \delta_{HV} - \sigma}{|A_{12} - \delta_{HV}| + \sigma} + 1\right]$$

The remote vehicle 14 is behind (XW=10) the host vehicle 10 if:

$A_{10} \leq \delta_{HV} < A_{11}$

Where:
$A_{10}=\beta_1-3\pi/2+\varphi_1$
$A_{11}=\beta_1-\pi/2-\varphi_1$

This region is identified as the vertical cross-sectional area in FIG. 9. These conditions can be defined in one mathematical expression as:

$$B_{Q_2} = \frac{1}{4}\left[\frac{\delta_{HV} - A_{10} + \sigma}{|\delta_{HV} - A_{10}| + \sigma} + 1\right] \times \left[\frac{A_{11} - \delta_{HV} - \sigma}{|A_{11} - \delta_{HV}| + \sigma} + 1\right]$$

Lateral Position (VU)

The remote vehicle 14 is in lane (VU=00) with the host vehicle 10 if:

$$A_{13} \leq \delta_{HV} < A_{14} \text{ or } A_{15} \leq \delta_{HV} < A_{16}$$

Where:
$A_{13} = \beta_1 - \pi - \varphi_2$
$A_{14} = \beta_1 - \pi + \varphi_2$
$A_{15} = \beta_1 - \varphi_2$
$A_{16} = \beta_1 + \varphi_2$ $\varphi_2$ is a threshold value that defines the angular range in which the remote vehicle 14 is defined to be in the same lane with the host vehicle 10.

These two specific angular ranges are identified as the interface between the horizontal cross sectional area and the diagonal (from upper left to lower right) sectional area in FIG. 10. These conditions can be defined in one mathematical expression as:

$$I_{Q_2} = \frac{1}{4}\left[\frac{\delta_{HV} - A_{13} + \sigma}{|\delta_{HV} - A_{13}| + \sigma} + 1\right] \times \left[\frac{A_{14} - \delta_{HV} - \sigma}{|A_{14} - \delta_{HV}| + \sigma} + 1\right] + \frac{1}{4}\left[\frac{\delta_{HV} - A_{15} + \sigma}{|\delta_{HV} - A_{15}| + \sigma} + 1\right] \times \left[\frac{A_{16} - \delta_{HV} - \sigma}{|A_{16} - \delta_{HV}| + \sigma} + 1\right]$$

The remote vehicle 14 is to the left (VU=01) of the host vehicle 10 if:

$$0 \leq \delta_{HV} < A_{13} \text{ or } A_{16} \leq \delta_{HV} < 2\pi$$

Where:
$A_{13} = \beta_1 - \pi - \varphi_2$
$A_{16} = \beta_1 + \varphi_2$

This region is identified as the blue shaded area in the illustration on the right side of FIG. 2. These conditions can be defined in one mathematical expression as:

$$L_{Q_2} = \frac{1}{4}\left[\frac{\delta_{HV} - 0 + \sigma}{|\delta_{HV} - 0| + \sigma} + 1\right] \times \left[\frac{A_{13} - \delta_{HV} - \sigma}{|A_{13} - \delta_{HV}| + \sigma} + 1\right] + \frac{1}{4}\left[\frac{\delta_{HV} - A_{16} + \sigma}{|\delta_{HV} - A_{16}| + \sigma} + 1\right] \times \left[\frac{2\pi - \delta_{HV} - \sigma}{|2\pi - \delta_{HV}| + \sigma} + 1\right]$$

The remote vehicle 14 is to the right (VU=10) of the host vehicle 10 if:

$$A_{14} \leq \delta_{HV} < A_{15}$$

Where:
$A_{14} = \beta_1 - \pi + \varphi_2$
$A_{15} = \beta_1 - \varphi_2$

This region is identified as the diagonal (from upper left to lower right) sectional area in FIG. 10. These conditions can be defined in one mathematical expression as:

$$R_{Q_2} = \frac{1}{4}\left[\frac{\delta_{HV} - A_{14} + \sigma}{|\delta_{HV} - A_{14}| + \sigma} + 1\right] \times \left[\frac{A_{15} - \delta_{HV} - \sigma}{|A_{15} - \delta_{HV}| + \sigma} + 1\right]$$

The expressions are then consolidated in Table 2 for the case when the remote vehicle 14 is to the northwest of the host vehicle 10.

TABLE 2

| $Q_2$ | | Lateral Position | | | |
|---|---|---|---|---|---|
| | | Remote vehicle in lane ($I_{Q_2}$) | Remote vehicle Left ($L_{Q_2}$) | Remote vehicle Right ($R_{Q_2}$) | Unused |
| Longitudinal Position | Remote vehicle Ahead ($P_{Q_2}$) | $Q_2 \times P_{Q_2} \times I_{Q_2}$ | $Q_2 \times P_{Q_2} \times L_{Q_2}$ | $Q_2 \times P_{Q_2} \times R_{Q_2}$ | 0 |
| | Remote vehicle Adjacent ($A_{Q_2}$) | $Q_2 \times A_{Q_2} \times I_{Q_2}$ | $Q_2 \times A_{Q_2} \times L_{Q_2}$ | $Q_2 \times A_{Q_2} \times R_{Q_2}$ | 0 |
| | Remote vehicle Behind ($B_{Q_2}$) | $Q_2 \times B_{Q_2} \times I_{Q_2}$ | $Q_2 \times B_{Q_2} \times L_{Q_2}$ | $Q_2 \times B_{Q_2} \times R_{Q_2}$ | 0 |
| | Unused | 0 | 0 | 0 | 0 |

Q3: Remote Vehicle is to the Southwest of the Host Vehicle $$Q_3 = \frac{1}{4}\left[\frac{\phi_{HV} - \phi_{RV} - \sigma}{|\phi_{HV} - \phi_{RV}| + \sigma} + 1\right] \times \left[\frac{\theta_{HV} - \theta_{RV} + \sigma}{|\theta_{HV} - \theta_{RV}| + \sigma} + 1\right]$$

Figure 11:
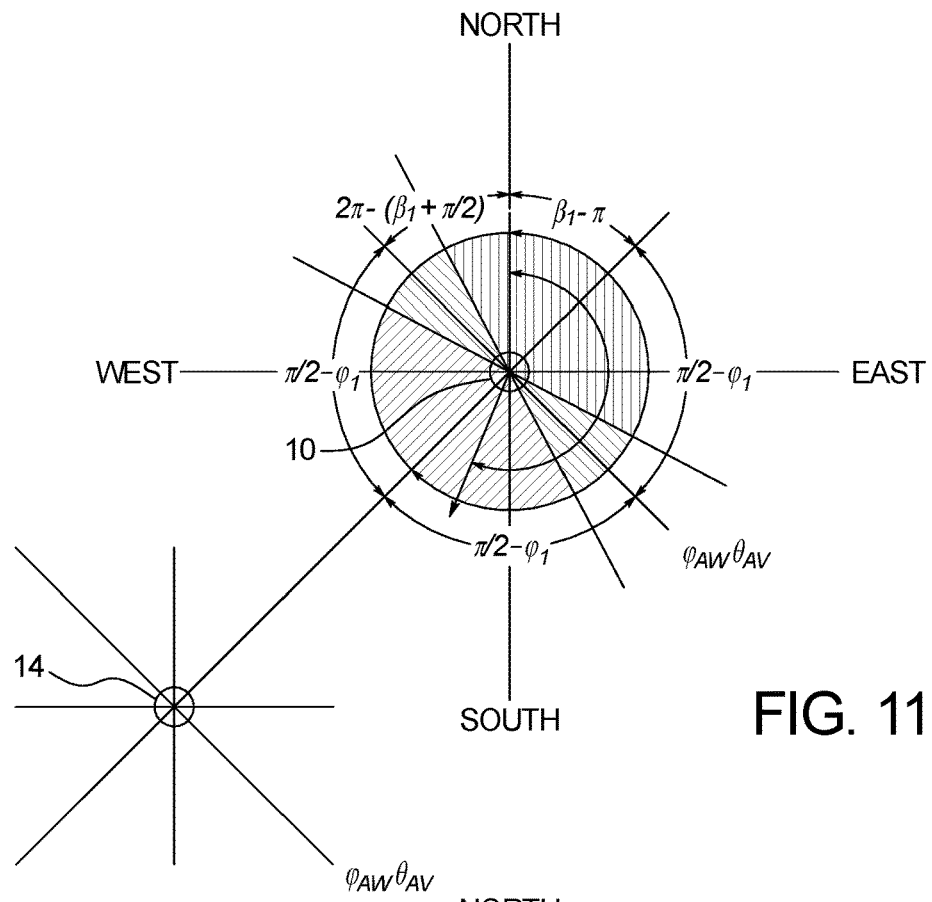
FIG. 11 illustrates a step the vehicle occupant warning system of FIG. 2 uses in determination of the remote vehicle position when the remote vehicle is to the southwest of the host vehicle.
Figure 12:
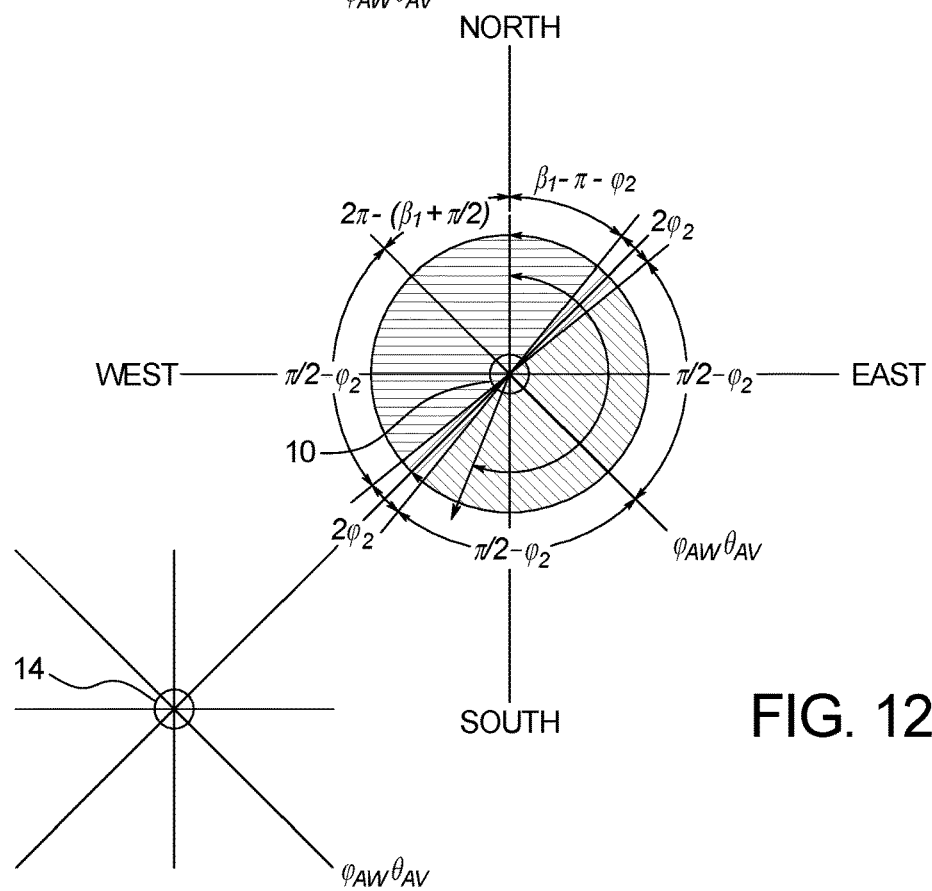
FIG. 12 illustrates a step the vehicle occupant warning system of FIG. 2 uses in determination of the remote vehicle position when the remote vehicle is to the southwest of the host vehicle.

If the remote vehicle 14 is southwest of the host vehicle 10 as shown in FIGS. 11 and 12, both latitude and longitude for the remote vehicle 14 is less than the latitude and longitude for the host vehicle 10. Under these conditions, the expression for $Q_3$ above will equal 1 otherwise it will equal 0.

Longitudinal Position (XW)

The remote vehicle 14 is ahead (XW=00) of the host vehicle 10 if:

$$A_{12} \leq \delta_{HV} < A_1$$

Where:
$A_{12} = \beta_1 - \pi/2 + \varphi_1$
$A_1 = \beta_1 + \pi/2 - \varphi_1$ $\varphi_1$ is a threshold value that defines the angular range in which the remote vehicle 14 is defined to be adjacent to the host vehicle 10

$$\beta_1 = \pi\left[\frac{\theta_{HV} - \theta_{RV} - \sigma}{|\theta_{HV} - \theta_{RV}| + \sigma} + 1\right] - \cos^{-1}\left(\frac{(\phi_{RV} - \phi_{HV})}{\sqrt{(\theta_{RV} - \theta_{HV})^2 \cos^2 \phi_{HV} + (\phi_{RV} - \phi_{HV})^2}}\right)\left[\frac{\theta_{HV} - \theta_{RV} - \sigma}{|\theta_{HV} - \theta_{RV}| + \sigma}\right]$$

This region is identified as the diagonal (upper right to lower left) cross sectional area in FIG. 11. These conditions can be defined in one mathematical expression as:

$$P_{Q_3} = \frac{1}{4}\left[\frac{\delta_{HV} - A_{12} + \sigma}{|\delta_{HV} - A_{12}| + \sigma} + 1\right] \times \left[\frac{A_1 - \delta_{HV} - \sigma}{|A_1 - \delta_{HV}| + \sigma} + 1\right]$$

The remote vehicle 14 is adjacent (XW=01) to the host vehicle 10 if:

$A_1 \leq \delta_{HV} < A_2$ or $A_{11} \leq \delta_{HV} < A_{12}$

Where:
$A_1 = \beta_1 + \pi/2 - \varphi_1$
$A_2 = \beta_1 + \pi/2 + \varphi_1$
$A_{11} = \beta_1 - \pi/2 - \varphi_1$
$A_{12} = \beta_1 - \pi/2 + \varphi_1$ These two specific angular ranges are identified as the interface between the vertical cross-sectional area and the diagonal (upper right to lower left) cross sectional area in FIG. 11. These conditions can be defined in one mathematical expression as:

$$A_{Q_3} = \frac{1}{4}\left[\frac{\delta_{HV} - A_1 + \sigma}{|\delta_{HV} - A_1| + \sigma} + 1\right] \times \left[\frac{A_2 - \delta_{HV} - \sigma}{|A_2 - \delta_{HV}| + \sigma} + 1\right] + \frac{1}{4}\left[\frac{\delta_{HV} - A_{11} + \sigma}{|\delta_{HV} - A_{11}| + \sigma} + 1\right] \times \left[\frac{A_{12} - \delta_{HV} - \sigma}{|A_{12} - \delta_{HV}| + \sigma} + 1\right]$$

The remote vehicle 14 is behind (XW=10) the host vehicle 10 if:

$0 \leq \delta_{HV} < A_{11}$ or $A_2 \leq \delta_{HV} < 2\pi$

Where:
$A_2 = \beta_1 + \pi/2 + \varphi_1$
$A_{11} = \beta_1 - \pi/2 - \varphi_1$ This region is identified as the vertical cross-sectional area in FIG. 11. These conditions can be defined in one mathematical expression as:

$$B_{Q_3} = \frac{1}{4}\left[\frac{\delta_{HV} - 0 + \sigma}{|\delta_{HV} - 0| + \sigma} + 1\right] \times \left[\frac{A_{11} - \delta_{HV} - \sigma}{|A_{11} - \delta_{HV}| + \sigma} + 1\right] + \frac{1}{4}\left[\frac{\delta_{HV} - A_2 + \sigma}{|\delta_{HV} - A_2| + \sigma} + 1\right] \times \left[\frac{2\pi - \delta_{HV} - \sigma}{|2\pi - \delta_{HV}| + \sigma} + 1\right]$$

Lateral Position (VU)

The remote vehicle 14 is in lane (VU=00) with the host vehicle 10 if:

$A_{13} \leq \delta_{HV} < A_{14}$ or $A_{15} \leq \delta_{HV} < A_{16}$

Where:
$A_{13} = \beta_1 - \pi - \varphi_2$
$A_{14} = \beta_1 - \pi + \varphi_2$
$A_{15} = \beta_1 + \varphi_2$
$A_{16} = \beta_1 + \varphi_2$ $\varphi_2$ is a threshold value that defines the angular range in which the remote vehicle 14 is defined to be in the same lane with the host vehicle 10

These two specific angular ranges are identified as the interface between the diagonal (upper left to lower right) cross sectional area and the horizontal area in FIG. 12. These conditions can be defined in one mathematical expression as:

$$I_{Q_3} = \frac{1}{4}\left[\frac{\delta_{HV} - A_{13} + \sigma}{|\delta_{HV} - A_{13}| + \sigma} + 1\right] \times \left[\frac{A_{14} - \delta_{HV} - \sigma}{|A_{14} - \delta_{HV}| + \sigma} + 1\right] + \frac{1}{4}\left[\frac{\delta_{HV} - A_{15} + \sigma}{|\delta_{HV} - A_{15}| + \sigma} + 1\right] \times \left[\frac{A_{16} - \delta_{HV} - \sigma}{|A_{16} - \delta_{HV}| + \sigma} + 1\right]$$

The remote vehicle 14 is to the left (VU=01) of the host vehicle 10 if:

$0 \leq \delta_{HV} < A_{13}$ or $A_{16} \leq \delta_{HV} < 2\pi$ $A_{13} = \beta_1 - \pi - \varphi_2$
$A_{16} = \beta_1 + \varphi_2$ This region is identified as the horizontal area in FIG. 12. These conditions can be defined in one mathematical expression as:

$$L_{Q_3} = \frac{1}{4}\left[\frac{\delta_{HV} - 0 + \sigma}{|\delta_{HV} - 0| + \sigma} + 1\right] \times \left[\frac{A_{13} - \delta_{HV} - \sigma}{|A_{13} - \delta_{HV}| + \sigma} + 1\right] + \frac{1}{4}\left[\frac{\delta_{HV} - A_{16} + \sigma}{|\delta_{HV} - A_{16}| + \sigma} + 1\right] \times \left[\frac{2\pi - \delta_{HV} - \sigma}{|2\pi - \delta_{HV}| + \sigma} + 1\right]$$

The remote vehicle 14 is to the right (VU=10) of the host vehicle 10 if:

$A_{14} \leq \delta_{HV} < A_{15}$

Where:
$A_{14} = \beta_1 - \pi + \varphi_2$
$A_{15} = \beta_1 - \varphi_2$

This region is identified as the diagonal (upper left to lower right) cross sectional area in FIG. 12. These conditions can be defined in one mathematical expression as:

$$R_{Q_3} = \frac{1}{4}\left[\frac{\delta_{HV} - A_{14} + \sigma}{|\delta_{HV} - A_{14}| + \sigma} + 1\right] \times \left[\frac{A_{15} - \delta_{HV} - \sigma}{|A_{15} - \delta_{HV}| + \sigma} + 1\right]$$

The expressions are then consolidated in Table 3 for the case when the remote vehicle 14 is to the southwest of the host vehicle 10.

TABLE 3

| $Q_3$ | | Lateral Position | | | |
|---|---|---|---|---|---|
| | | Remote vehicle in lane ($I_{Q_3}$) | Remote vehicle Left ($L_{Q_3}$) | Remote vehicle Right ($R_{Q_3}$) | Unused |
| Longitudinal Position | Remote vehicle Ahead ($P_{Q_3}$) | $Q_3 \times P_{Q_3} \times I_{Q_3}$ | $Q_3 \times P_{Q_3} \times L_{Q_3}$ | $Q_3 \times P_{Q_3} \times R_{Q_3}$ | 0 |
| | Remote vehicle Adjacent ($A_{Q_3}$) | $Q_3 \times A_{Q_3} \times I_{Q_3}$ | $Q_3 \times A_{Q_3} \times L_{Q_3}$ | $Q_3 \times A_{Q_3} \times R_{Q_3}$ | 0 |
| | Remote vehicle Behind ($B_{Q_3}$) | $Q_3 \times B_{Q_3} \times I_{Q_3}$ | $Q_3 \times B_{Q_3} \times L_{Q_3}$ | $Q_3 \times A_{Q_3} \times R_{Q_3}$ | 0 |
| | Unused | 0 | 0 | 0 | 0 |

Q4: Remote Vehicle is to the Southeast of the Host Vehicle $$Q_4 = \frac{1}{4}\left[\frac{\phi_{HV}-\phi_{RV}+\sigma}{|\phi_{HV}-\phi_{RV}|+\sigma}+1\right]\times\left[\frac{\theta_{RV}-\theta_{HV}-\sigma}{|\theta_{RV}-\theta_{HV}|+\sigma}+1\right]$$

Figure 13:
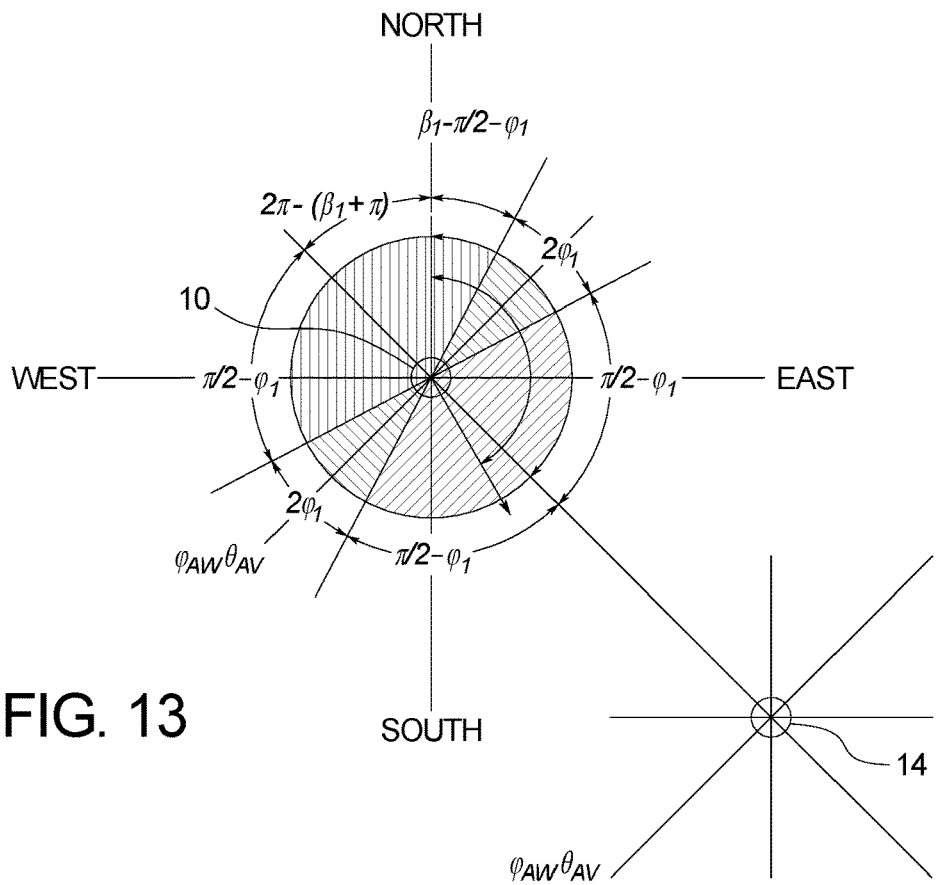
FIG. 13 illustrates a step the vehicle occupant warning system of FIG. 2 uses in determination of the remote vehicle position when the remote vehicle is to the southeast of the host vehicle.
Figure 14:
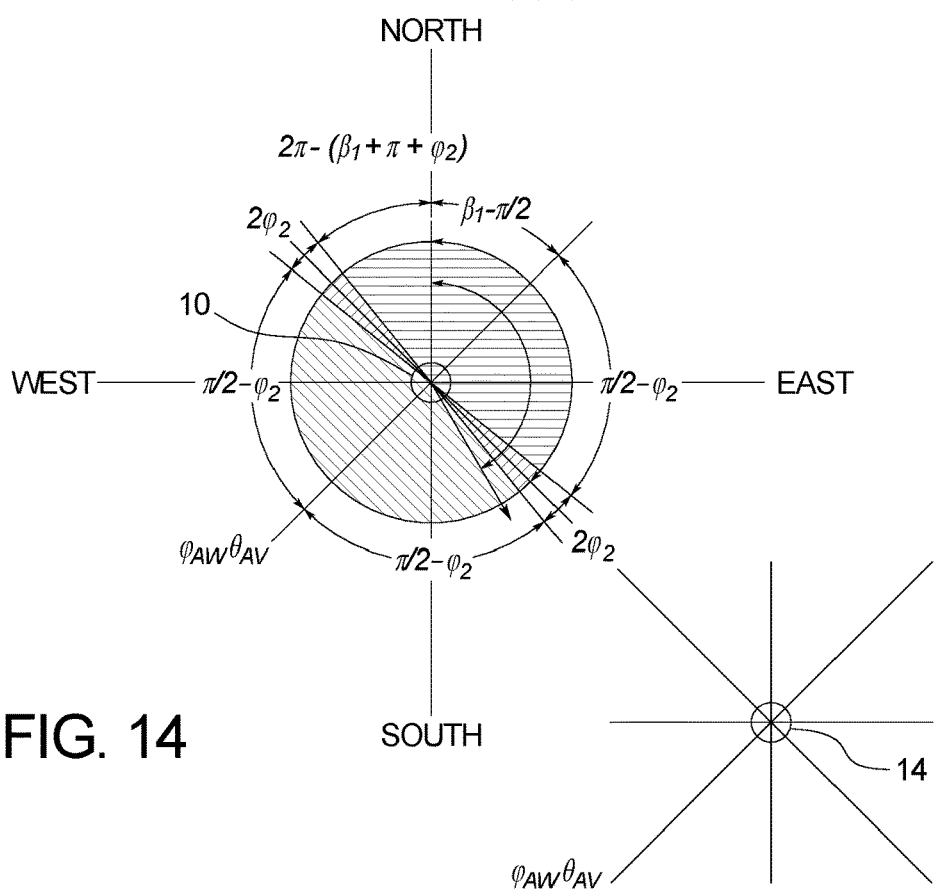
FIG. 14 illustrates a step the vehicle occupant warning system of FIG. 2 uses in determination of the remote vehicle position when the remote vehicle is to the southeast of the host vehicle.
Figure 15:
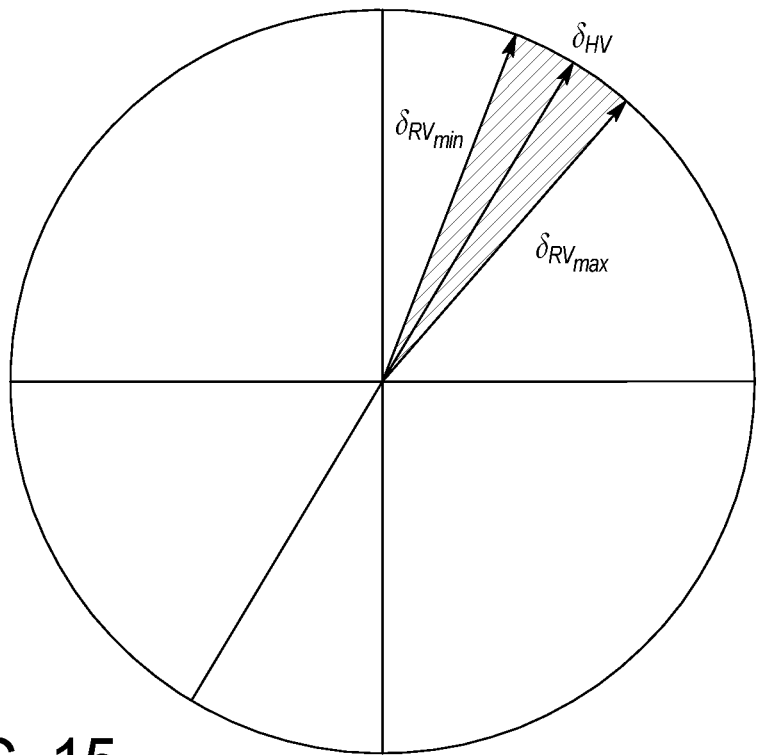
FIG. 15 illustrates the maximum remote vehicle heading angle when the remote vehicle is heading the same direction as the host vehicle.
Figure 16:
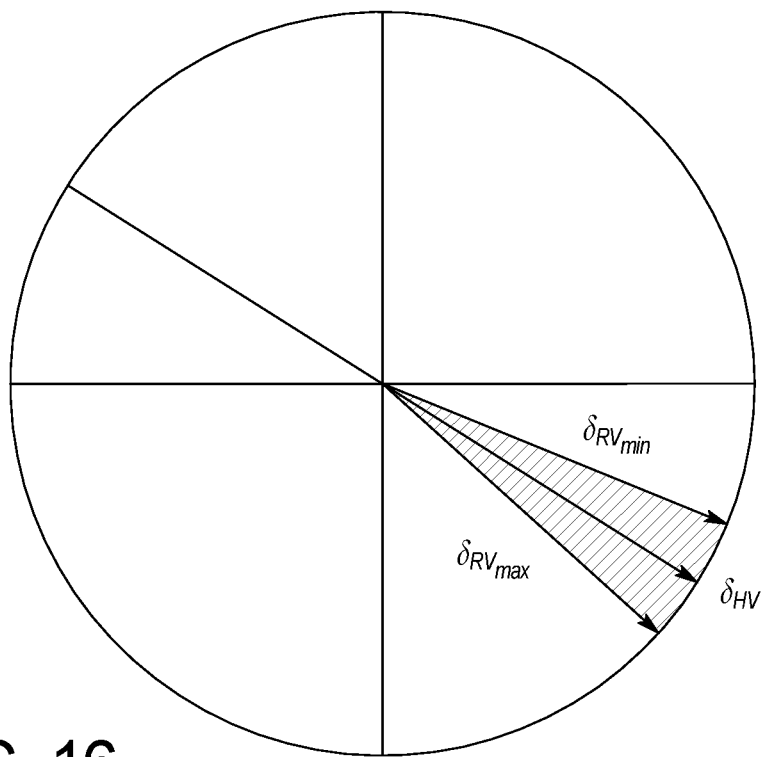
FIG. 16 illustrates the maximum remote vehicle heading angle when the remote vehicle is heading the same direction as the host vehicle.
Figure 17:
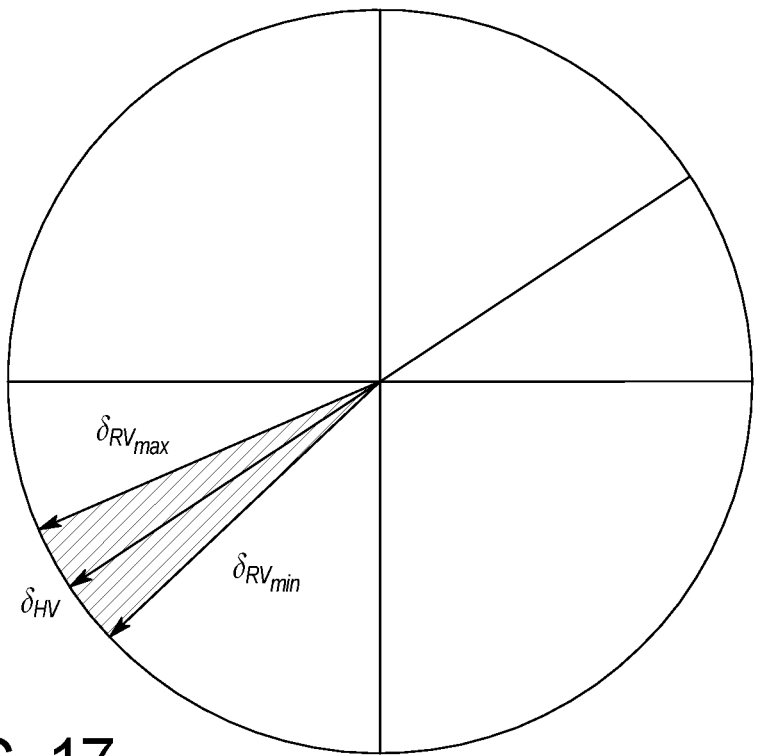
FIG. 17 illustrates the maximum remote vehicle heading angle when the remote vehicle is heading the same direction as the host vehicle.
Figure 18:
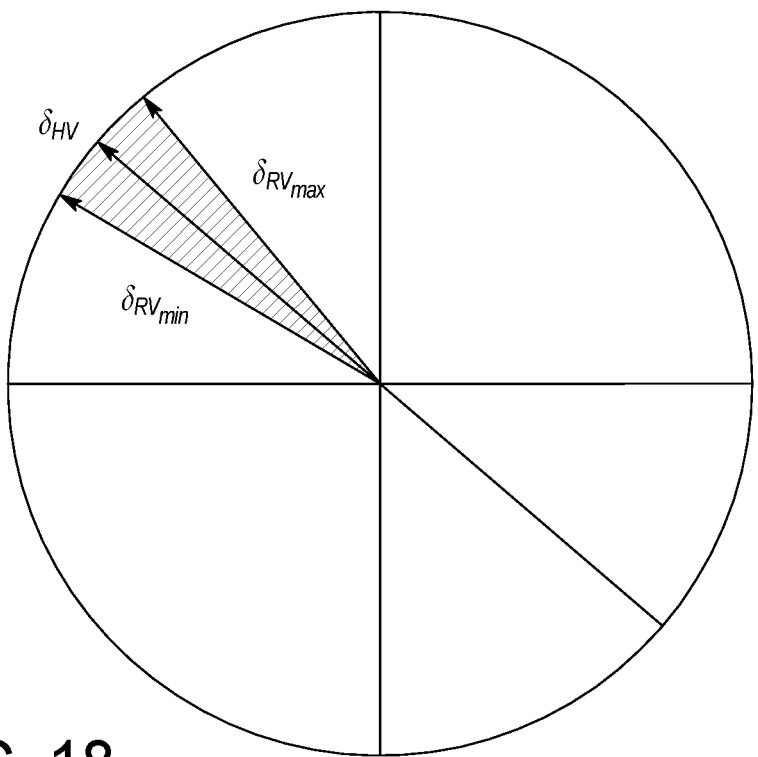
FIG. 18 illustrates the maximum remote vehicle heading angle when the remote vehicle is heading the same direction as the host vehicle.

If the remote vehicle 14 is southeast of the Host vehicle 10 as shown in FIGS. 13 and 14, the latitude for the remote vehicle 14 is less than the latitude of the host vehicle 10 but the longitude for the remote vehicle 14 is greater than the longitude for the host vehicle 10. Under these conditions, the expression for $Q_4$ above will equal 1 otherwise it will equal 0.

Longitudinal Position (XW)

The remote vehicle 14 is ahead (XW=00) of the host vehicle 10 if:

$$A_{12} \leq \delta_{HV} < A_1$$

Where:
$A_1 = \beta_1 + \pi/2 - \varphi_1$
$A_{12} = \beta_1 \pi/2 + \varphi_1$ $\varphi_1$ is a threshold value that defines the angular range in which the remote vehicle 14 is defined to be adjacent to the host vehicle 10

$$\beta_1 = \pi\left[\frac{\theta_{HV}-\theta_{RV}-\sigma}{|\theta_{HV}-\theta_{RV}|+\sigma}+1\right] - \cos^{-1}\left(\frac{(\phi_{RV}-\phi_{HV})}{\sqrt{(\theta_{RV}-\theta_{HV})^2\cos^2\phi_{HV}+(\phi_{RV}-\phi_{HV})^2}}\right)\left[\frac{\theta_{HV}-\theta_{RV}-\sigma}{|\theta_{HV}-\theta_{RV}|+\sigma}\right]$$

This region is identified as the diagonal (from upper right to lower left) cross sectional area in FIG. 13. These conditions can be defined in one mathematical expression as:

$$P_{Q4} = \frac{1}{4}\left[\frac{\delta_{HV}-A_{12}+\sigma}{|\delta_{HV}-A_{12}|+\sigma}+1\right]\times\left[\frac{A_1-\delta_{HV}-\sigma}{|A_1-\delta_{HV}|+\sigma}+1\right]$$

The remote vehicle 14 is adjacent (XW=01) to the host vehicle 10 if:

$$A_1 \leq \delta_{HV} < A_2 \text{ or } A_{11} \leq \delta_{HV} < A_{12}$$

Where:
$A_1 = \beta_1 + \pi/2 - \varphi_1$
$A_2 = \beta_1 + \pi/2 + \varphi_1$
$A_{11} = \beta_1 - \pi/2 - \varphi_1$
$A_{12} = \beta_1 - \pi/2 + \varphi_1$ These two specific angular ranges are identified as the interface between the vertical cross-sectional area and the diagonal (from upper right to lower left) cross sectional area in FIG. 13. These conditions can be defined in one mathematical expression as:

$$A_{Q4} = \frac{1}{4}\left[\frac{\delta_{HV}-A_1+\sigma}{|\delta_{HV}-A_1|+\sigma}+1\right]\times\left[\frac{A_2-\delta_{HV}-\sigma}{|A_2-\delta_{HV}|+\sigma}+1\right] + \frac{1}{4}\left[\frac{\delta_{HV}-A_{11}+\sigma}{|\delta_{HV}-A_{11}|+\sigma}+1\right]\times\left[\frac{A_{12}-\delta_{HV}-\sigma}{|A_{12}-\delta_{HV}|+\sigma}+1\right]$$

The remote vehicle 14 is behind (XW=10) the host vehicle 10 if:

$$A_2 \leq \delta_{HV} < 2\pi \text{ or } 0 \leq \delta_{HV} < A_{11}$$

Where:
$A_2 = \beta_1 + \pi/2 + \varphi_1$
$A_{11} = \beta_1 - \pi/2 - \varphi_1$ This region is identified as the vertical cross-sectional area in FIG. 13. These conditions can be defined in one mathematical expression as:

$$B_{Q4} = \frac{1}{4}\left[\frac{\delta_{HV}-0+\sigma}{|\delta_{HV}-0|+\sigma}+1\right]\times\left[\frac{A_{11}-\delta_{HV}-\sigma}{|A_{11}-\delta_{HV}|+\sigma}+1\right] + \frac{1}{4}\left[\frac{\delta_{HV}-A_2+\sigma}{|\delta_{HV}-A_2|+\sigma}+1\right]\times\left[\frac{2\pi-\delta_{HV}-\sigma}{|2\pi-\delta_{HV}|+\sigma}+1\right]$$

Lateral Position (VU)

The remote vehicle 14 is in lane (VU=00) with the host vehicle 10 if:

$$A_5 \leq \delta_{HV} < A_6 \text{ or } A_7 \leq \delta_{HV} < A_8$$

Where:
$A_5 = \beta_1 - \varphi_2$
$A_6 = \beta_1 + \varphi_2$
$A_7 = \beta_1 + \pi - \varphi_2$
$A_8 = \beta_1 + \pi + \varphi_2$ $\varphi_2$ is a threshold value that defines the angular range in which the remote vehicle 14 is defined to be in the same lane with the host vehicle 10

These two specific angular ranges are identified as the interface between the horizontal cross-sectional area and the diagonal (form upper left to lower right) cross sectional area in FIG. 14. These conditions can be defined in one mathematical expression as:

$$I_{Q4} = \frac{1}{4}\left[\frac{\delta_{HV}-A_5+\sigma}{|\delta_{HV}-A_5|+\sigma}+1\right]\times\left[\frac{A_6-\delta_{HV}-\sigma}{|A_6-\delta_{HV}|+\sigma}+1\right] + \frac{1}{4}\left[\frac{\delta_{HV}-A_7+\sigma}{|\delta_{HV}-A_7|+\sigma}+1\right]\times\left[\frac{A_8-\delta_{HV}-\sigma}{|A_8-\delta_{HV}|+\sigma}+1\right]$$

The remote vehicle 14 is to the left (VU=01) of the host vehicle 10 if:

$$A_6 \leq \delta_{HV} < A_7$$

Where:
$A_6 = \beta_1 + \varphi_2$
$A_7 = \beta_1 + \pi - \varphi_2$

This region is identified as the diagonal (form upper left to lower right) cross sectional area in FIG. 14. These conditions can be defined in one mathematical expression as:

$$L_{Q4} = \frac{1}{4}\left[\frac{\delta_{HV}-A_6+\sigma}{|\delta_{HV}-A_6|+\sigma}+1\right]\times\left[\frac{A_7-\delta_{HV}-\sigma}{|A_7-\delta_{HV}|+\sigma}+1\right]$$

The remote vehicle 14 is to the right (VU=10) of the host vehicle 10 if:

$$0 \leq \delta_{HV} < A_5 \text{ or } A_8 \leq \delta_{HV} < 2\pi$$

Where:
$A_5 = \beta_1 - \varphi_2$
$A_8 = \beta_1 + \pi + \varphi_2$

This region is identified as the horizontal cross-sectional area in FIG. 14. These conditions can be defined in one mathematical expression as:

$$R_{Q_4} = \frac{1}{4}\left[\frac{\delta_{HV} - 0 + \sigma}{|\delta_{HV} - 0| + \sigma} + 1\right] \times \left[\frac{A_5 - \delta_{HV} - \sigma}{|A_5 - \delta_{HV}| + \sigma} + 1\right] + \frac{1}{4}\left[\frac{\delta_{HV} - A_8 + \sigma}{|\delta_{HV} - A_8| + \sigma} + 1\right] \times \left[\frac{2\pi - \delta_{HV} - \sigma}{|2\pi - \delta_{HV}| + \sigma} + 1\right]$$

The expressions are then consolidated in Table 4 for the case when the remote vehicle 14 is to the southwest of the host vehicle 10.

TABLE 4

| $Q_4$ | | Lateral Position | | | |
|---|---|---|---|---|---|
| | | Remote vehicle in lane ($I_{Q_4}$) | Remote vehicle Left ($L_{Q_4}$) | Remote vehicle Right ($R_{Q_4}$) | Unused |
| Longitudinal Position | Remote vehicle Ahead ($P_{Q_4}$) | $Q_4 \times P_{Q_4} \times I_{Q_4}$ | $Q_4 \times P_{Q_4} \times L_{Q_4}$ | $Q_4 \times P_{Q_4} \times R_{Q_4}$ | 0 |
| | Remote vehicle Adjacent ($A_{Q_4}$) | $Q_4 \times A_{Q_4} \times I_{Q_4}$ | $Q_4 \times A_{Q_4} \times L_{Q_4}$ | $Q_4 \times A_{Q_4} \times R_{Q_4}$ | 0 |
| | Remote vehicle Behind ($B_{Q_4}$) | $Q_4 \times B_{Q_4} \times I_{Q_4}$ | $Q_4 \times B_{Q_4} \times L_{Q_4}$ | $Q_4 \times B_{Q_4} \times R_{Q_4}$ | 0 |
| | Unused | 0 | 0 | 0 | 0 |

Summary (Tables 1-4)

TABLE 5

| $Q_1$ | | Lateral Position | | | |
|---|---|---|---|---|---|
| | | Remote vehicle in lane ($I_{Q_1}$) | Remote vehicle Left ($L_{Q_1}$) | Remote vehicle Right ($R_{Q_1}$) | Unused |
| Longitudinal Position | Remote vehicle Ahead ($P_{Q_1}$) | $Q_1 \times P_{Q_1} \times I_{Q_1}$ | $Q_1 \times P_{Q_1} \times L_{Q_1}$ | $Q_1 \times P_{Q_1} \times R_{Q_1}$ | 0 |
| | Remote vehicle Adjacent ($A_{Q_1}$) | $Q_1 \times A_{Q_1} \times I_{Q_1}$ | $Q_1 \times A_{Q_1} \times L_{Q_1}$ | $Q_1 \times A_{Q_1} \times R_{Q_1}$ | 0 |
| | Remote vehicle Behind ($B_{Q_1}$) | $Q_1 \times B_{Q_1} \times I_{Q_1}$ | $Q_1 \times B_{Q_1} \times L_{Q_1}$ | $Q_1 \times B_{Q_1} \times R_{Q_1}$ | 0 |
| | Unused | 0 | 0 | 0 | 0 |

| $Q_2$ | | Lateral Position | | | |
|---|---|---|---|---|---|
| | | Remote vehicle in lane ($I_{Q_2}$) | Remote vehicle Left ($L_{Q_2}$) | Remote vehicle Right ($R_{Q_2}$) | Unused |
| Longitudinal Position | Remote vehicle Ahead ($P_{Q_2}$) | $Q_2 \times P_{Q_2} \times I_{Q_2}$ | $Q_2 \times P_{Q_2} \times L_{Q_2}$ | $Q_2 \times P_{Q_2} \times R_{Q_2}$ | 0 |
| | Remote vehicle Adjacent ($A_{Q_2}$) | $Q_2 \times A_{Q_2} \times I_{Q_2}$ | $Q_2 \times A_{Q_2} \times L_{Q_2}$ | $Q_2 \times A_{Q_2} \times R_{Q_2}$ | 0 |
| | Remote vehicle Behind ($B_{Q_2}$) | $Q_2 \times B_{Q_2} \times I_{Q_2}$ | $Q_2 \times B_{Q_2} \times L_{Q_2}$ | $Q_2 \times B_{Q_2} \times R_{Q_2}$ | 0 |
| | Unused | 0 | 0 | 0 | 0 |

| $Q_3$ | | Lateral Position | | | |
|---|---|---|---|---|---|
| | | Remote vehicle in lane ($I_{Q_3}$) | Remote vehicle Left ($L_{Q_3}$) | Remote vehicle Right ($R_{Q_3}$) | Unused |
| Longitudinal Position | Remote vehicle Ahead ($P_{Q_3}$) | $Q_3 \times P_{Q_3} \times I_{Q_3}$ | $Q_3 \times P_{Q_3} \times L_{Q_3}$ | $Q_3 \times P_{Q_3} \times R_{Q_3}$ | 0 |
| | Remote vehicle Adjacent ($A_{Q_3}$) | $Q_3 \times A_{Q_3} \times I_{Q_3}$ | $Q_3 \times A_{Q_3} \times L_{Q_3}$ | $Q_3 \times A_{Q_3} \times R_{Q_3}$ | 0 |
| | Remote vehicle Behind ($B_{Q_3}$) | $Q_3 \times B_{Q_3} \times I_{Q_3}$ | $Q_3 \times B_{Q_3} \times L_{Q_3}$ | $Q_3 \times B_{Q_3} \times R_{Q_3}$ | 0 |
| | Unused | 0 | 0 | 0 | 0 |

TABLE 5-continued

|  |  | Lateral Position | | | |
| --- | --- | --- | --- | --- | --- |
| $Q_4$ |  | Remote vehicle in lane ($I_{Q_4}$) | Remote vehicle Left ($L_{Q_4}$) | Remote vehicle Right ($R_{Q_4}$) | Unused |
| Longitudinal Position | Remote vehicle Ahead ($P_{Q_4}$) | $Q_4 \times P_{Q_4} \times I_{Q_4}$ | $Q_4 \times P_{Q_4} \times L_{Q_4}$ | $Q_4 \times P_{Q_4} \times R_{Q_4}$ | 0 |
|  | Remote vehicle Adjacent ($A_{Q_4}$) | $Q_4 \times A_{Q_4} \times I_{Q_4}$ | $Q_4 \times A_{Q_4} \times L_{Q_4}$ | $Q_4 \times A_{Q_4} \times R_{Q_4}$ | 0 |
|  | Remote vehicle Behind ($B_{Q_4}$) | $Q_4 \times B_{Q_4} \times I_{Q_4}$ | $Q_4 \times B_{Q_4} \times L_{Q_4}$ | $Q_4 \times B_{Q_4} \times R_{Q_4}$ | 0 |
|  | Unused | 0 | 0 | 0 | 0 |

The longitudinal and lateral relative position bits for the relative position code are defined in Table 6:

TABLE 6

|  |  | VU | | | |
| --- | --- | --- | --- | --- | --- |
|  |  | 00 | 01 | 10 | 11 |
| XW | 00 | 0000 | 0001 | 0010 | 0011 |
|  | 01 | 0100 | 0101 | 0110 | 0111 |
|  | 10 | 1000 | 1001 | 1010 | 1011 |
|  | 11 | 1100 | 1101 | 1110 | 1111 |

Bits X through U are generated using the array of expressions shown in Table 7

Elevation

The elevation component of relative position is easily provided by the following three expressions.

If the host vehicle 10 and remote vehicle 14 are at the same elevation, $$Z_1 = \frac{1}{4}\left[\frac{\varepsilon - (z_{HV} - z_{RV}) + \sigma}{|\varepsilon - (z_{HV} - z_{RV})| + \sigma} + 1\right] \times \left[\frac{\varepsilon - (z_{RV} - z_{HV}) - \sigma}{|\varepsilon - (z_{RV} - z_{HV})| + \sigma} + 1\right] = 1(TS = 00)$$

TABLE 7

| x | w | v | u |
| --- | --- | --- | --- |
| $x_1 = 0$ | $w_1 = 0$ | $v_1 = 0$ | $u_1 = 0$ |
| $x_2 = 0$ | $w_2 = 0$ | $v_2 = 0$ | $u_2 = \sum_{i=1}^{4} Q_i \times P_{Q_i} \times L_{Q_i} \times 1$ |
| $x_3 = 0$ | $w_3 = 0$ | $v_3 = \sum_{i=1}^{4} Q_i \times P_{Q_i} \times R_{Q_i} \times 1$ | $u_3 = 0$ |
| $x_4 = 0$ | $w_4 = \sum_{i=1}^{4} Q_i \times A_{Q_i} \times I_{Q_i} \times 1$ | $v_4 = 0$ | $u_4 = 0$ |
| $x_5 = 0$ | $w_5 = \sum_{i=1}^{4} Q_i \times A_{Q_i} \times L_{Q_i} \times 1$ | $v_5 = 0$ | $u_5 = \sum_{i=1}^{4} Q_i \times A_{Q_i} \times L_{Q_i} \times 1$ |
| $x_6 = 0$ | $w_6 = \sum_{i=1}^{4} Q_i \times A_{Q_i} \times R_{Q_i} \times 1$ | $v_6 = \sum_{i=1}^{4} Q_i \times A_{Q_i} \times R_{Q_i} \times 1$ | $u_4 = 0$ |
| $x_7 = \sum_{i=1}^{4} Q_i \times B_{Q_i} \times I_{Q_i} \times 1$ | $w_7 = 0$ | $v_7 = 0$ | $u_7 = 0$ |
| $x_8 = \sum_{i=1}^{4} Q_i \times B_{Q_i} \times L_{Q_i} \times 1$ | $w_8 = 0$ | $v_8 = 0$ | $u_8 = \sum_{i=1}^{4} Q_i \times B_{Q_i} \times L_{Q_i} \times 1$ |
| $x_9 = \sum_{i=1}^{4} Q_i \times B_{Q_i} \times R_{Q_i} \times 1$ | $w_9 = 0$ | $v_9 = \sum_{i=1}^{4} Q_i \times B_{Q_i} \times R_{Q_i} \times 1$ | $u_9 = 0$ |
| $X = \sum_{i=1}^{9} x_i$ | $W = \sum_{i=1}^{9} w_i$ | $V = \sum_{i=1}^{9} v_i$ | $U = \sum_{i=1}^{9} u_i$ |

If the host vehicle 10 is lower, $$Z_2 = \frac{1}{2}\left[\frac{(z_{RV}-z_{HV})-\varepsilon-\sigma}{|(z_{RV}-z_{HV})-\varepsilon|+\sigma}+1\right] = 1(TS=01)$$

If the host vehicle 10 is higher, $$z_3 = \frac{1}{2}\left[\frac{(z_{HV}-z_{RV})-\varepsilon-\sigma}{|(z_{HV}-z_{RV})-\varepsilon|+\sigma}+1\right] = 1(TS=10)$$

where:
$z_{host\ vehicle}$=host vehicle 10 elevation
$z_{remote\ vehicle}$=remote vehicle 14 elevation
$\varepsilon$=a defined threshold value of distance such as 4 m.
Bits T and S U are generated using the array of expressions shown in Table 8.

TABLE 8

| t | s |
|---|---|
| $t_1 = Z_1 \times 0$ | $s_1 = Z_1 \times 0$ |
| $t_2 = Z_2 \times 0$ | $s_2 = Z_2 \times 1$ |
| $t_3 = Z_3 \times 1$ | $s_3 = Z_3 \times 0$ |

$$T = \sum_{i=1}^{3} t_i$$

$$S = \sum_{i=1}^{3} s_i$$

Remote Vehicle Position Relative to Host Vehicle (Heading)

When the host vehicle 10 and the remote vehicle 14 traveling in same direction, (RQ=01). The remote vehicle 14 heading angle as a function of the host vehicle 10 heading angle for the case of following vehicles can be defined as follows:

$\delta_{RV}=\delta_{HV}$

However, narrowly defining $\delta_{remote\ vehicle}$ to be exactly the same as $\delta_{host\ vehicle}$ would result in a condition where the two vehicles would almost never be classified as heading in the same direction when in reality this condition is a very common occurrence. In order to account for small differences in heading angles, a variable $\varphi_2$ is used to define a range of heading angles for the remote vehicle 14 in which the remote vehicle 14 would be considered to be heading in the same direction as the host vehicle 10. To define this range, the following expressions are defined.
Minimum Remote Vehicle Heading Angle
If a $\delta_{RV}-\varphi_2<0$ then $\delta_{RV_{min}}^{01}=2\pi+\delta_{RV}-\varphi_2$
If a $\delta_{RV}-\varphi_2\geq0$ then $\delta_{RV_{min}}^{01}=\delta_{RV}-\varphi_2$
These conditions can be combined into one mathematical expression as:

$\delta_{RV_{min}}^{01}=\zeta_{min_1}\times(2\pi+\delta_{RV}-\varphi_2)+\zeta_{min_2}\times(\delta_{RV}-\varphi_2)$
Where:

$$\zeta_{min_1} = \frac{1}{2}\left[\frac{0-(\delta_{RV}-\varphi_2)-\sigma}{|0-(\delta_{RV}-\varphi_2)|+\sigma}+1\right]$$

$$\zeta_{min_2} = \frac{1}{2}\left[\frac{(\delta_{RV}-\varphi)-0+\sigma}{|(\delta_{RV}-\varphi)-0|+\sigma}+1\right]$$

These expressions have two values, 0 or 1 depending on the value of $\delta_{remote\ vehicle}$ and can be thought of as filtering functions that ensure the appropriate expression is used to calculate the value of $\delta_{RV_{min}}^{01}$.
Maximum Remote Vehicle Heading Angle
If $\delta_{RV}+\varphi<2\pi$ then $\delta_{RV}+\varphi_2$
If $\delta_{RV}+\varphi\geq2\pi$ then $\delta_{RV_{min}}^{01}=\delta_{RV}+\varphi_2-2\pi$
These conditions can be combined into one mathematical expression as:

$\delta_{RV_{min}}^{01}=\zeta_{max_1}\times(\delta_{RV}+\varphi_2)+\zeta_{max_2}\times(\delta_{RV}+\varphi_2-2\pi)$ Where:

$$\zeta_{max_1} = \frac{1}{2}\left[\frac{2\pi-(\delta_{RV}+\varphi_2)-\sigma}{|2\pi-(\delta_{RV}+\varphi_2)|+\sigma}+1\right]$$

$$\zeta_{max_2} = \frac{1}{2}\left[\frac{(\delta_{RV}+\varphi_2)-2\pi+\sigma}{|(\delta_{RV}+\varphi_2)-2\pi|+\sigma}+1\right]$$

These expressions have two values, 0 or 1 depending on the value of $\delta_{remote\ vehicle}$ and can be thought of as filtering functions that ensure the appropriate expression is used to calculate the value of $\delta_{RV_{min}}^{01}$.

The remote vehicle 14 is considered to be traveling in the same direction as the host vehicle 10 when the heading angle of the remote vehicle 14, $\delta_{remote\ vehicle}$ falls within the range $\delta_{RV}^{01}$ and $\delta_{RV_{min}}^{01}$ therefore in most cases, the heading angle of the host vehicle 10, $\delta_{host\ vehicle}$ will be greater than or equal to $\delta_{RV_{min}}^{01}$ and less than or equal to $\delta_{RV_{max}}^{01}$ otherwise the remote vehicle 14 will be considered to be traveling in a direction other than the same direction of the host vehicle 10 as shown in FIGS. 15-18.

Figure 19:
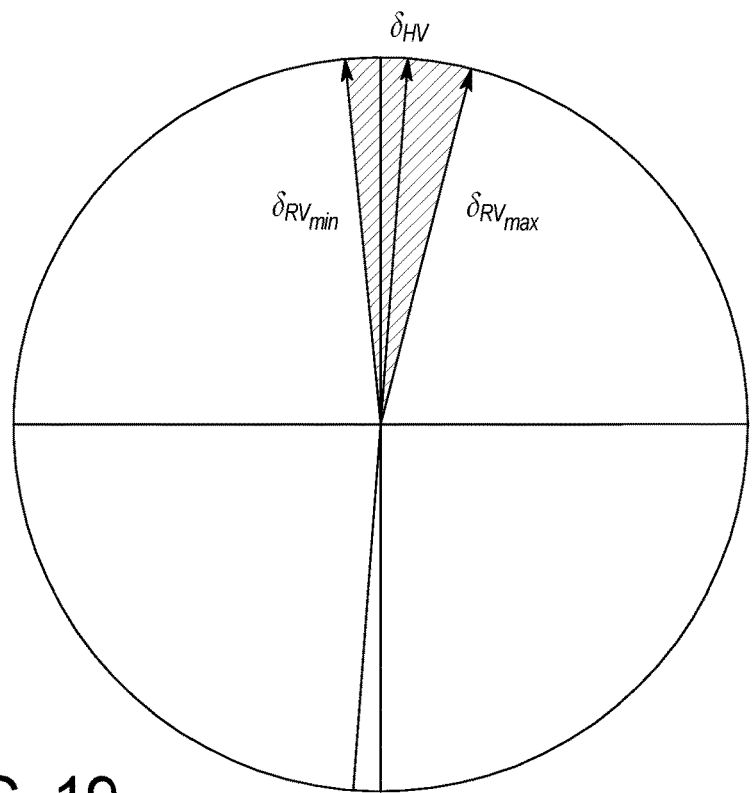
FIG. 19 illustrates the maximum remote vehicle heading angle when the remote vehicle is heading the same direction as the host vehicle.
Figure 20:
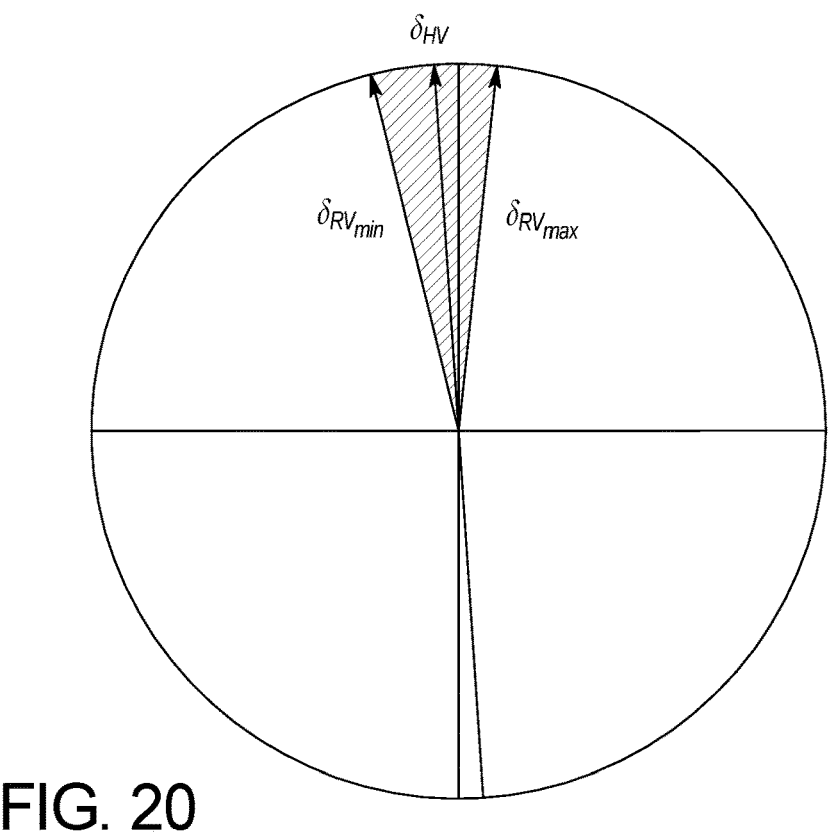
FIG. 20 illustrates the maximum remote vehicle heading angle when the remote vehicle is heading the same direction as the host vehicle.

However, because of the fixed reference used where North=0°, there are cases where $\delta_{host\ vehicle}$ will be less than or equal to $\delta_{RV_{min}}^{01}$ and less than or equal to $\delta_{RV_{max}}^{01}$ or cases where $\delta_{host\ vehicle}$ will be greater than or equal to $\delta_{RV_{min}}^{01}$ and greater than or equal to $\delta_{RV_{max}}^{01}$ such as shown in FIGS. 19 and 20.

Consider the following expressions for $H_1$ and $H_2$.

$H_1=\delta_{HV}-\delta_{RV_{min}}^{01}$ $H_2=\delta_{HV}-\delta_{RV_{max}}^{01}$ For any value of $\delta_{host\ vehicle}$, the values for $H_1$ and $H_2$ fall within three distinct categories:
1: $H_1$ is negative, $H_2$ is negative and $H_1<H_2$ ($\delta_{HV}<\delta_{RV_{min}}^{01}$ and $\delta_{HV}<\delta_{RV_{max}}^{01}$)
2: $H_1$ is positive, $H_2$ is negative and $H_1>H_2$ ($\delta_{HV}>\delta_{RV_{min}}^{01}$ and $\delta_{HV}<\delta_{RV_{max}}^{01}$)
3: $H_1$ is positive, $H_2$ is positive and $H_1<H_2$ ($\delta_{HV}>\delta_{RV_{min}}^{01}>\delta_{HV}>\delta_{RV_{max}}^{01}$)
From these three conditions, it can be shown that for any combination of $\delta_{host\ vehicle}$ and $\delta_{remote\ vehicle}$, where $0\leq\delta_{HV}<2\pi$ and $0\leq\delta_{RV}<2\pi$ the following expressions can be used to identify if the host vehicle 10 and remote vehicle 14 are traveling in the same direction.

$$\Delta_1^{01} = \frac{1}{8}\left[\frac{\delta_{RV_{min}}^{01}-\delta_{RV}+\sigma}{|\delta_{RV_{min}}^{01}-\delta_{RV}|+\sigma}+1\right]\times$$

-continued $$\left[\frac{\delta_{RV_{max}}^{01} - \delta_{RV} + \sigma}{|\delta_{RV_{max}}^{01} - \delta_{RV}| + \sigma} + 1\right] \times \left[1 - \frac{H_1 - H_2 - \sigma}{|H_1 - H_2| + \sigma}\right]$$

If $H_1 < H_2$, $\delta_{RV} \leq \delta_{RV_{min}}^{01}$ and $\delta_{RV} \leq \delta_{RV_{max}}^{01}$ $\Delta_1^{01}=1$ otherwise $\Delta_1^{01}=0$ $$\Delta_2^{01} = \frac{1}{8}\left[\frac{\delta_{RV} - \delta_{RV_{min}}^{01} + \sigma}{|\delta_{RV} - \delta_{RV_{min}}^{01}| + \sigma} + 1\right] \times$$

$$\left[\frac{\delta_{RV_{max}}^{01} - \delta_{RV} + \sigma}{|\delta_{RV_{max}}^{01} - \delta_{RV}| + \sigma} + 1\right] \times \left[\frac{H_1 - H_2 - \sigma}{|H_1 - H_2| + \sigma} + 1\right]$$

If $H_1 > H_2$ and $\delta_{RV_{min}}^{01} \leq \delta_{RV} \leq \delta_{RV_{max}}^{01}$, $\Delta_2^{01}=1$ otherwise $\Delta_2^{01}=0$ $$\Delta_3^{01} = \frac{1}{8}\left[\frac{\delta_{RV} - \delta_{RV_{min}}^{01} + \sigma}{|\delta_{RV} - \delta_{RV_{min}}^{01}| + \sigma} + 1\right] \times$$

$$\left[\frac{\delta_{RV} - \delta_{RV_{max}}^{01} + \sigma}{|\delta_{RV} - \delta_{RV_{max}}^{01}| + \sigma} + 1\right] \times \left[1 - \frac{H_1 - H_2 - \sigma}{|H_1 - H_2| + \sigma}\right]$$

If $H_1 < H_2$ and $\delta_{RV_{min}}^{01} \leq \delta_{RV}$ and $\delta_{RV_{max}}^{01}$, $\Delta_2^{01}=1$ otherwise $\Delta_2^{01}=0$ Also, it is advantageous to define the difference of $H_1$ and $H_2$ as follows:

$H_1 - H_2 = \delta_{HV} - \delta_{RV_{min}}^{01} - (\delta_{HV} - \delta_{RV_{max}}^{01})$ $H_1 - H_2 = \delta_{HV} - \delta_{RV_{min}}^{01} - \delta_{HV} + \delta_{RV_{max}}^{01}$ $H_1 - H_2 = \delta_{HV} - \delta_{RV_{min}}^{01} - \delta_{HV} + \delta_{RV_{max}}^{01}$ $H_1 H_2 = \delta_{RV_{max}}^{01} - \delta_{RV_{min}}^{01}$ Then the previous expressions can be expressed as:

$$\Delta_1^{01} = \frac{1}{8}\left[\frac{\delta_{RV_{min}}^{01} - \delta_{RV} + \sigma}{|\delta_{RV_{min}}^{01} - \delta_{RV}| + \sigma} + 1\right] \times$$

$$\left[\frac{\delta_{RV_{max}}^{01} - \delta_{RV} + \sigma}{|\delta_{RV_{max}}^{01} - \delta_{RV}| + \sigma} + 1\right] \times \left[1 - \frac{\delta_{RV_{max}}^{01} - \delta_{RV_{min}}^{01} + \sigma}{|\delta_{RV_{max}}^{01} - \delta_{RV_{min}}^{01}| + \sigma}\right]$$

$$\Delta_2^{01} = \frac{1}{8}\left[\frac{\delta_{RV} - \delta_{RV_{min}}^{01} + \sigma}{|\delta_{RV} - \delta_{RV_{min}}^{01}| + \sigma} + 1\right] \times$$

$$\left[\frac{\delta_{RV_{max}}^{01} - \delta_{RV} + \sigma}{|\delta_{RV_{max}}^{01} - \delta_{RV}| + \sigma} + 1\right] \times \left[\frac{\delta_{RV_{max}}^{01} - \delta_{RV_{min}}^{01} - \sigma}{|\delta_{RV_{max}}^{01} - \delta_{RV_{min}}^{01}| + \sigma} + 1\right]$$

$$\Delta_3^{01} = \frac{1}{8}\left[\frac{\delta_{RV} - \delta_{RV_{min}}^{01} + \sigma}{|\delta_{RV} - \delta_{RV_{min}}^{01}| + \sigma} + 1\right] \times$$

$$\left[\frac{\delta_{RV} - \delta_{RV_{max}}^{01} + \sigma}{|\delta_{RV} - \delta_{RV_{max}}^{01}| + \sigma} + 1\right] \times \left[1 - \frac{\delta_{RV_{max}}^{01} - \delta_{RV_{min}}^{01} - \sigma}{|\delta_{RV_{max}}^{01} - \delta_{RV_{min}}^{01}| + \sigma}\right]$$

If the sum of these three expressions is equal to 1, the host vehicle 10 and remote vehicle 14 are traveling in the same direction. This condition is expressed mathematically as:

$$\sum_{i=1}^{3} \Delta_i^{01} = 1 \ (RQ = 01)$$

Thus:

$$r_1 = \sum_{i=1}^{3} \Delta_i^{01} \times 0$$

$$q_1 = \sum_{i=1}^{3} \Delta_i^{01} \times 1$$

host vehicle 10 and remote vehicle 14 approaching either other from opposite directions (RQ=10):
Remote vehicle 14 Heading angle as a function of Host vehicle 10 heading angle for the case of on-coming vehicles can be defined as follows:

$$\delta_{RV} = \frac{1}{2}\left[\frac{\delta_{HV} - \pi - \sigma}{|\delta_{HV} - \pi| + \sigma} + 1\right] \times (\delta_{HV} - \pi) + \frac{1}{2}\left[\frac{\pi - \delta_{HV} - \sigma}{|\pi - \delta_{HV}| + \sigma} + 1\right] \times (\delta_{HV} + \pi)$$

However, narrowly defining $\delta_{remote\ vehicle}$ to be exactly opposite of $\delta_{host\ vehicle}$ would result in a condition where the two vehicles would almost never be classified as heading in opposite direction when in reality this condition is a very common occurrence. In order to account for small differences in heading angles, the variable $\varphi_2$ is used to define a range a range of heading angles for the remote vehicle 14 in which the remote vehicle 14 would be considered to be heading in the opposite direction of the host vehicle 10. To define this range, the following expressions are defined:
Minimum Remote Vehicle Heading Angle:
If $\delta_{RV} - \varphi_2 < 0$ then $\delta_{RV_{min}}^{10} = 2\pi - \varphi_2$
If $\delta_{RV} - \varphi_2 \geq 0$ then $\delta_{RV_{min}}^{10} = \delta_{RV} - \varphi_2$
These conditions can be combined into one mathematical expression as:

$\delta_{RV_{min}}^{10} = \zeta_{min_1} \times (2\pi + \delta_{RV} - \varphi_2) + \zeta_{min_2} \times (\delta_{RV} - \varphi_2)$ Where:

$$\zeta_{min_1} = \frac{1}{2}\left[\frac{0 - (\delta_{RV} - \varphi_2) - \sigma}{|0 - (\delta_{RV} - \varphi_2)| + \sigma} + 1\right]$$

$$\zeta_{min_2} = \frac{1}{2}\left[\frac{(\delta_{RV} - \varphi_2) - 0 + \sigma}{|(\delta_{RV} - \varphi_2) - 0| + \sigma} + 1\right]$$

These expressions have two values, 0 or 1 depending on the value of $\delta_{remote\ vehicle}$ and can be thought of as filtering functions that ensure the appropriate expression is used to calculate the value of $\delta_{RV_{min}}^{10}$.
Maximum Remote Vehicle Heading Angle
If $\delta_{RV} + \varphi_2 < 2\pi$ then $\delta_{RV_{max}}^{10} = \delta_{RV} + \varphi_2$
If $\delta_{RV} + \varphi_2 \geq 2\pi$ then $\delta_{RV_{max}}^{10} = \delta_{RV} + \varphi_2 - 2\pi$
These conditions can be combined into one mathematical expression as:

$\delta_{RV_{max}}^{10} = \zeta_{max_1} \times (\delta_{RV} + \varphi_2) + \zeta_{max_2} \times (\delta_{RV} + \varphi_2 - 2\pi)$ where:

$$\zeta_{max_1} = \frac{1}{2}\left[\frac{2\pi - (\delta_{RV} + \varphi_2) - \sigma}{|2\pi - (\delta_{RV} + \varphi_2)| + \sigma} + 1\right]$$

$$\zeta_{max_2} = \frac{1}{2}\left[\frac{(\delta_{RV} + \varphi_2) - 2\pi + \sigma}{|(\delta_{RV} + \varphi_2) - 2\pi| + \sigma} + 1\right]$$

These expressions have two values, 0 or 1 depending on the value of $\delta_{remote\ vehicle}$ and can be thought of as filtering functions that ensure the appropriate expression is used to calculate the value of $\delta_{RV_{max}}^{10}$.

Figure 21:
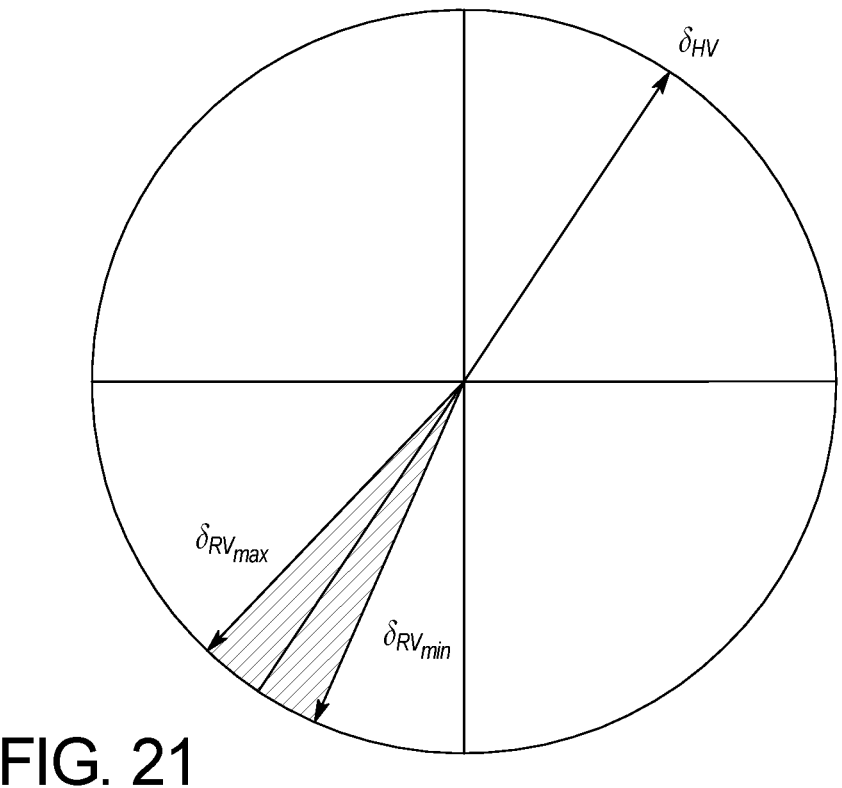
FIG. 21 illustrates the maximum remote vehicle heading angle when the remote vehicle is heading the same direction as the host vehicle.
Figure 22:
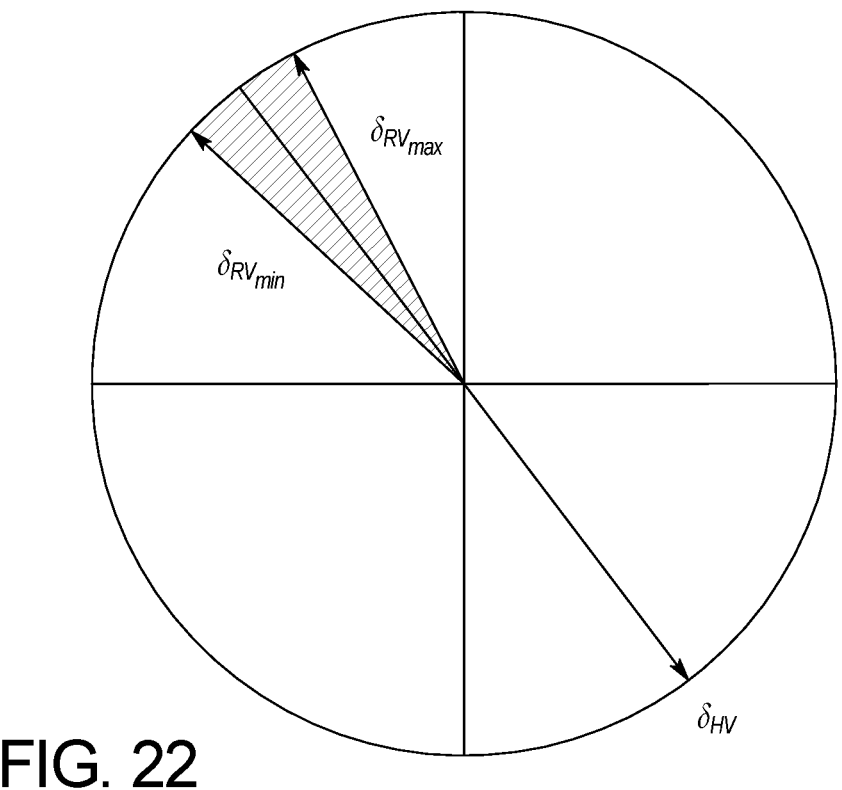
FIG. 22 illustrates the maximum remote vehicle heading angle when the remote vehicle is heading the same direction as the host vehicle.

The remote vehicle 14 is considered to be traveling in the direction opposite of the host vehicle 10 when the heading angle of the remote vehicle 14, $\delta_{remote\ vehicle}$ falls within the range $\delta_{RV_{min}}^{10}$ and $\delta_{RV_{max}}^{10}$ therefore cases exist where the heading angle of the host vehicle 10, $\delta_{host\ vehicle}$ will be less than $\delta_{RV_{min}}^{10}$ and less than $\delta_{RV_{max}}^{10}$ when $\delta_{host\ vehicle}$ is less than $\pi$ as shown in FIGS. 21 and 22.

Figure 23:
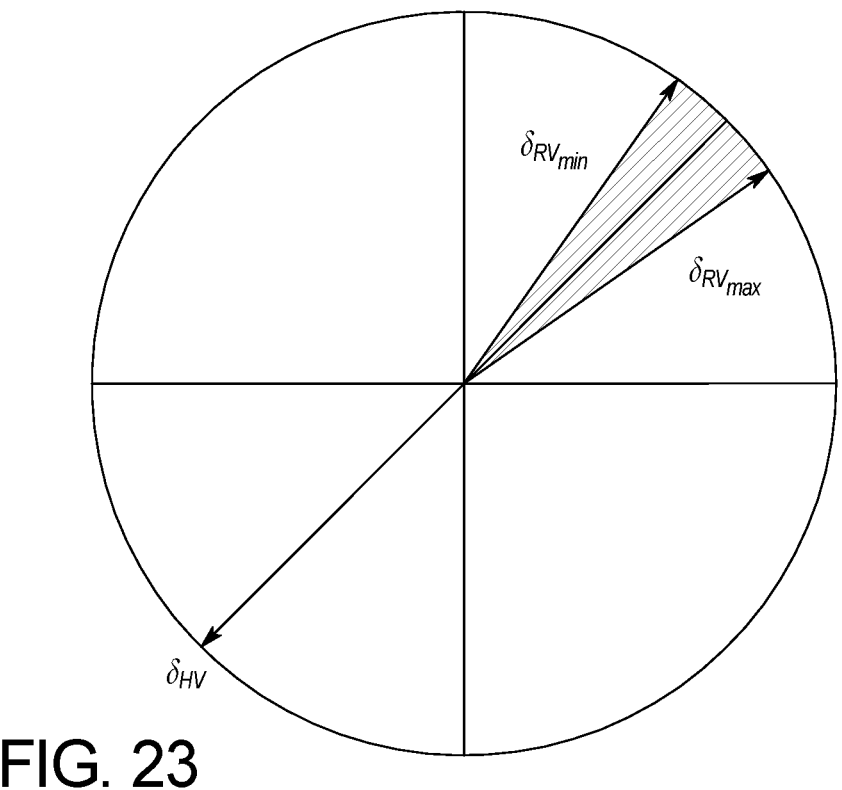
FIG. 23 illustrates the maximum remote vehicle heading angle when the remote vehicle is heading the same direction as the host vehicle.
Figure 24:
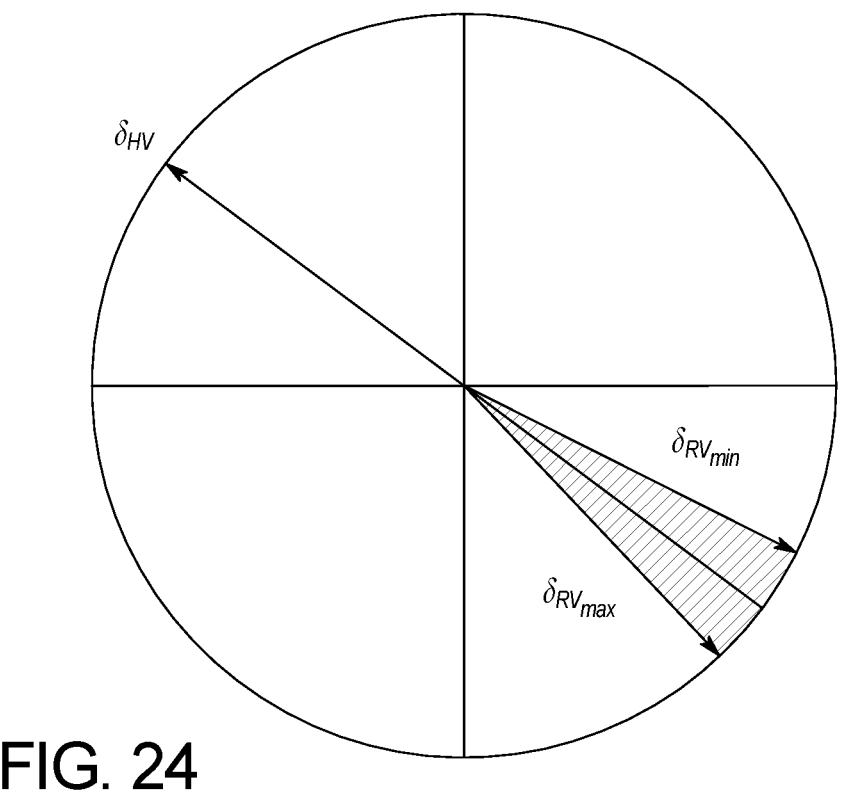
FIG. 24 illustrates the maximum remote vehicle heading angle when the remote vehicle is heading the same direction as the host vehicle.

There also exist cases where $\delta_{host\ vehicle}$ will be greater than $\delta_{RV_{min}}^{10}$ and greater than $\delta_{RV_{max}}^{10}$ when $\delta_{host\ vehicle}$ is greater than $\pi$ otherwise the remote vehicle 14 will be considered to be traveling in a direction other than the opposite direction of the host vehicle 10 as shown in FIGS. 23 and 24.

Figure 25:
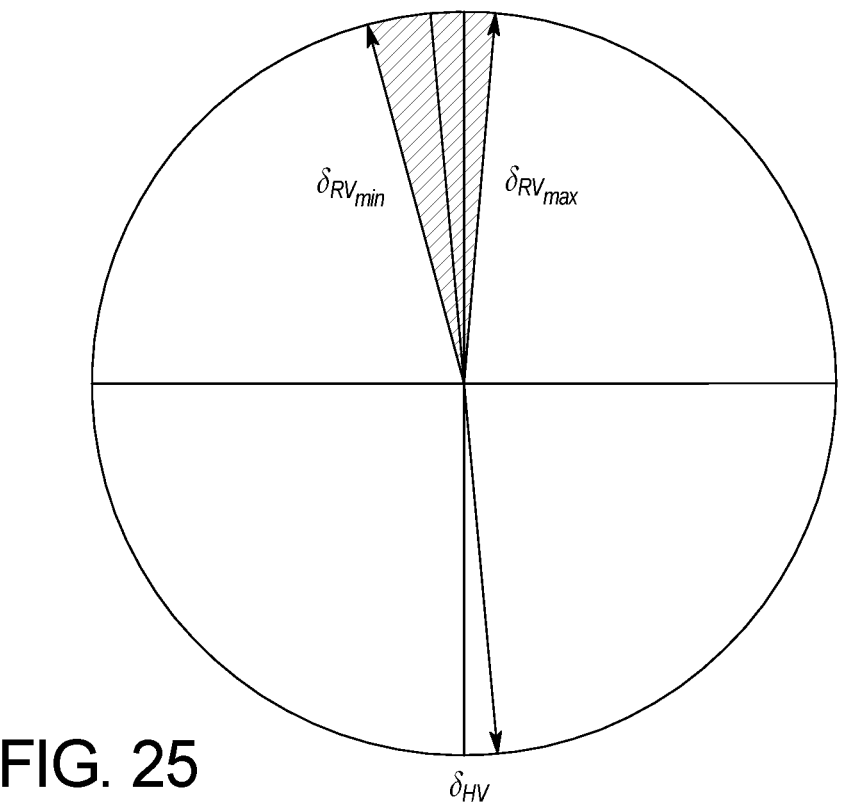
FIG. 25 illustrates the maximum remote vehicle heading angle when the remote vehicle is heading the same direction as the host vehicle.
Figure 26:
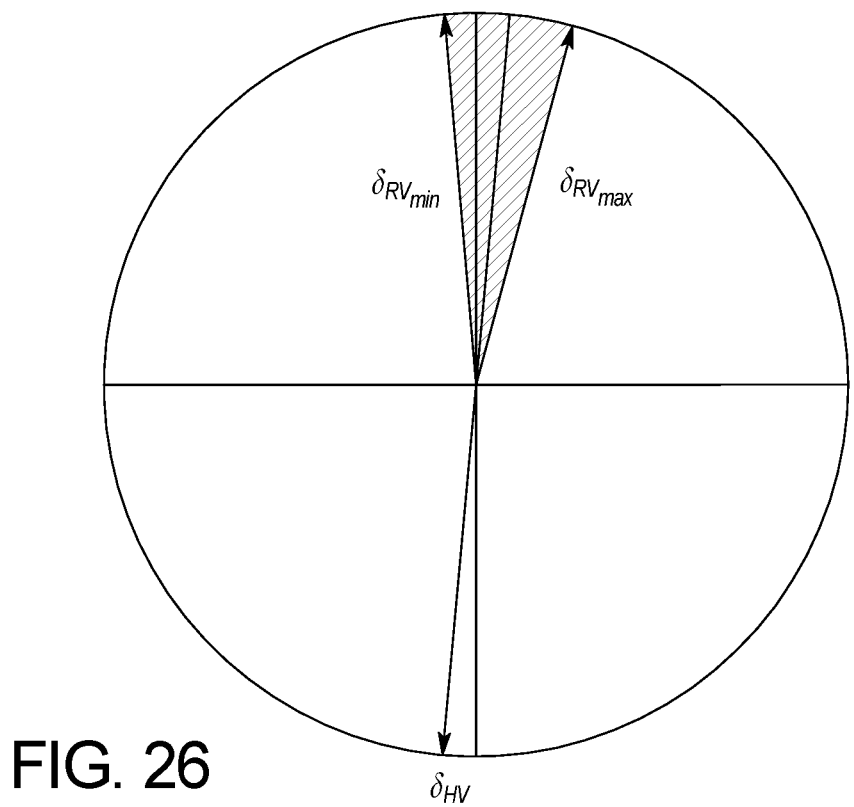
FIG. 26 illustrates the maximum remote vehicle heading angle when the remote vehicle is heading the same direction as the host vehicle.
Figure 27:
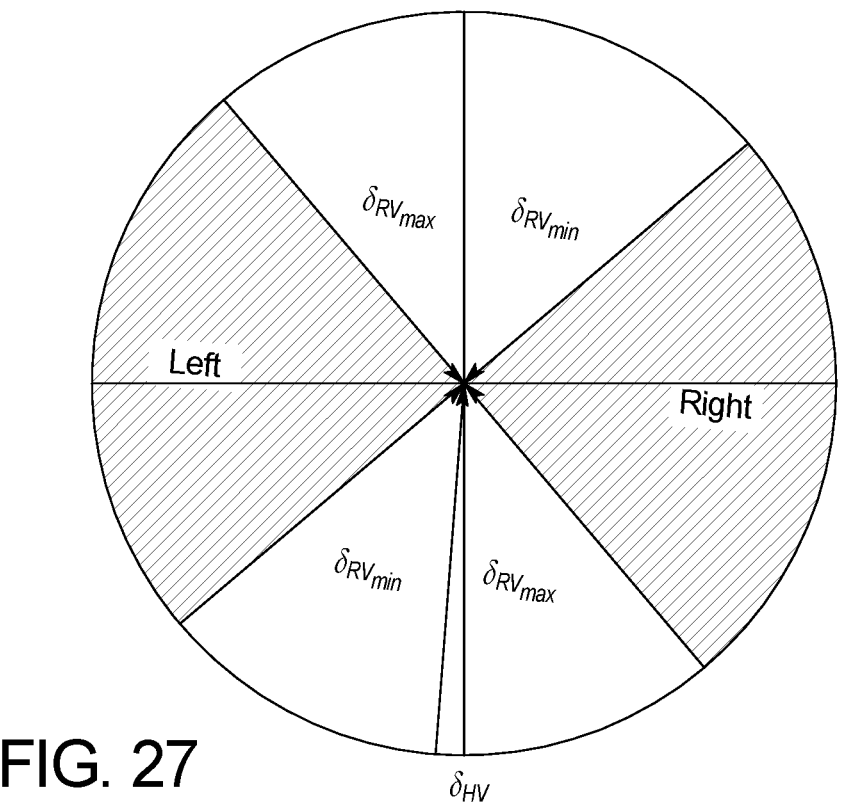
FIG. 27 illustrates a situation in which the remote vehicle is considered to be in a crossing path with the host vehicle.
Figure 28:
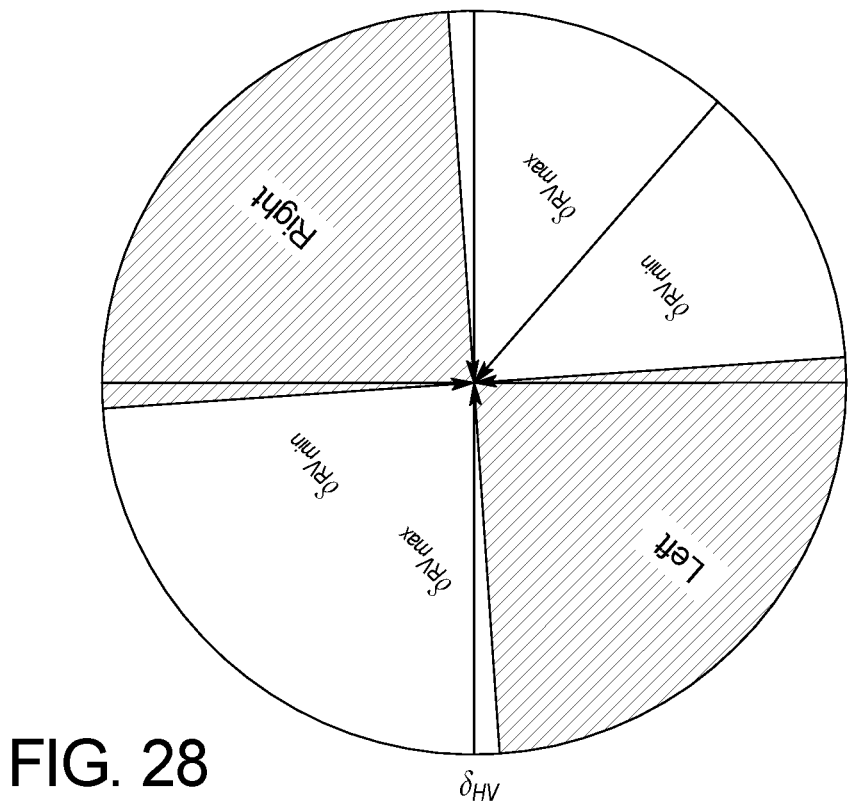
FIG. 28 illustrates a situation in which the remote vehicle is considered to be in a crossing path with the host vehicle.
Figure 29:
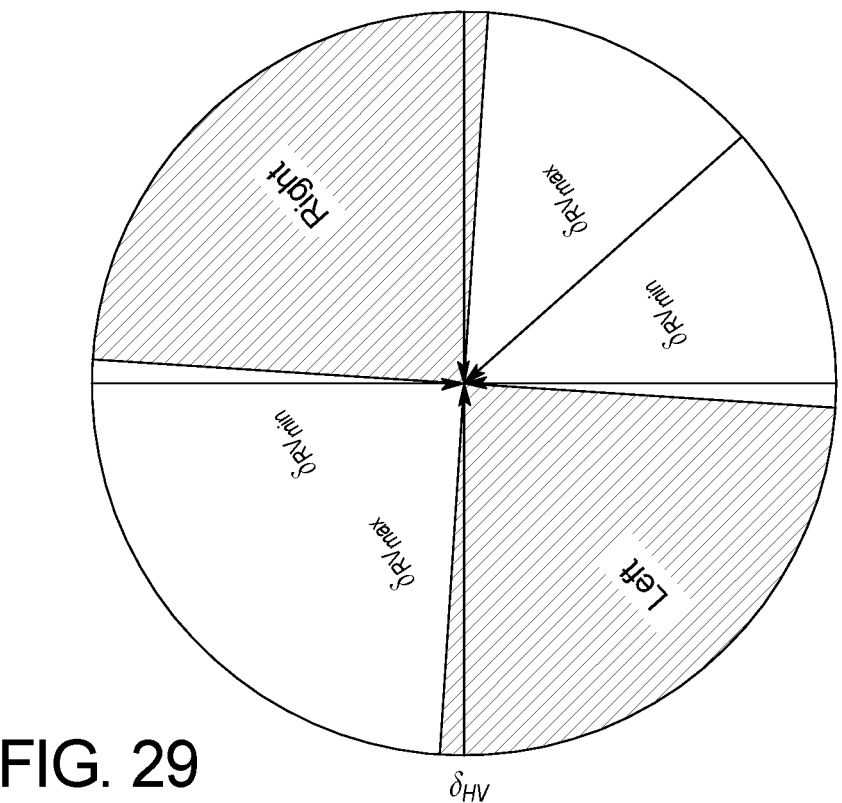
FIG. 29 illustrates a situation in which the remote vehicle is considered to be in a crossing path with the host vehicle.
Figure 30:
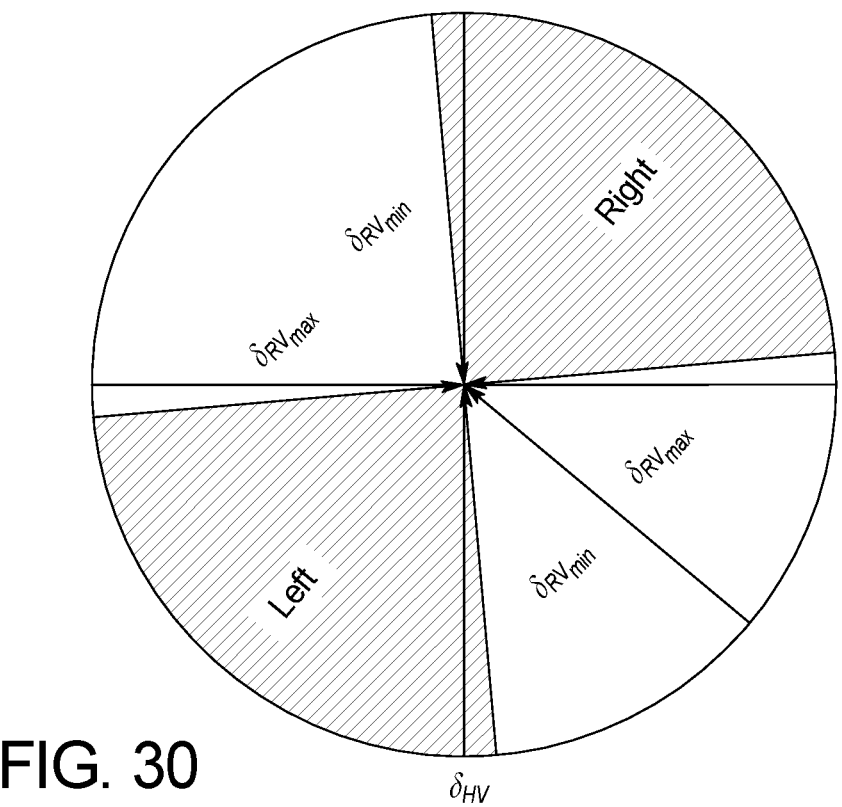
FIG. 30 illustrates a situation in which the remote vehicle is considered to be in a crossing path with the host vehicle.
Figure 31:
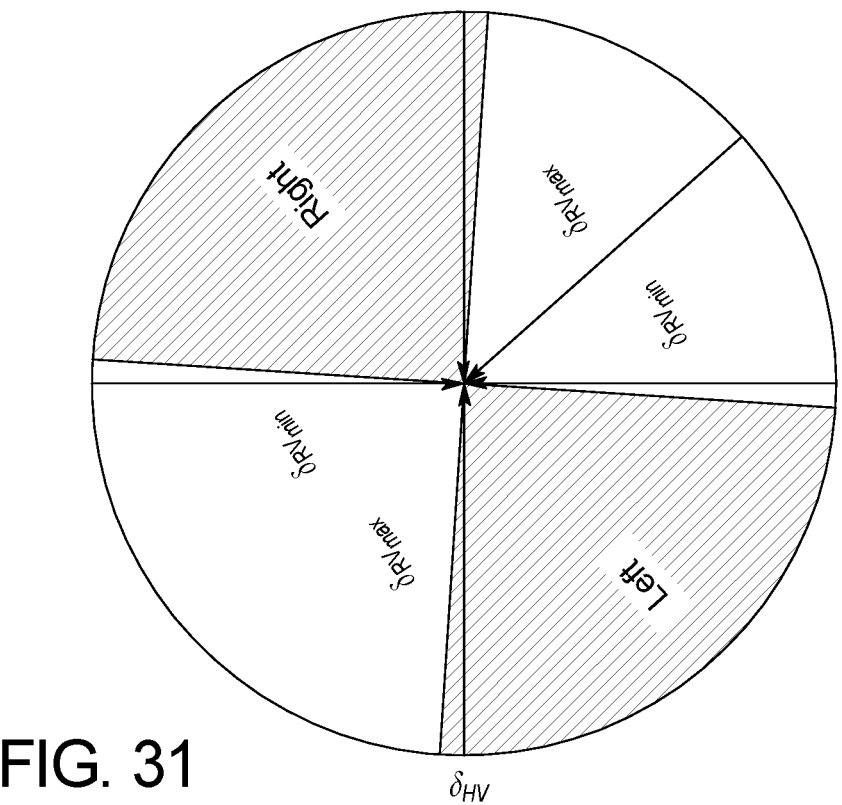
FIG. 31 illustrates a situation in which the remote vehicle is considered to be in a crossing path with the host vehicle.
Figure 32:
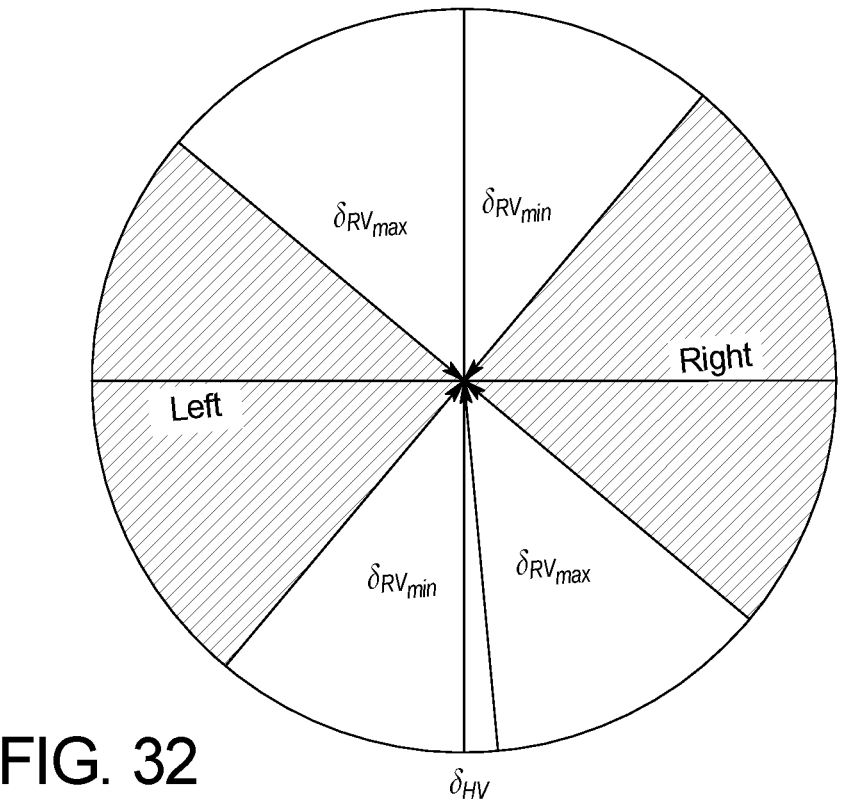
FIG. 32 illustrates a situation in which the remote vehicle is considered to be in a crossing path with the host vehicle.
Figure 33:
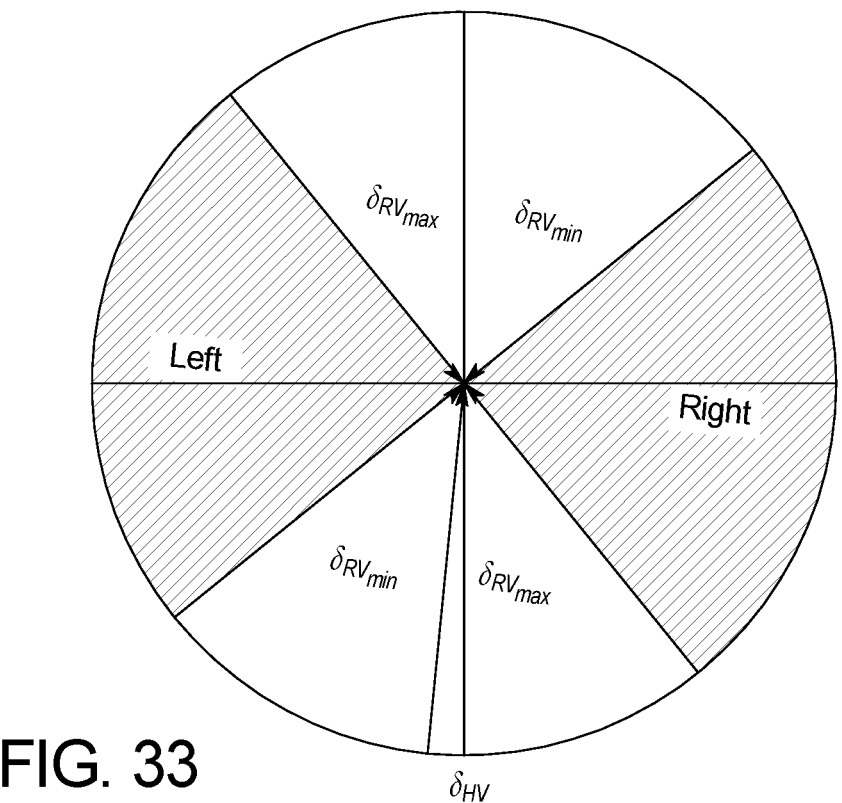
FIG. 33 illustrates a situation in which the remote vehicle is considered to be in a crossing path with the host vehicle.
Figure 34:
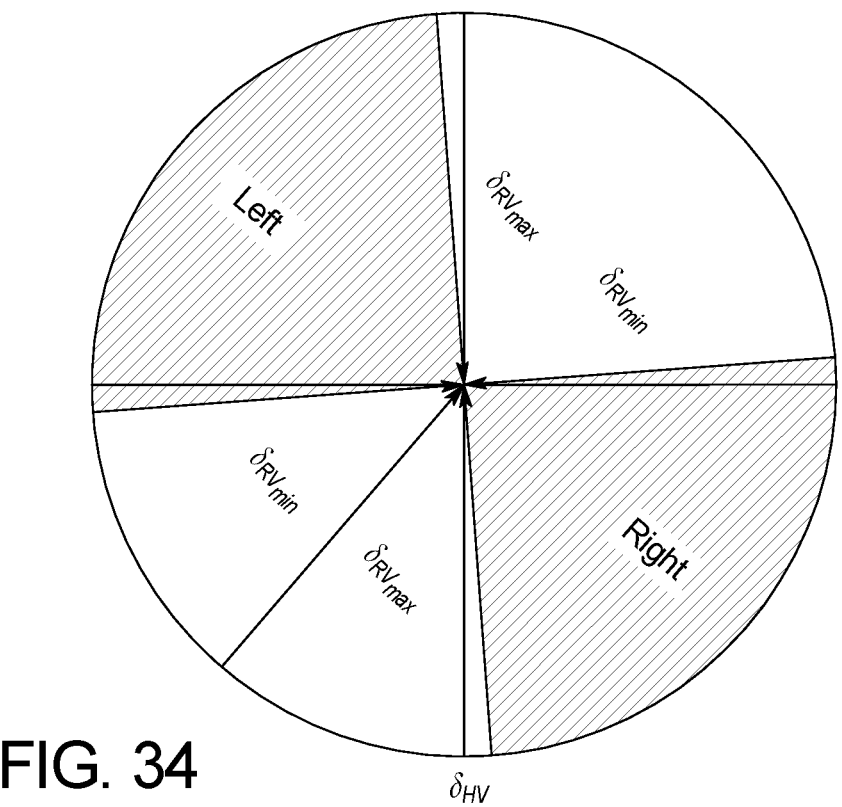
FIG. 34 illustrates a situation in which the remote vehicle is considered to be in a crossing path with the host vehicle.
Figure 35:
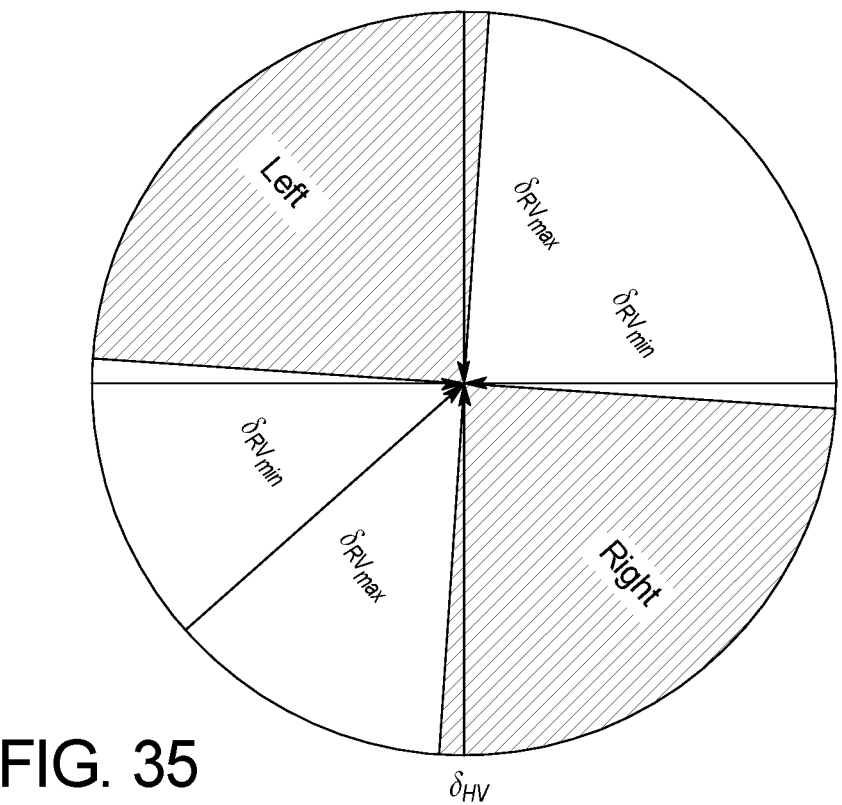
FIG. 35 illustrates a situation in which the remote vehicle is considered to be in a crossing path with the host vehicle.
Figure 36:
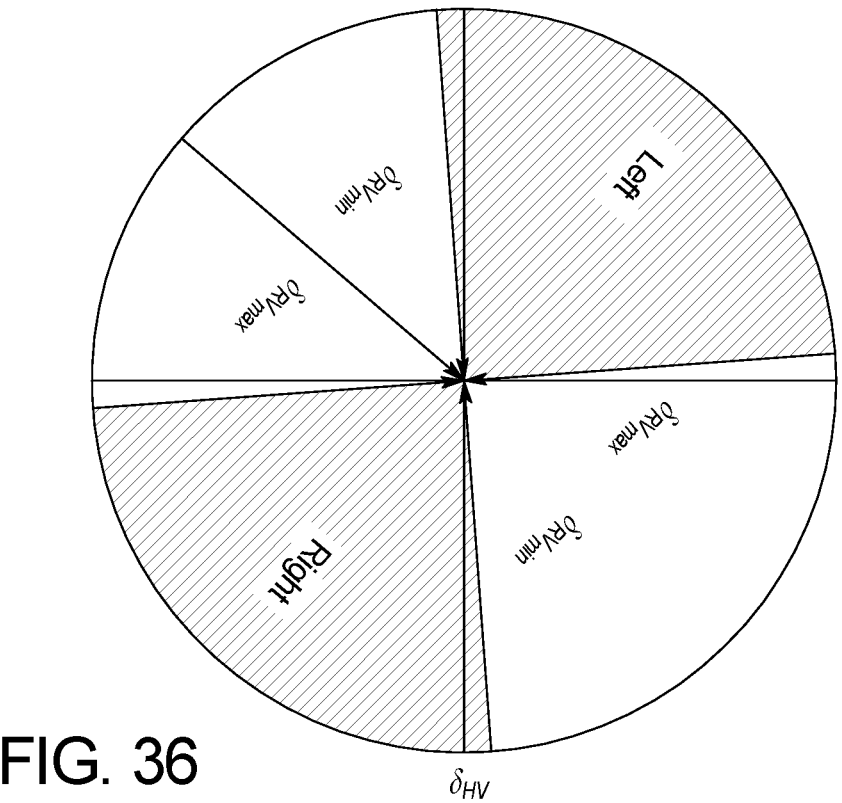
FIG. 36 illustrates a situation in which the remote vehicle is considered to be in a crossing path with the host vehicle.
Figure 37:
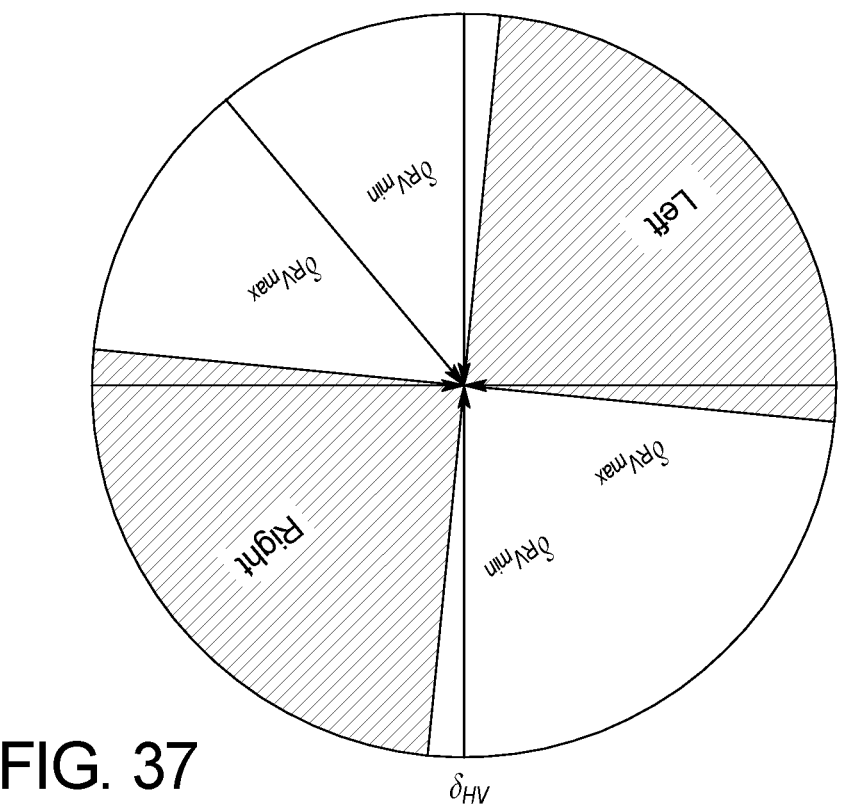
FIG. 37 illustrates a situation in which the remote vehicle is considered to be in a crossing path with the host vehicle.
Figure 38:
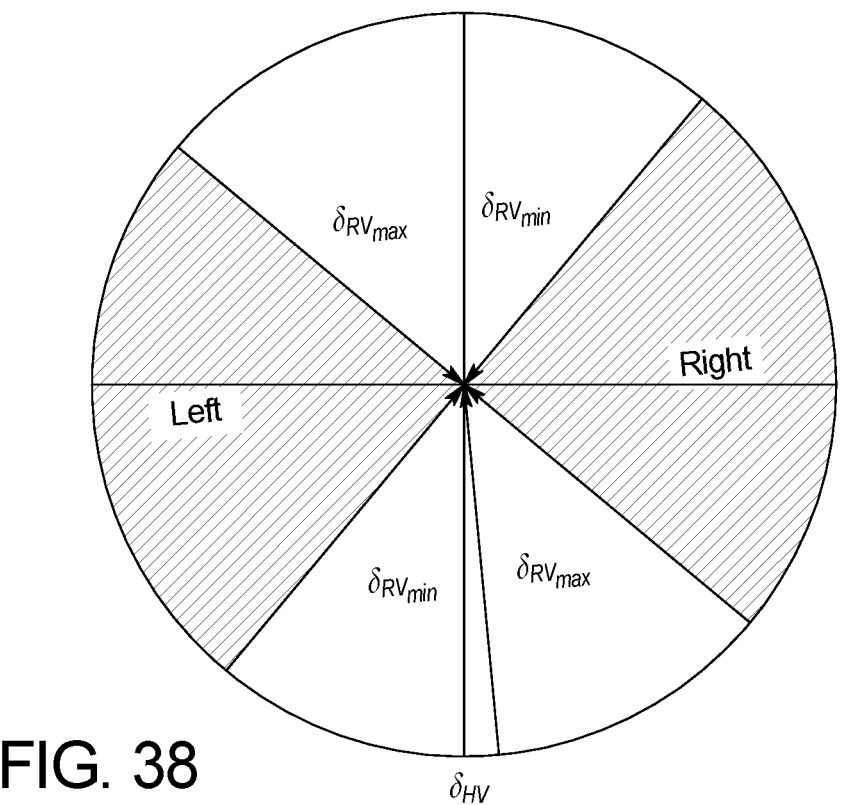
FIG. 38 illustrates a situation in which the remote vehicle is considered to be in a crossing path with the host vehicle.

However, because of the fixed reference used where North=0°, there are cases where $\delta_{host\ vehicle}$ will be less than $\delta_{RV_{min}}^{10}$ and greater than $\delta_{RV_{max}}^{10}$ when $\delta_{host\ vehicle}$ is less than or greater than $\pi$ such as FIGS. 25 and 26.

Consider the following expressions for $H_1$ and $H_2$.

$$H_1 = \delta_{HV} - \delta_{RV_{min}}^{10}$$

$$H_2 = \delta_{HV} - \delta_{RV_{max}}^{10}$$

For any value of $\delta_{host\ vehicle}$, the values for $H_1$ and $H_2$ fall within three distinct categories:

1: $H_1$ is negative, $H_2$ is negative and $H_1 > H_2$ ($\delta_{HV} < \delta_{RV_{min}}^{10}$ and $\delta_{HV} < \delta_{RV_{max}}^{10}$)
2: $H_1$ is negative, $H_2$ is positive and $H_1 < H_2$ ($\delta_{HV} < \delta_{RV_{min}}^{10}$ and $\delta_{HV} > \delta_{RV_{max}}^{10}$)
3: $H_1$ is positive, $H_2$ is positive and $H_1 > H_2$ ($\delta_{HV} > \delta_{RV_{min}}^{10}$ and $\delta_{HV} > \delta_{RV_{max}}^{10}$)

From these three conditions, it can be shown that for any combination of $\delta_{host\ vehicle}$ and $\delta_{remote\ vehicle}$, where $0 \leq \delta_{HV} < 2\pi$ and $0 < \delta_{RV} < 2\pi$ the following expressions can be used to identify if the host vehicle 10 and remote vehicle 14 are traveling in opposite directions.

$$\Delta_1^{10} = \frac{1}{8}\left[\frac{\delta_{RV} - \delta_{RV_{min}}^{10} + \sigma}{|\delta_{RV} - \delta_{RV_{min}}^{10}| + \sigma} + 1\right] \times$$

$$\left[\frac{\delta_{RV_{max}}^{10} - \delta_{RV} + \sigma}{|\delta_{RV_{max}}^{10} - \delta_{RV}| + \sigma} + 1\right] \times \left[\frac{H_1 - H_2 - \sigma}{|H_1 - H_2| + \sigma} + 1\right]$$

If $H_1 > H_2$ and $\delta_{RV_{min}}^{10} \leq \delta_{RV} \leq \delta_{RV_{max}}^{10}$, $\Delta_1^{10} = 1$ otherwise $\Delta_1^{10o} = 0$ $$\Delta_2^{10} = \frac{1}{8}\left[\frac{\delta_{RV} - \delta_{RV_{min}}^{10} + \sigma}{|\delta_{RV} - \delta_{RV_{min}}^{10}| + \sigma} + 1\right] \times$$

$$\left[\frac{\delta_{RV} - \delta_{RV_{max}}^{10} + \sigma}{|\delta_{RV} - \delta_{RV_{max}}^{10}| + \sigma} + 1\right] \times \left[1 - \frac{H_1 - H_2 - \sigma}{|H_1 - H_2| + \sigma}\right]$$

If $H_1 < H_2$, $\delta_{RV_{min}}^{10} \leq \delta_{RV}$ and $\delta_{RV_{min}}^{10} \leq \delta_{RV}$, $\Delta_2^{10} = 1$ otherwise $\Delta_2^{10} = 0$ $$\Delta_3^{10} = \frac{1}{8}\left[\frac{\delta_{RV_{min}}^{10} - \delta_{RV} + \sigma}{|\delta_{RV_{min}}^{10} - \delta_{RV}| + \sigma} + 1\right] \times$$

$$\left[\frac{\delta_{RV_{max}}^{10} - \delta_{RV} + \sigma}{|\delta_{RV_{max}}^{10} - \delta_{RV}| + \sigma} + 1\right] \times \left[1 - \frac{H_1 - H_2 - \sigma}{|H_1 - H_2| + \sigma}\right]$$

If $H_1 < H_2$, $\delta_{RV} \leq \delta_{RV_{min}}^{10}$ and $\delta_{RV} \leq \delta_{RV_{max}}^{10}$, $\Delta_3^{10} = 1$ otherwise $\Delta_3^{10} = 0$ Also, it is advantageous to define the difference of $H_1$ and $H_2$ as follows:

$$H_1 - H_2 = \delta_{HV} - \delta_{RV_{min}}^{10} - (\delta_{HV} - \delta_{RV_{max}}^{10})$$

$$H_1 - H_2 = \delta_{HV} - \delta_{RV_{min}}^{10} - \delta_{HV} + \delta_{RV_{max}}^{10}$$

$$H_1 - H_2 = \delta_{HV} - \delta_{RV_{min}}^{10} - \delta_{HV} + \delta_{RV_{max}}^{10}$$

$$H_1 - H_2 = \delta_{RV_{max}}^{10} - \delta_{RV_{min}}^{10}$$

Then the previous expressions can be expressed as:

$$\Delta_1^{10} = \frac{1}{8}\left[\frac{\delta_{RV} - \delta_{RV_{min}}^{10} + \sigma}{|\delta_{RV} - \delta_{RV_{min}}^{10}| + \sigma} + 1\right] \times$$

$$\left[\frac{\delta_{RV_{max}}^{10} - \delta_{RV} + \sigma}{|\delta_{RV_{max}}^{10} - \delta_{RV}| + \sigma} + 1\right] \times \left[\frac{\delta_{RV_{max}}^{10} - \delta_{RV_{min}}^{10} - \sigma}{|\delta_{RV_{max}}^{10} - \delta_{RV_{min}}^{10}| + \sigma} + 1\right]$$

$$\Delta_2^{10} = \frac{1}{8}\left[\frac{\delta_{RV} - \delta_{RV_{min}}^{10} + \sigma}{|\delta_{RV} - \delta_{RV_{min}}^{10}| + \sigma} + 1\right] \times$$

$$\left[\frac{\delta_{RV} - \delta_{RV_{max}}^{10} + \sigma}{|\delta_{RV} - \delta_{RV_{max}}^{10}| + \sigma} + 1\right] \times \left[1 - \frac{\delta_{RV_{max}}^{10} - \delta_{RV_{min}}^{10} - \sigma}{|\delta_{RV_{max}}^{10} - \delta_{RV_{min}}^{10}| + \sigma}\right]$$

$$\Delta_3^{10} = \frac{1}{8}\left[\frac{\delta_{RV_{min}}^{10} - \delta_{RV} + \sigma}{|\delta_{RV_{min}}^{10} - \delta_{RV}| + \sigma} + 1\right] \times$$

$$\left[\frac{\delta_{RV_{max}}^{10} - \delta_{RV} + \sigma}{|\delta_{RV_{max}}^{10} - \delta_{RV}| + \sigma} + 1\right] \times \left[1 - \frac{\delta_{RV_{max}}^{10} - \delta_{RV_{min}}^{10} - \sigma}{|\delta_{RV_{max}}^{10} - \delta_{RV_{min}}^{10}| + \sigma}\right]$$

By summing these three expressions, it can be determined that the host vehicle 10 and remote vehicle 14 are approaching each other from opposite directions if:

$$\sum_{i=1}^{3} \Delta_i^{10} = 1 \ (RQ = 10)$$

Thus:

$$r_2 = \sum_{i=1}^{3} \Delta_i^{10} \times 1$$

$$q_2 = \sum_{i=1}^{3} \Delta_i^{10} \times 0$$

host vehicle 10 and remote vehicle 14 approaching from crossing directions (RQ=11) When the remote vehicle 14 and host vehicle 10 approach each other from directions that result in a crossing path, the remote vehicle 14 heading angle, $\delta_{remote\ vehicle}$ can be defined as a function of host vehicle 10 heading angle, $\delta_{host\ vehicle}$ according to the following expressions. Since a crossing path can occur if the remote vehicle 14 approaches from the left or right, a total of four angles must be defined; minimum and maximum angles for the left and minimum and maximum angle for the right. If $\delta_{remote\ vehicle}$ falls within the two ranges, a crossing path exists.

Remote vehicle 14 Heading angle as a function of Host vehicle 10 heading angle for the case of vehicles crossing paths can be defined as follows:

Minimum Remote Vehicle Heading Angle $$\delta_{RV_{minL}}^{11} = \frac{1}{4}\left[\frac{\delta_{HV} - 0 + \sigma}{|\delta_{HV} - 0| + \sigma} + 1\right] \times \left[\frac{\varphi_6 - \delta_{HV} - \sigma}{|\varphi_6 - \delta_{HV}| + \sigma} + 1\right] \times (\delta_{HV} + \varphi_3) +$$
$$\frac{1}{4}\left[\frac{\delta_{HV} - \varphi_6 + \sigma}{|\delta_{HV} - \varphi_6| + \sigma} + 1\right] \times \left[\frac{2\pi - \delta_{HV} - \sigma}{|2\pi - \delta_{HV}| + \sigma} + 1\right] \times (\delta_{HV} - \varphi_6)$$

$$\delta_{RV_{minR}}^{11} = \frac{1}{4}\left[\frac{\delta_{HV} - 0 + \sigma}{|\delta_{HV} - 0| + \sigma} + 1\right] \times \left[\frac{\varphi_4 - \delta_{HV} - \sigma}{|\varphi_4 - \delta_{HV}| + \sigma} + 1\right] \times (\delta_{HV} + \varphi_5) +$$
$$\frac{1}{4}\left[\frac{\delta_{HV} - \varphi_4 + \sigma}{|\delta_{HV} - \varphi_4| + \sigma} + 1\right] \times \left[\frac{2\pi - \delta_{HV} - \sigma}{|2\pi - \delta_{HV}| + \sigma} + 1\right] \times (\delta_{HV} - \varphi_4)$$

Maximum Remote Vehicle Heading Angle $$\delta_{RV_{maxL}}^{11} = \frac{1}{4}\left[\frac{\delta_{HV} - 0 + \sigma}{|\delta_{HV} - 0| + \sigma} + 1\right] \times \left[\frac{\varphi_5 - \delta_{HV} - \sigma}{|\varphi_5 - \delta_{HV}| + \sigma} + 1\right] \times (\delta_{HV} + \varphi_4) +$$
$$\frac{1}{4}\left[\frac{\delta_{HV} - \varphi_5 + \sigma}{|\delta_{HV} - \varphi_5| + \sigma} + 1\right] \times \left[\frac{2\pi - \delta_{HV} - \sigma}{|2\pi - \delta_{HV}| + \sigma} + 1\right] \times (\delta_{HV} - \varphi_5)$$

$$\delta_{RV_{maxR}}^{11} = \frac{1}{4}\left[\frac{\delta_{HV} - 0 + \sigma}{|\delta_{HV} - 0| + \sigma} + 1\right] \times \left[\frac{\varphi_3 - \delta_{HV} - \sigma}{|\varphi_3 - \delta_{HV}| + \sigma} + 1\right] \times (\delta_{HV} + \varphi_6) +$$
$$\frac{1}{4}\left[\frac{\delta_{HV} - \varphi_3 + \sigma}{|\delta_{HV} - \varphi_3| + \sigma} + 1\right] \times \left[\frac{2\pi - \delta_{HV} - \sigma}{|2\pi - \delta_{HV}| + \sigma} + 1\right] \times (\delta_{HV} - \varphi_3)$$

Where:
$\varphi_3 = \pi/2 - \varphi_L$
$\varphi_4 = \pi/2 - \varphi_L$
$\varphi_5 = 3\pi/2 - \varphi_R$
$\varphi_6 = 3\pi/2 - \varphi_R$ $\varphi_L$ and $\varphi_R$ are threshold values that defines the angular range in which the remote vehicle 14 is defined to be in a crossing path with the host vehicle 10.

These variables define the minimum and maximum boundaries for the range of $\delta_{remote\ vehicle}$ with respect to $\delta_{host\ vehicle}$ for crossing paths values of $\delta_{remote\ vehicle}$ that fall outside these ranges are considered to be another condition such as in-path, opposite path or diverging path. The direction, left or right, from which the remote vehicle 14 is approaching is immaterial but a single equation for $\delta_{RV_{min}}^{11}$ and $\delta_{RV_{max}}^{11}$ is desired. This can be achieved by the following two equations:

$$\delta_{RV_{min}}^{11} = $$
$$\delta_{RV_{minL}}^{11} \times \frac{1}{2}\left[\frac{L_{Q_1} + L_{Q_2} - \sigma}{|L_{Q_1} + L_{Q_2}| + \sigma} + 1\right] + \delta_{RV_{minR}}^{11} \times \frac{1}{2}\left[\frac{R_{Q_1} + R_{Q_2} - \sigma}{|R_{Q_1} + R_{Q_2}| + \sigma} + 1\right]$$

$$\delta_{RV_{max}}^{11} = \delta_{RV_{maxL}}^{11} =$$
$$\frac{1}{2}\left[\frac{L_{Q_1} + L_{Q_2} - \sigma}{|L_{Q_1} + L_{Q_2}| + \sigma} + 1\right] + \delta_{RV_{maxR}}^{11} \times \frac{1}{2}\left[\frac{R_{Q_1} + R_{Q_2} - \sigma}{|R_{Q_1} + R_{Q_2}| + \sigma} + 1\right]$$

Where $$L_{Q_1} = L_{Q_4} = \frac{1}{4}\left[\frac{\delta_{HV} - A_6 + \sigma}{|\delta_{HV} - A_6| + \sigma} + 1\right] \times \left[\frac{A_7 - \delta_{HV} - \sigma}{|A_7 - \delta_{HV}| + \sigma} + 1\right]$$

-continued $$L_{Q_2} = L_{Q_3} = \frac{1}{4}\left[\frac{\delta_{HV} - 0 + \sigma}{|\delta_{HV} - 0| + \sigma} + 1\right] \times \left[\frac{A_{13} - \delta_{HV} - \sigma}{|A_{13} - \delta_{HV}| + \sigma} + 1\right] +$$
$$\frac{1}{4}\left[\frac{\delta_{HV} - A_{16} + \sigma}{|\delta_{HV} - A_{16}| + \sigma} + 1\right] \times \left[\frac{2\pi - \delta_{HV} - \sigma}{|2\pi - \delta_{HV}| + \sigma} + 1\right]$$

$$R_{Q_1} = R_{Q_4} = \frac{1}{4}\left[\frac{\delta_{HV} - 0 + \sigma}{|\delta_{HV} - 0| + \sigma} + 1\right] \times \left[\frac{A_5 - \delta_{HV} - \sigma}{|A_5 - \delta_{HV}| + \sigma} + 1\right] +$$
$$\frac{1}{4}\left[\frac{\delta_{HV} - A_8 + \sigma}{|\delta_{HV} - A_8| + \sigma} + 1\right] \times \left[\frac{2\pi - \delta_{HV} - \sigma}{|2\pi - \delta_{HV}| + \sigma} + 1\right]$$

$$R_{Q_2} = R_{Q_3} = \frac{1}{4}\left[\frac{\delta_{HV} - A_{14} + \sigma}{|\delta_{HV} - A_{14}| + \sigma} + 1\right] \times \left[\frac{A_{15} - \delta_{HV} - \sigma}{|A_{15} - \delta_{HV}| + \sigma} + 1\right]$$

And:
$A_5 = \beta_1 - \varphi_2$
$A_6 = \beta_1 + \varphi_2$
$A_7 = \beta_1 + \pi - \varphi_2$
$A_8 = \beta_1 + \pi + \varphi_2$
$A_{13} = \beta_1 - \pi - \varphi_2$
$A_{14} = \beta_1 - \pi + \varphi_2$
$A_{15} = \beta_1 - \varphi_2$
$A_{16} = \beta_1 + \varphi_2$ The remote vehicle 14 is considered to be in a crossing path with the host vehicle 10 when the heading angle of the remote vehicle 14, $\delta_{remote\ vehicle}$ falls within the range $\delta_{RV_{min}}^{11}$ and $\delta_{RV_{max}}^{11}$ as defined above. When the remote vehicle 14 is approaching from the left, there are three regions that need to be considered:

$$0 \leq \delta_{HV} < 3\pi/2 - \varphi_L \rightarrow \begin{cases} \delta_{HV} < \delta_{RV_{min}}^{11} \\ \delta_{HV} < \delta_{RV_{max}}^{11} \end{cases}$$

$$3\pi/2 - \varphi_L \leq \delta_{HV} < 3\pi/2 + \varphi_L \rightarrow \begin{cases} \delta_{HV} < \delta_{RV_{min}}^{11} \\ \delta_{HV} > \delta_{RV_{max}}^{11} \end{cases}$$

$$3\pi/2 + \varphi_L \leq \delta_{HV} < 2\pi \rightarrow \begin{cases} \delta_{HV} > \delta_{RV_{min}}^{11} \\ \delta_{HV} > \delta_{RV_{max}}^{11} \end{cases}$$

These regions are illustrated in FIGS. 27-32.

Similarly, when the remote vehicle 14 is approaching from the right, there are three regions that need to be considered:

$$0 \leq \delta_{HV} < \pi/2 - \varphi_R \rightarrow \begin{cases} \delta_{HV} < \delta_{RV_{min}}^{11} \\ \delta_{HV} < \delta_{RV_{max}}^{11} \end{cases}$$

$$\pi/2 - \varphi_R \leq \delta_{HV} < \pi/2 + \varphi_R \rightarrow \begin{cases} \delta_{HV} < \delta_{RV_{min}}^{11} \\ \delta_{HV} > \delta_{RV_{max}}^{11} \end{cases}$$

$$\pi/2 + \varphi_R \leq \delta_{HV} < 2\pi \rightarrow \begin{cases} \delta_{HV} > \delta_{RV_{min}}^{11} \\ \delta_{HV} > \delta_{RV_{max}}^{11} \end{cases}$$

These regions are illustrated in FIGS. 33-38.

Consider the following expressions for $H_1$ and $H_2$.

$H_1 = \delta_{HV} - \delta_{RV_{min}}^{11}$ $H_2 = \delta_{HV} - \delta_{RV_{max}}^{11}$ For any value of $\delta_{host\ vehicle}$, the values for $H_1$ and $H_2$ fall within three distinct categories:
1: $H_1$ is negative, $H_2$ is negative and $H_1 > H_2$
2: $H_1$ is negative, $H_2$ is positive and $H_1 < H_2$
3: $H_1$ is positive, $H_2$ is positive and $H_1 > H_2$ From these three conditions, it can be shown that for any combination of $\delta_{host\ vehicle}$ and $\delta_{remote\ vehicle}$, where $0 \leq \delta_{HV} < 2\pi$ and $0 \leq \delta_{RV} < 2\pi$ the following expressions can be used to identify if the host vehicle 10 and remote vehicle 14 are crossing paths.

$$\Delta_1^{11} = \frac{1}{8}\left[\frac{\delta_{RV} - \delta_{RV_{min}}^{11} + \sigma}{|\delta_{RV} - \delta_{RV_{min}}^{11}| + \sigma} + 1\right] \times$$
$$\left[\frac{\delta_{RV_{max}}^{11} - \delta_{RV} + \sigma}{|\delta_{RV_{max}}^{11} - \delta_{RV}| + \sigma} + 1\right] \times \left[\frac{H_1 - H_2 - \sigma}{|H_1 - H_2| + \sigma} + 1\right]$$

If $H_1 > H_2$, $\delta_{RV_{min}}^{11} \leq \delta_{RV} < \delta_{RV_{max}}^{11}$, $\Delta_1^{11} = 1$ otherwise $\Delta_1^{11} = 0$ $$\Delta_2^{11} = \frac{1}{8}\left[\frac{\delta_{RV_{min}}^{11} - \delta_{RV} + \sigma}{|\delta_{RV_{min}}^{11} - \delta_{RV}| + \sigma} + 1\right] \times \left[\frac{\delta_{RV_{max}}^{11} - \delta_{RV} + \sigma}{|\delta_{RV_{max}}^{11} - \delta_{RV}| + \sigma} + 1\right] \times$$
$$\left[1 - \frac{H_1 - H_2 - \sigma}{|H_1 - H_2| + \sigma}\right]$$

If $H_1 < H_2$, $\delta_{RV_{min}}^{11} \leq \delta_{RV}$ and $\delta_{RV_{min}}^{11} \leq \delta_{RV}$, $\Delta_2^{11} = 1$ otherwise $\Delta_2^{11} = 0$ $$\Delta_3^{11} = \frac{1}{8}\left[\frac{\delta_{RV} - \delta_{RV_{min}}^{11} + \sigma}{|\delta_{RV} - \delta_{RV_{min}}^{11}| + \sigma} + 1\right] \times$$
$$\left[\frac{\delta_{RV} - \delta_{RV_{max}}^{11} + \sigma}{|\delta_{RV} - \delta_{RV_{max}}^{11}| + \sigma} + 1\right] \times \left[1 - \frac{H_1 - H_2 + \sigma}{|H_1 - H_2| + \sigma}\right]$$

If $H_1 < H_2$, and $\delta_{RV_{min}}^{11} \leq \delta_{RV}$ and $\delta_{RV_{min}}^{11} \leq \delta_{RV}$, $\Delta_3^{11} = 1$ otherwise $\Delta_3^{11} = 0$ Also, it is advantageous to define the difference of $H_1$ and $H_2$ as follows:

$$H_1 - H_2 = \delta_{HV} - \delta_{RV_{min}}^{11} - (\delta_{HV} - \delta_{RV_{max}}^{11})$$
$$H_1 - H_2 = \delta_{HV} - \delta_{RV_{min}}^{11} - \delta_{HV} - \delta_{RV_{max}}^{11}$$
$$H_1 - H_2 = \delta_{HV} - \delta_{RV_{min}}^{11} - \delta_{HV} - \delta_{RV_{max}}^{11}$$
$$H_1 - H_2 = \delta_{RV_{max}}^{11} - \delta_{RV_{min}}^{11}$$

Then the expressions above can be expressed as:

$$\Delta_1^{11} = \frac{1}{8}\left[\frac{\delta_{RV} - \delta_{RV_{min}}^{11} + \sigma}{|\delta_{RV} - \delta_{RV_{min}}^{11}| + \sigma} + 1\right] \times$$
$$\left[\frac{\delta_{RV_{max}}^{11} - \delta_{RV} + \sigma}{|\delta_{RV_{max}}^{11} - \delta_{RV}| + \sigma} + 1\right] \times \left[\frac{\delta_{RV_{max}}^{11} - \delta_{RV_{min}}^{11} - \sigma}{|\delta_{RV_{max}}^{11} - \delta_{RV_{min}}^{11}| + \sigma} + 1\right]$$

$$\Delta_2^{11} = \frac{1}{8}\left[\frac{\delta_{RV_{min}}^{11} - \delta_{RV} + \sigma}{|\delta_{RV_{min}}^{11} - \delta_{RV}| + \sigma} + 1\right] \times$$
$$\left[\frac{\delta_{RV_{max}}^{11} - \delta_{RV} + \sigma}{|\delta_{RV_{max}}^{11} - \delta_{RV}| + \sigma} + 1\right] \times \left[1 - \frac{\delta_{RV_{max}}^{11} - \delta_{RV_{min}}^{11} + \sigma}{|\delta_{RV_{max}}^{11} - \delta_{RV_{min}}^{11}| + \sigma}\right]$$

$$\Delta_3^{11} = \frac{1}{8}\left[\frac{\delta_{RV} - \delta_{RV_{min}}^{11} + \sigma}{|\delta_{RV} - \delta_{RV_{min}}^{11}| + \sigma} + 1\right] \times$$
$$\left[\frac{\delta_{RV} - \delta_{RV_{max}}^{11} + \sigma}{|\delta_{RV} - \delta_{RV_{max}}^{11}| + \sigma} + 1\right] \times \left[1 - \frac{\delta_{RV_{max}}^{11} - \delta_{RV_{min}}^{11} + \sigma}{|\delta_{RV_{max}}^{11} - \delta_{RV_{min}}^{11}| + \sigma}\right]$$

By summing these three expressions, it can be determined that the host vehicle 10 and remote vehicle 14 are crossing paths if:

$$\sum_{i=1}^{3} \Delta_i^{11} = 1 \ (RQ = 11)$$

Thus:

$$r_3 = \sum_{i=1}^{3} \Delta_i^{11} \times 1$$

$$q_3 = \sum_{i=1}^{3} \Delta_i^{11} \times 1$$

Finally:

$$R = \sum_{i=1}^{3} r_i$$

$$Q = \sum_{i=1}^{3} q_i$$

If $R=Q=0$ the paths of the remote vehicle 14 and host vehicle 10 are considered to be diverging away from each other.

Figure 39:
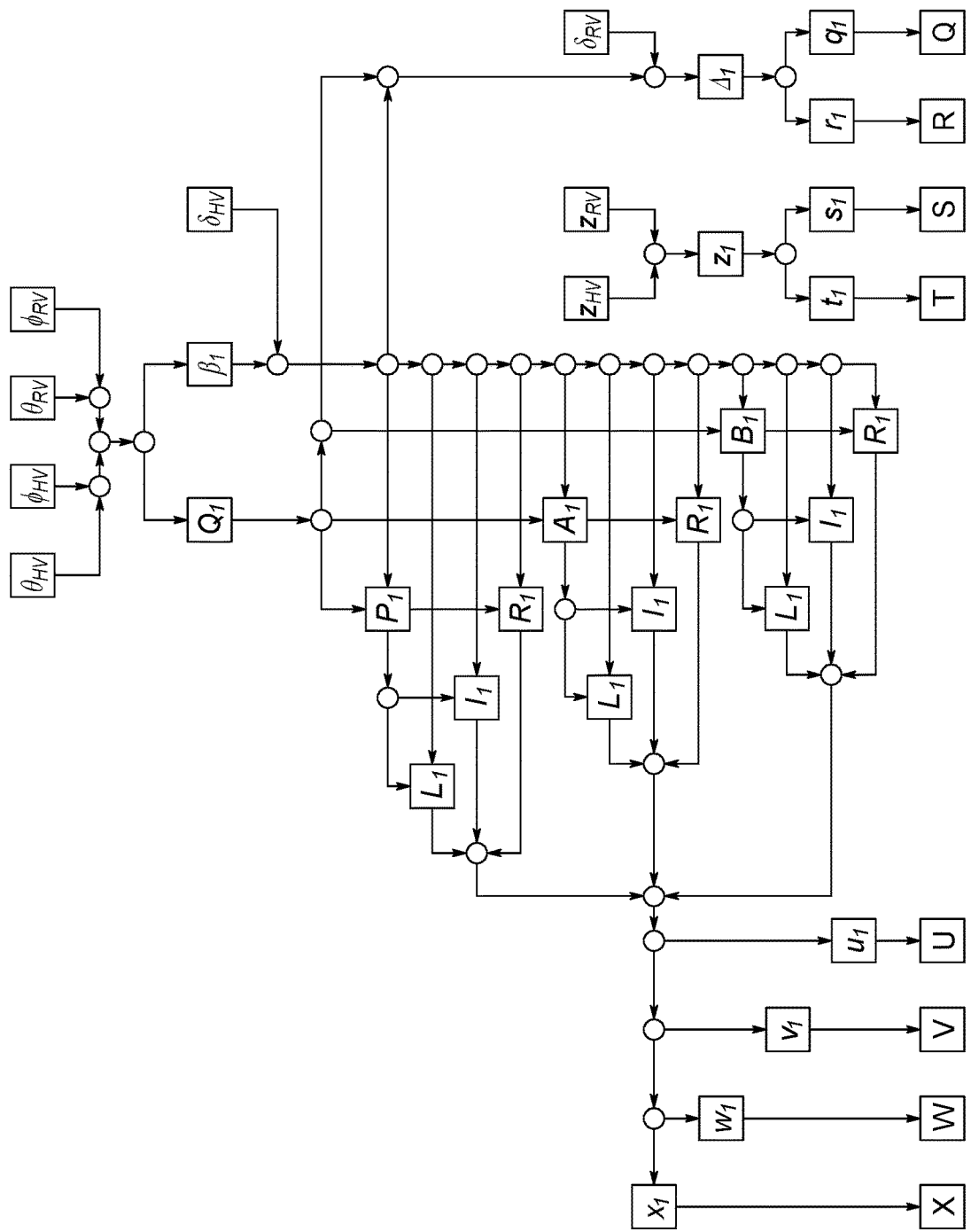
FIG. 39 illustrates source data and equation interdependencies.

FIG. 39 identifies the interdependencies of the source data and expressions that are used to determine the values of the digits X through Q.

When the remote vehicle is approaching the host vehicle 10 from behind, the controller 24 on board the host vehicle 10 searches for the following series of relative position codes from a particular remote vehicle 14. If such a series of codes exists, the remote vehicle 14 is approaching the host vehicle 10 from behind (or the rear). Table 1 indicates the relative position codes identifying that the remote vehicle 14 is approaching from the rear of the host vehicle 10.

TABLE 1

| | X | W | V | U | T | S | R | Q | |
|---|---|---|---|---|---|---|---|---|---|
| Host Vehicle Left side | 1 | 0 | 0 | 1 | 0 | 0 | 0 | 1 | Driver side |
| Host Vehicle Right side | 1 | 0 | 1 | 0 | 0 | 0 | 0 | 1 | Passenger side |

When the controller 24 determines that the host vehicle 10 is stopped and a remote vehicle 14 is approaching from the rear of the host vehicle 10, the controller 24 on board the host vehicle 10 checks to determine if anyone is attempting to exit the host vehicle 10. If code 10010001 exists, the host vehicle 10 occupants are attempting to exit the vehicle from the left side, the controller 24 on board the host vehicle 10 checks the proximity of the remote vehicle 14 to the host vehicle 10 using such criteria as time of arrival and lateral distance. If for example, the remote vehicle 14 is within 5 seconds of arrival and within 5.4 meters lateral distance, the system 12 on board the host vehicle 10 determines the remote vehicle 14 is within proximity and the mitigation device performs a mitigation operation.

If code 10100001 exists, the host vehicle 10 occupants are attempting to exit the host vehicle 10 from the right side. The controller 24 then determines the proximity of the remote vehicle 14 to the host vehicle 10 using such criteria as time of arrival and lateral distance. If for example, the remote vehicle 14 is within 5 seconds of arrival and within 5.4 meters lateral distance, the system 12 on board the host vehicle 10 determines the remote vehicle 14 is within proximity and issues a warning to the host vehicle 10 occupants attempting to exit the host vehicle 10 from the right side.

When the remote vehicle 14 is approaching the host vehicle 10 from the opposite direction, the controller 24 on board the host vehicle 10 also searches for the following series of relative position codes from a particular remote vehicle 14. If such a series of codes exists, the remote vehicle 14 is approaching the host vehicle 10 from the opposite direction. Table 2 indicates the relative position codes identifying a remote vehicle 14 is approaching the host vehicle 10 from the opposite direction.

TABLE 2

|  | X | W | V | U | T | S | R | Q |  |
|---|---|---|---|---|---|---|---|---|---|
| Host vehicle Left side | 0 | 0 | 0 | 1 | 0 | 0 | 1 | 0 | Driver side |
| Host vehicle Right side | 0 | 0 | 1 | 0 | 0 | 0 | 1 | 0 | Passenger side |

When the controller 24 determines that the host vehicle 10 is stopped and a remote vehicle 14 is approaching from the opposite direction the controller 24 on board the host vehicle 10 then checks to determine if anyone is attempting to exit the host vehicle 10. If code 00010010 exists and host vehicle 10 occupants are attempting to exit the vehicle from the left side, the system 12 on board the host vehicle 10 checks the proximity of the remote vehicle 14 to the host vehicle 10 using such criteria as time of arrival and lateral distance. If for example, the remote vehicle 14 is within 5 seconds of arrival and within 5.4 meters lateral distance, the system 12 on board the host vehicle 10 determines the remote vehicle 14 is within proximity and issues a warning to the host vehicle 10 occupants attempting to exit the host vehicle 10 from the left side.

If code 00100010 exists and the host vehicle 10 occupants are attempting to exit the host vehicle 10 from the right side, the system 12 on board the host vehicle 10 checks the proximity of the remote vehicle 14 to the host vehicle 10 using such criteria as time of arrival and lateral distance. If for example, the remote vehicle 14 is within 5 seconds of arrival and within 5.4 meters lateral distance, the system 12 on board the host vehicle 10 determines the remote vehicle 14 is within proximity and issues a warning to the host vehicle 10 occupants attempting to exit the host vehicle 10 from the right side.

Figure 40:
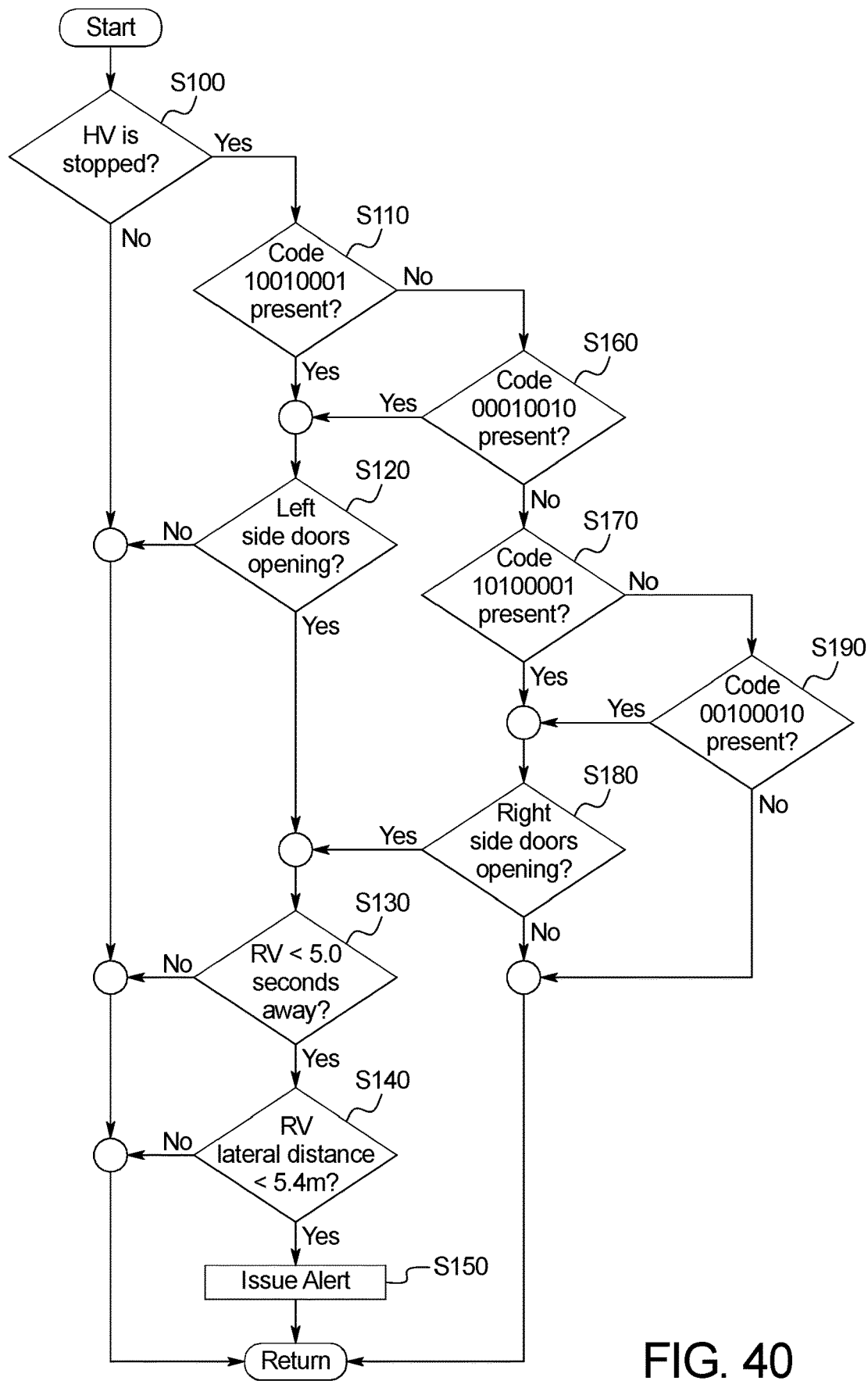
FIG. 40 is flow chart showing the process to determine whether a mitigation operation is necessary.

FIG. 40 illustrates the process in determination whether a mitigation operation is required. First, as shown in step S100, the controller 24 determines whether the host vehicle 10 has stopped. If the host vehicle 10 as not stopped the process returns to start. If the controller 24 determines that the host vehicle 10 has stopped the controller 24 determines if code 10010001 is present in step S110. If code 10010001 is present, the controller 24 determines whether the left (driver) side door 10a is opening in step S120 or whether a mitigation operation is warranted. If the left (driver) side door 10a is not opening the process returns to start. If the left (driver) side door 10a is opening or the vehicle occupant warning system 12 determines that a mitigation operation is warranted, and controller 24 determines whether a remote vehicle 14 is within a predetermined time (e.g., 5.0 seconds) from the host vehicle 10 in step S130. If the remote vehicle 14 is not within a predetermined time (e.g., 5.0 seconds) from the host vehicle 10, the process returns to start. If the remote vehicle 14 is within a predetermined time (e.g., 5.0 seconds) from the host vehicle 10, the controller 24 determines whether a remote vehicle 14 is within a predetermined lateral distance (e.g., 5.4 meters) from the host vehicle 10 in step S140. If the remote vehicle 14 is not within a predetermined lateral distance (e.g., 5.4 meters) from the host vehicle 10, the process returns to start. If the remote vehicle 14 is within a predetermined lateral distance (e.g., 5.4 meters) from the host vehicle 10, the vehicle occupant warning system 12 performs or issues a mitigation operation in step S150.

Returning to step S110, if code 10010001 is not present, the controller 24 determines whether code 00010010 is present in step S160. If code 00010010 is present, the process returns to step S120. If code 00010010 is not present, the controller 24 determines whether code 10100001 is present in step S170. If code 10100001 is present, the controller q determines whether the right (passenger) side door 10b is opening in step S180 or whether a mitigation is warranted. If the right (passenger) side door 10b is opening or the vehicle occupant warning system 12 determines that mitigation is warranted, the process returns to step S130. If the right (passenger) side door is not opening or the vehicle occupant warning system 12 determines that mitigation is not warranted, the process returns to start.

Returning to step S170, if the controller 24 determines that code 10100001 is not present, the controller 24 determines whether code 00100010 is present in step S190. If the controller determines that code 00100010 is present, the process returns to step S180. If the controller 24 determines that code 00100010 is not present, the process returns to start.

As described herein, the mitigation operation can be any suitable operation or combination of operations. For example, the mitigation operation can be a visual warning, a warning sound, automatically locking of a host vehicle door, and causing a tactile sensation within the host vehicle 10, or any other suitable operation.

The vehicle occupant warning system as described herein increases vehicle occupant safety and reduces or eliminates injuries to vehicle occupants.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "portion" or "element" when used in the singular can have the dual meaning of a single part or a plurality of parts. Also as used herein to describe the above embodiment(s), the following directional terms "forward" and "rear", as well as any other similar directional terms refer to those directions of a vehicle equipped with the vehicle occupant warning system. Accordingly, these terms, as utilized to describe the present invention should be interpreted relative to a vehicle equipped with the vehicle occupant warning system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle occupant warning system comprising:
a receiver, disposed onboard a host vehicle and configured to receive remote vehicle information representing a position, speed and heading of a remote vehicle, the receiver configured to receive the remote vehicle information over a wireless communication network;
an electronic controller configured to determine whether the host vehicle is stopped, and when the controller determines that the host vehicle is stopped, the electronic controller is further configured to determine whether the remote vehicle will pass within a predetermined lateral distance of a side of the host vehicle within a predetermined time based on a calculation using the remote vehicle information including the position, the speed and the heading of the remote vehicle; and
a mitigation device configured to perform a mitigation operation to prevent an occupant of the host vehicle from exiting the host vehicle when the electronic controller determines that the remote vehicle will pass within the predetermined lateral distance of the side of the host vehicle within the predetermined time based on the remote vehicle information.

2. The vehicle occupant warning system of claim 1, wherein
the remote vehicle information includes information representing a location of the remote vehicle at a predetermined time.

3. The vehicle occupant warning system of claim 1, wherein
the remote vehicle information includes information representing a lateral distance of the remote vehicle from the host vehicle.

4. The vehicle occupant warning system of claim 1, wherein
the electronic controller is configured to determine whether the occupant is attempting to exit the host vehicle.

5. The vehicle occupant warning system of claim 4, wherein
the mitigation device is configured to perform at least one of the following mitigation operations: issue a visual warning, issue a warning sound, automatically lock a host vehicle door, and cause a tactile sensation within the host vehicle.

6. The vehicle occupant warning system of claim 1, further comprising
a transmitter configured to transmit a signal to the remote vehicle indicating that the occupant of the host vehicle is exiting the host vehicle.

7. The vehicle occupant warning system of claim 1, further comprising
a detector configured to detect the remote vehicle.

8. The vehicle occupant warning system of claim 1, wherein
the mitigation device is configured change the mitigation operation based on updated information received from the remote vehicle.

9. The vehicle occupant warning system of claim 1, wherein
the electronic controller is configured to instruct the mitigation device to perform the mitigation operation upon determining that a distance of the remote from the host vehicle is decreasing.

10. The vehicle occupant warning system of claim 1, wherein
the receiver is configured to receive the remote vehicle information via direct communication with remote vehicle.

11. A method of warning a vehicle occupant, comprising:
operating a receiver disposed onboard a host vehicle, to receive remote vehicle information representing a travel condition of a remote vehicle over a wireless communication network;
determining, by an electronic controller, whether the host vehicle is stopped;
subsequently determining, by the electronic controller, whether the remote vehicle will pass within a predetermined lateral distance of a side of the host vehicle within a predetermined time based on a calculation using the remote vehicle information; and
operating a mitigation device to perform a mitigation operation to prevent an occupant of the host vehicle from exiting the host vehicle when the electronic controller determines that the remote vehicle will pass within the predetermined lateral distance of the side of the host vehicle within a predetermined time based on the remote vehicle information.

12. The method of claim 11, further comprising
determining by the electronic controller whether the occupant is attempting to exit the host vehicle.

13. The method of claim 11, wherein
operating the mitigation device includes operating the mitigation device to perform at least one of the following mitigation operations: issue a visual warning, issue a warning sound, automatically lock a host vehicle door, and cause a tactile sensation within the host vehicle.

14. The method of claim 11, further comprising operating a transmitter to transmit a signal to the remote vehicle indicating that the occupant of the host vehicle is exiting the host vehicle.

15. The method of claim 11, further comprising operating a detector to detect the remote vehicle.

16. The method of claim 11, wherein the operating the mitigation device includes changing the mitigation operation based on updated information received from the remote vehicle.

17. The method of claim 11, wherein operating the electronic controller to instruct the mitigation device to perform the mitigation operation upon determining that a distance of the remote from the host vehicle is decreasing.

18. A vehicle occupant warning system comprising:
a receiver, disposed onboard a host vehicle and configured to receive remote vehicle information representing a position, speed and heading of a remote vehicle, the receiver configured to receive the remote vehicle information over a wireless communication network;
an electronic controller configured to determine whether the host vehicle is stopped, and when the controller determines that the host vehicle is stopped, the electronic controller is further configured to determine whether the remote vehicle will pass within a predetermined predicted lateral distance of a side of the host vehicle within a predetermined time based on a calculation using the remote vehicle information including the position, the speed and the heading of the remote vehicle; and
a mitigation device configured to perform a mitigation operation to prevent an occupant of the host vehicle from exiting the host vehicle when the electronic controller determines that the remote vehicle will pass within the predetermined predicted lateral distance of the side of the host vehicle within the predetermined time based on the remote vehicle information.

* * * * *